United States Patent
Uchida et al.

(10) Patent No.: US 8,259,384 B2
(45) Date of Patent: Sep. 4, 2012

(54) ILLUMINATION DEVICE AND DISPLAY DEVICE

(75) Inventors: Tatsuo Uchida, Miyagi (JP); Takahiro Ishinabe, Miyagi (JP); Tohru Kawakami, Miyagi (JP); Kentaro Okuyama, Miyagi (JP); Shinpei Nagatani, Kanagawa (JP); Akira Ebisui, Miyagi (JP); Masahiro Ikeda, Miyagi (JP)

(73) Assignees: Sony Corporation, Tokyo (JP); Tohoku University, Sendai-Shi (JP)

( * ) Notice: Subject to any disclaimer, the term of this patent is extended or adjusted under 35 U.S.C. 154(b) by 83 days.

(21) Appl. No.: 12/965,364

(22) Filed: Dec. 10, 2010

(65) Prior Publication Data

US 2011/0141551 A1    Jun. 16, 2011

(30) Foreign Application Priority Data

Dec. 11, 2009  (JP) .............................. P2009-281388
Apr. 7, 2010   (JP) .............................. P2010-088763

(51) Int. Cl.
  *G02F 1/29*     (2006.01)
  *G02F 1/1335*   (2006.01)
  *F21V 7/04*     (2006.01)

(52) U.S. Cl. ........................ 359/315; 362/606; 349/65

(58) Field of Classification Search ................... 349/65; 359/260, 315, 316; 362/606
See application file for complete search history.

(56) References Cited

U.S. PATENT DOCUMENTS

| | | | | |
|---|---|---|---|---|
| 7,990,605 | B2 * | 8/2011 | Okuyama et al. ............. | 359/296 |
| 2011/0249221 | A1 * | 10/2011 | Uchida et al. .................. | 349/65 |

FOREIGN PATENT DOCUMENTS

| | | |
|---|---|---|
| JP | 06-347790 | 12/1994 |
| JP | 11-142843 | 5/1999 |
| JP | 2004-253335 | 9/2004 |

* cited by examiner

*Primary Examiner* — David N Spector
(74) *Attorney, Agent, or Firm* — K&L Gates LLP

(57) ABSTRACT

An illumination device is provided and includes: a light guide member; a light source provided on one or more side faces of the light guide member; and a light modulating element including a pair of transparent substrates disposed to oppose each other with a gap therebetween, a first electrode provided on a surface of one of the transparent substrates, a second electrode provided on a surface of the other of the transparent substrates, and a light modulation layer provided in the gap and expressing a scattering property or a transparency to light from the light source in accordance with a magnitude of an electric field. The first electrode, the second electrode, or both thereof is patterned, and a density of pattern of the first electrode, the second electrode, or both thereof to which the patterning is applied is varied depending on a distance from the light source.

17 Claims, 31 Drawing Sheets

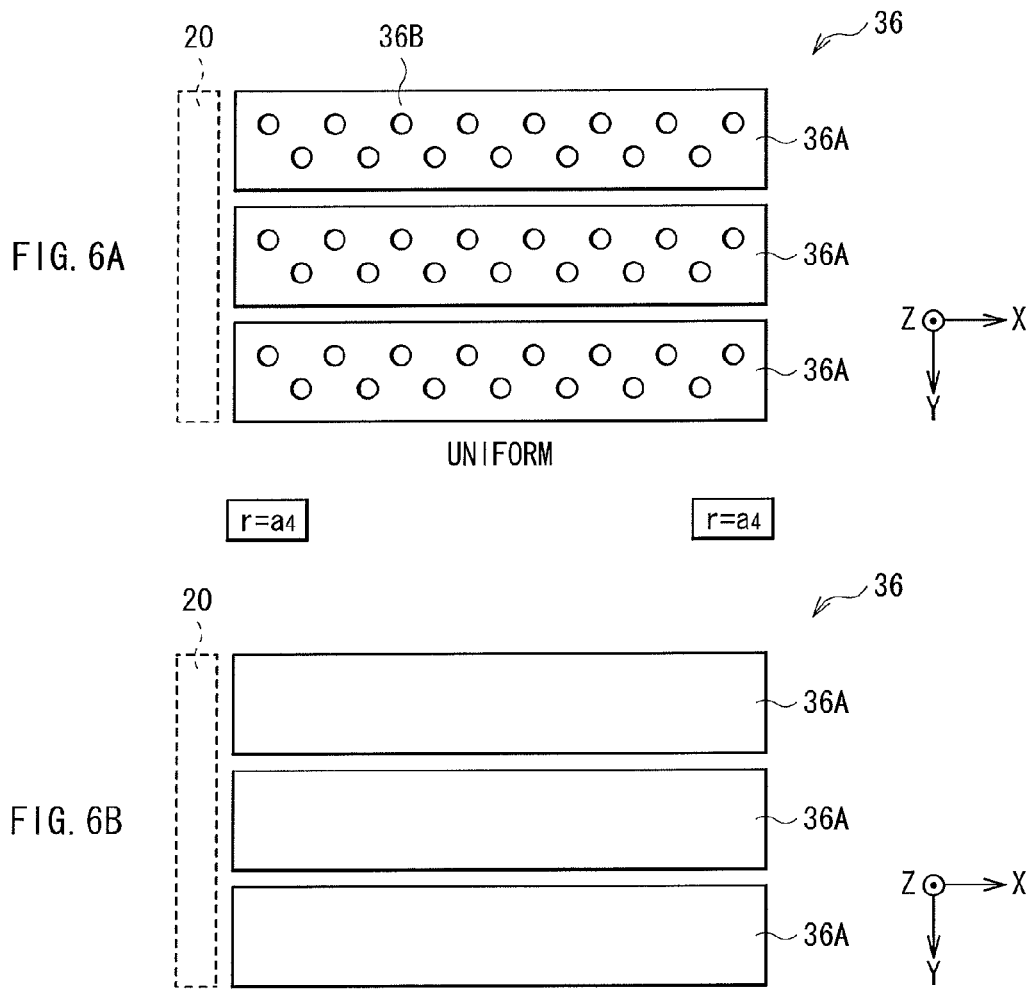
FIG. 6A
FIG. 6B
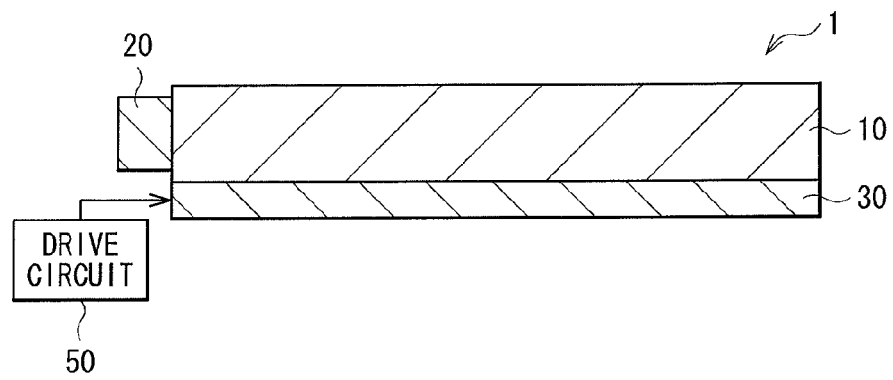
FIG. 7

| VOLTAGE 140Vpp | V$_A$ | V$_B$ | V$_C$ |
|---|---|---|---|
| VOLTAGE CONSTANT | 100% | 100% | 100% |
| VOLTAGE MODULATED | 32% | 52% | 100% |

| VOLTAGE 140Vpp | V<sub>A</sub> | V<sub>B</sub> | V<sub>C</sub> |
|---|---|---|---|
| VOLTAGE MODULATED | 32% | 52% | 100% |
| VOLTAGE CONSTANT | 0% | 100% | 0% |

ILLUMINATION DEVICE AND DISPLAY DEVICE

CROSS REFERENCES TO RELATED APPLICATIONS

The present application claims priority to Japanese Patent Application JP 2009-281388 filed on Dec. 11, 2009 and Japanese Patent Application JP 2010-088763 filed on Apr. 7, 2010, the entire contents of which is hereby incorporated by reference.

BACKGROUND

The present disclosure relates to an illumination device having a light modulating element which expresses a scattering property or a transparency to light, and to a display device provided with the illumination device.

In association with recent rapid progress in higher image quality and better energy saving of a liquid crystal display, a method has been proposed, which realizes an improvement in a dark-place contrast by partially modulating an intensity of light of a backlight. This method mainly drives light-emitting diodes (LEDs), used as a light source of the backlight, partially to modulate the light of the backlight in accordance with a display image. Also, in view of an increasing demand for reduction in thickness for a large-sized liquid crystal display as in a small-sized liquid crystal display, an edge-light method has been a focus of attention, instead of a method which disposes a cold cathode fluorescent lamp (CCFL) or the LEDs immediately below a liquid crystal panel. The edge-light method disposes a light source at an edge of a light guide plate. In the edge-light method, however, it is difficult to perform partial driving, in which the light intensity of the light source is partially modulated.

As a technique for extracting light propagating in a light guide plate, Japanese Unexamined Patent Application Publication No. H06-347790 (JP-H06-347790A) proposes a display device utilizing a polymer-dispersed liquid crystal (PDLC), which switches between a transparent state and a scattering state, for example. This technique aims to prevent reflection and the like, and applies a voltage partially to the PDLC to switch over between the transparent state and the scattering state.

As for an edge-light backlight, there is a technology in which a printing pattern, a density of a geometry for the light extraction, or a size of a single pattern is varied in accordance with a distance from a light source (e.g., LEDs, a CCFL, and so forth) for a purpose of uniformizing an in-plane luminance, as disclosed in Japanese Unexamined Patent Application Publication No. H11-142843 (JP-H11-142843A), for example. A technology disclosed in JP-H11-142843A is, so to speak, a technology for extracting the light uniformly from the light guide plate, which technology only takes the extraction of light into consideration. As the technology of uniformizing the in-plane luminance besides JP-H11-142843A, there is a technology in which a light diffusion rate of a diffusion sheet is varied gradually in accordance with a distance from a light source, as disclosed in Japanese Unexamined Patent Application Publication No. 2004-253335 (JP2004-253335A), for example.

It may be contemplated that the technology disclosed in JP-H11-142843A or that disclosed in JP2004-253335A may be combined with the PDLC disclosed in JP-H06-347790A to uniformize the in-plane luminance of light of the backlight. However, although this may allow the luminance to be uniformized, the luminance in dark displaying is increased. Thus, there is a problem in that a modulation ratio of bright displaying to the dark displaying is difficult to be made high.

It is desirable to provide an illumination device capable of uniformizing an in-plane luminance while increasing a modulation ratio, and a display device provided with the illumination device.

SUMMARY

An illumination device according to an embodiment includes: a light guide member having a lower face, an upper face, and side faces; a light source provided on one or more side faces of the light guide member; and a light modulating element provided on the lower face, the upper face, or inside of the light guide member and attached to the light guide member. The light modulating element includes a pair of transparent substrates disposed to oppose each other with a gap therebetween, a first electrode provided on a surface of one of the transparent substrates, a second electrode provided on a surface of the other of the transparent substrates, and a light modulation layer provided in the gap of the transparent substrates and expressing a scattering property or a transparency to light from the light source in accordance with a magnitude of an electric field. The first electrode, the second electrode, or both of the first and the second electrodes is patterned, and a density of pattern of the first electrode, the second electrode, or both of the first and the second electrodes to which the patterning is applied is varied depending on a distance from the light source.

A display device according to an embodiment includes: a display panel having a plurality of pixels, which are arranged in matrix and are driven based on an image signal; and an illumination device illuminating the display panel. The illumination device includes: a light guide member having a lower face, an upper face, and side faces; a light source provided on one or more side faces of the light guide member; and a light modulating element provided on the lower face, the upper face, or inside of the light guide member and attached to the light guide member. The light modulating element includes a pair of transparent substrates disposed to oppose each other with a gap therebetween, a first electrode provided on a surface of one of the transparent substrates, a second electrode provided on a surface of the other of the transparent substrates, and a light modulation layer provided in the gap of the transparent substrates and expressing a scattering property or a transparency to light from the light source in accordance with a magnitude of an electric field. The first electrode, the second electrode, or both of the first and the second electrodes is patterned, and a density of pattern of the first electrode, the second electrode, or both of the first and the second electrodes to which the patterning is applied is varied depending on a distance from the light source.

In the illumination device and the display device according to the embodiments, the light modulation layer, which expresses the scattering property or the transparency to the light from the light source in accordance with the magnitude of the electric field, is provided in the light modulating element attached to the light guide member. Thus, the light, emitted from the light source and which propagates in the light guide member, transmits through a region in the light modulation layer that expresses the transparency by an electric field control, and is totally reflected or is reflected with a high reflectivity by an interface of the transparent substrate. Consequently, a luminance in a region corresponding to the region expressing the transparency in a light exit region of the illumination device (hereinafter simply referred to as a "transparent region in the light exit region") becomes lower than that in a case where the light modulating element is not provided. On the other hand, the light which propagates in the light guide member is scattered in a region in the light modulation layer that expresses the scattering property by the electric field control, and transmits through the interface of the transparent substrate. Consequently, a luminance in a region corresponding to the region expressing the scattering property in the light exit region of the illumination device (hereinafter simply referred to as a "scatter region in the light exit region") becomes higher than that in the case where the light modulating element is not provided. Moreover, a luminance in partial white displaying (a luminance protrusion) increases by a decreased amount of the luminance in the transparent region in the light exit region. Also, according to the embodiments, the first electrode, the second electrode, or both of the first and the second electrodes provided in the light modulating element is patterned, and the density of pattern of the first electrode, the second electrode, or both of the first and the second electrodes to which the patterning is applied is varied depending on the distance from the light source. This allows a density distribution of the transparent region and the scatter region in the light exit region to have a desired distribution. Thereby, a luminance on the light source side in the light exit region is suppressed lower than the case where the light modulating element is not provided, and a luminance on the opposite side to the light source in the light exit region is more increased than the case where the light modulating element is not provided.

According to the illumination device and the display device of the embodiments, the luminance on the light source side in the light exit region is suppressed lower than the case where the light modulating element is not provided, and the luminance on the opposite side to the light source in the light exit region is more increased than the case where the light modulating element is not provided. Therefore, it is possible to uniformize the in-plane luminance while increasing the modulation ratio.

It is to be understood that both the foregoing general description and the following detailed description are exemplary, and are intended to provide further explanation as claimed.

Additional features and advantages are described herein, and will be apparent from the following Detailed Description and the figures.

BRIEF DESCRIPTION OF THE FIGURES

FIGS. 6A and 6B are plan views each illustrating another example of the configuration of the upper face of the bottom electrode illustrated in FIG. 1.

FIG. 7 is a cross-sectional view illustrating another example of the configuration of the backlight illustrated in FIG. 1.

DETAILED DESCRIPTION

Hereinafter, embodiments will be described in detail with reference to the accompanying drawings. The description will be given in the following order.

1. First Embodiment (Backlight with Reverse PDLC (Horizontal Type))
2. Second Embodiment (Backlight with Reverse PDLC (Vertical Type))
3. First Modification (Backlight with Normally-White PDLC)
4. Second Modification (Backlight with Difference in Position of Light Modulating Element)
5. Third Modification (Backlight with Addition of Optical Sheet)
6. Fourth Modification (Backlight with Difference in Patterning of Electrodes)
7. Driving Method
8. Application Example (Display Device)
9. Examples (Display Device)

First Embodiment

Figure 1A:
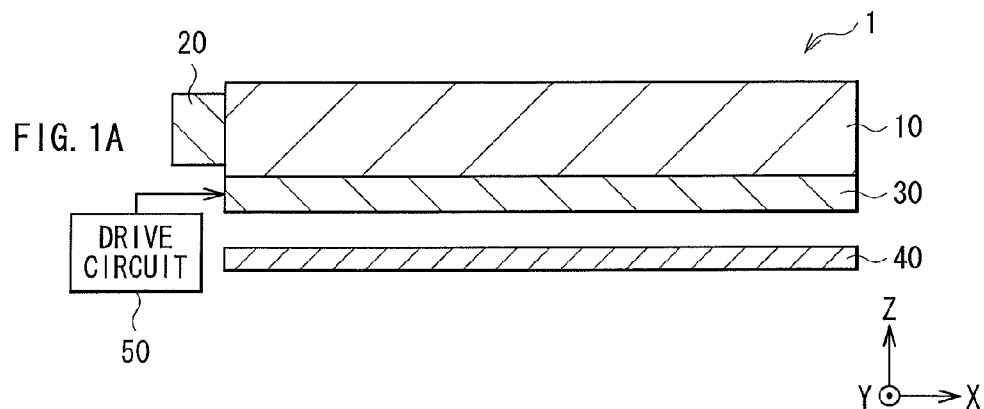
FIGS. 1A and 1B are cross-sectional views each illustrating an example of a configuration of a backlight according to a first embodiment.
Figure 1B:
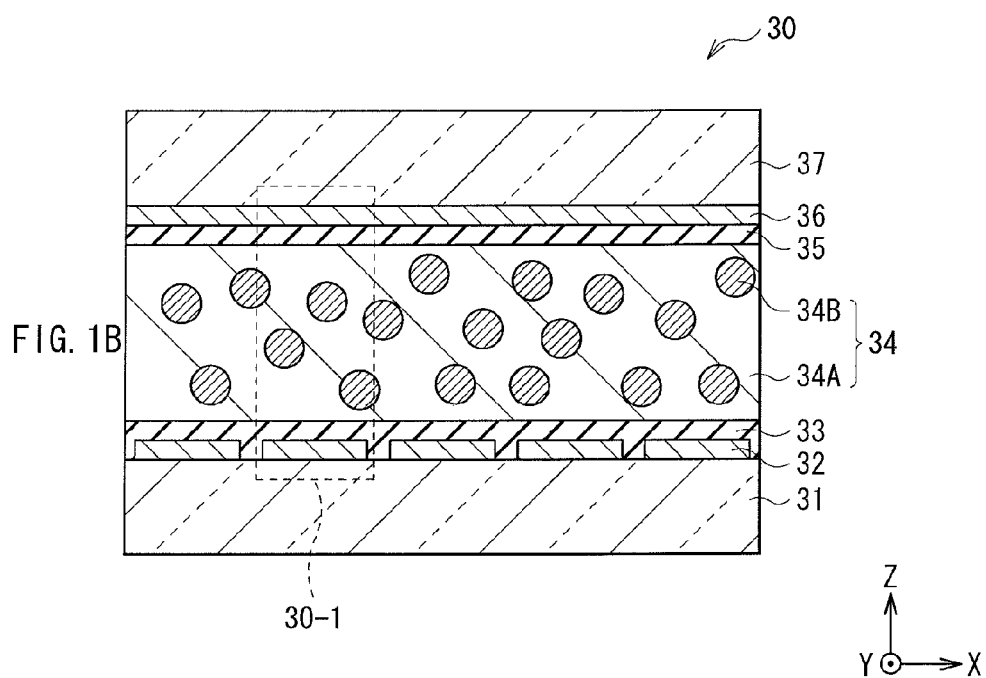

FIG. 1A illustrates an example of a cross-sectional configuration of a backlight 1 (an illumination device) according to a first embodiment. FIG. 1B illustrates an example of a cross-sectional configuration of a light modulating element 30 illustrated in FIG. 1A. Note that FIGS. 1A and 1B are schematic illustrations, and thus dimensions and shapes are not necessarily the same as actual ones. The backlight 1 illuminates a liquid crystal display panel or the like from the back thereof, and is provided with a light guide member such as a light guide plate and a light guide sheet (hereinafter referred to as a "light guide plate 10" in this embodiment), a light source 20 disposed on a side face of the light guide plate 10, the light modulating element 30 and a reflector 40 both disposed on the backside of the light guide plate 10, and a drive circuit 50 for driving the light modulating element 30, for example.

The light guide plate 10 guides light from the light source 20, disposed on the side face of the light guide plate 10, to an upper face of the backlight 1. The light guide plate 10 has a shape corresponding to a display panel (not illustrated) disposed on the upper face of the light guide plate 10. For example, the light guide plate 10 has a rectangular parallelepiped shape surrounded by the upper face, a lower face, and the side faces. In the following, the side face of the light guide plate 10 on which the light from the light source 20 is incident may be referred to as a "light incident face 10A". The light guide plate 10 has a configuration in which a predetermined pattern is formed on the upper face, on the lower face, or on both of the upper and the lower faces, and has a function of scattering the light entered from the light incident face and uniformizing the same, for example. Note that in one embodiment where a luminance is uniformized by modulating a voltage applied to the backlight 1, a flat light guide plate which is not patterned may be used as the light guide plate 10. The light guide plate 10 functions also as a supporting member which supports an optical sheet (which can be a diffuser, a diffusion sheet, a lens film, a polarization separation sheet, or other suitable optical member) disposed between the display panel and the backlight 1, for example. The light guide plate 10 mainly includes a transparent thermoplastic resin, which can be a polycarbonate resin (PC), an acrylic resin (polymethylmethacrylate (PMMA)), or other suitable material, for example.

The light source 20 is a linear light source, which can be a hot-cathode fluorescent lamp (HCFL), a CCFL, a plurality of LEDs disposed in a line, or other suitable light emitter, for example. In one embodiment where the light source 20 includes the plurality of LEDs, it is preferable, but not required, that all of the LEDs be white LEDs, in terms of efficiency, reduction in thickness, and uniformity. In alternative embodiment, the light source 20 may include red LEDs, green LEDs, and blue LEDs, for example. The light source 20 may be provided only on one side face of the light guide plate 10 as illustrated in FIG. 1A, or may be provided on two side faces, on three side faces, or on all of side faces of the light guide plate 10.

The reflector 40 returns the light, leaked from the back of the light guide plate 10 through the light modulating element 30, toward the light guide plate 10, and has functions of reflection, diffusion, scattering, and the like, for example. The reflector 40 enables to efficiently use the emission light from the light source 20, and also serves to improve a front luminance. The reflector 40 includes a material or a member, which can be foamed polyethylene terephthalate (PET), a silver-deposited film, a multilayer reflection film, white PET, or other suitable material or member.

In this embodiment, the light modulating element 30 is closely attached to the back (i.e., the lower face) of the light guide plate 10 without interposing an air layer in between. For example, the light modulating element 30 is adhered to the back of the light guide plate 10 by an adhesive (not illustrated). As illustrated in FIG. 1B, the light modulating element 30 is provided with a transparent substrate 31, a bottom electrode 32, an orientation film 33, a light modulation layer 34, an orientation film 35, a top electrode 36, and a transparent substrate 37, which are disposed in order from a side on which the reflector 40 is disposed, for example.

Figure 2:
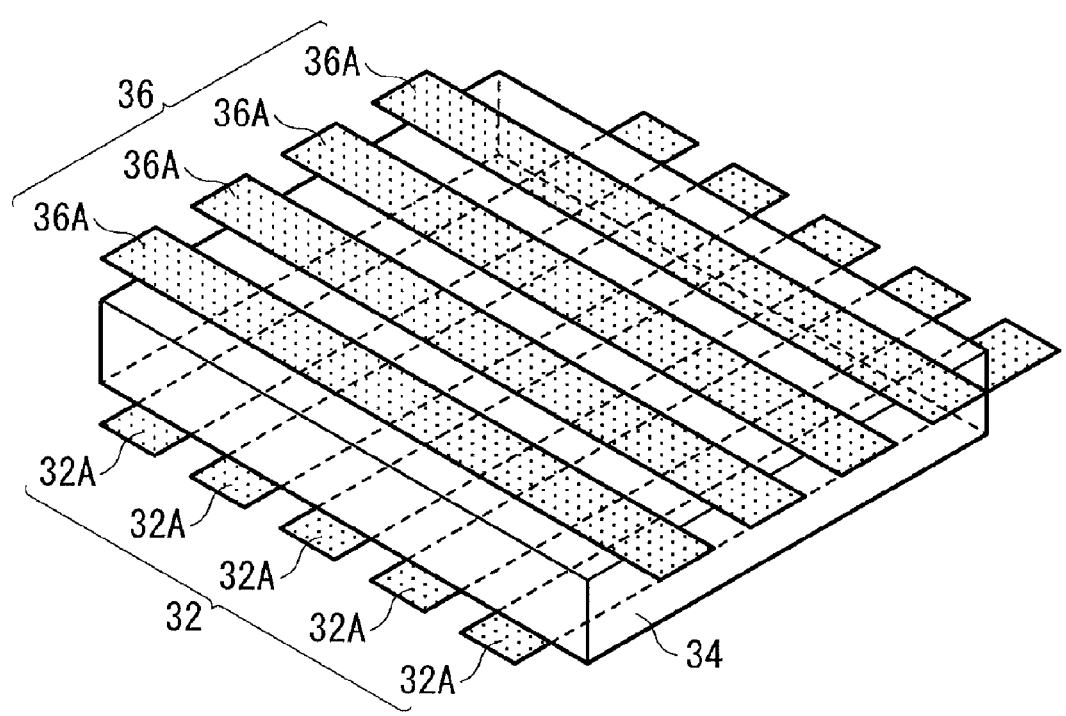
FIG. 2 is a perspective view illustrating an example of a configuration of a top electrode and a bottom electrode.

Each of the transparent substrates 31 and 37 supports the light modulation layer 34, and in many cases, is a substrate transparent to visible light, which can be a glass plate, a plastic film, or other suitable transparent member. The bottom electrode 32 is provided on a surface of the transparent substrate 31 facing the transparent substrate 37. For example, as illustrated in a partial cutout of the light modulating element 30 in FIG. 2, the bottom electrode 32 has a configuration in which band-like partial electrodes 32A, each extending in one direction in a plane, are arranged parallel to one another. The top electrode 36 is provided on a surface of the transparent substrate 37 facing the transparent substrate 31. For example, the top electrode 36 has a configuration in which band-like partial electrodes 36A, each extending in one direction in the plane in a direction crossing (i.e., orthogonal to) the extending direction of the bottom electrode 32, are arranged parallel to one another, as illustrated in FIG. 2.

A configuration (a pattern) of each of the bottom electrode 32 and the top electrode 36 depends on a driving method. For example, in one embodiment where the band-like partial electrodes 32A and 36A are arranged in parallel as described above, each of the partial electrodes 32A and 36A may be driven by a simple-matrix driving method. In one embodiment where one of the bottom electrode 32 and the top electrode 36 has a solid film and the other of the bottom electrode 32 and the top electrode 36 has a fine rectangular shape, each of the bottom electrode 32 and the top electrode 36 may be driven by an active-matrix driving method. Also, in one embodiment where one of the bottom electrode 32 and the top electrode 36 has a solid film and the other of the bottom electrode 32 and the top electrode 36 has a block configuration provided with fine interconnection lines, a segment method may be employed, where respective segmented blocks of the block configuration are driven independently, for example.

It is to be noted that the bottom electrode 32 (or the partial electrodes 32A), the top electrode 36 (or the partial electrodes 36A), or both of the bottom and the top electrodes 32 and 36 (or the partial electrodes 32A and 36A), is/are patterned. Also, a density of pattern of the electrodes in the bottom and the top electrodes 32 and 36 (or the partial electrodes 32A and 36A) to which the patterning is applied is varied depending on a distance from the light source 20. When each of the partial electrodes 32A is patterned, it is preferable, but not required, that the pattern density be varied continuously between two mutually-adjacent cells (i.e., between the two partial electrodes 32A). Similarly, when each of the partial electrodes 36A is patterned, it is preferable, but not required, that the pattern density be varied continuously between two mutually-adjacent cells (i.e., between the two partial electrodes 36A).

Figure 3A:
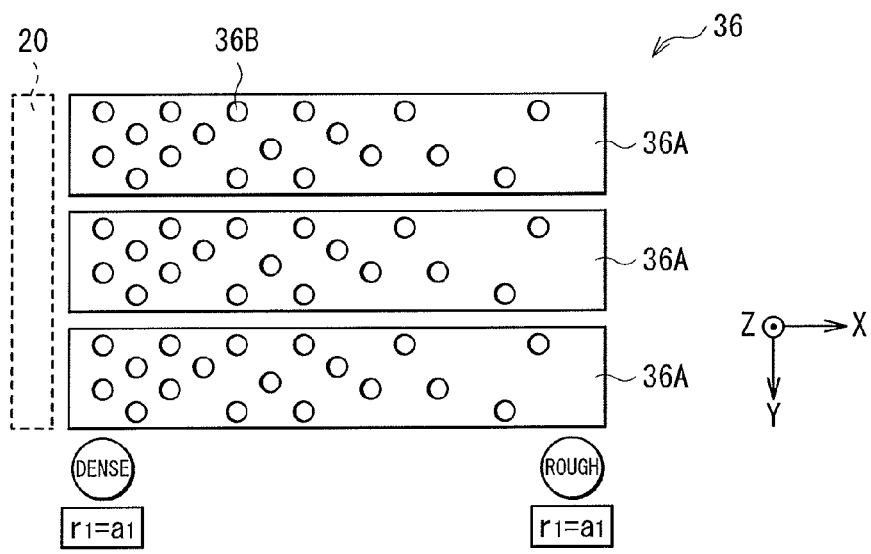
FIGS. 3A and 3B are plan views each illustrating an example of a configuration of an upper face of the top electrode illustrated in FIG. 1.
Figure 3B:
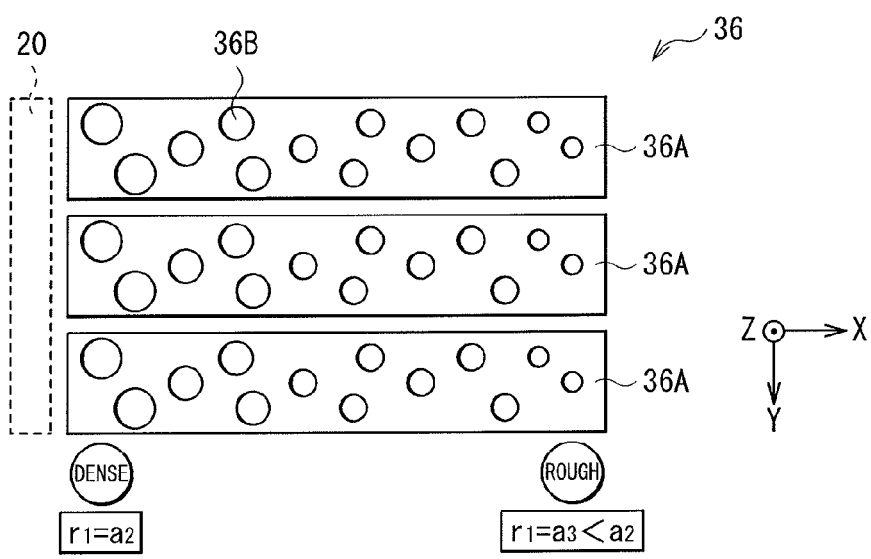

As illustrated in FIGS. 3A and 3B, when the partial electrodes 36A are patterned, each of the partial electrodes 36A is provided with a plurality of openings 36B, and a density of the openings 36B is varied depending on the distance, with respect to the top electrode 36 as a whole, from the light source 20. The opening 36B may be circular in shape as illustrated in FIGS. 3A and 3B, although the opening 36B can have an elliptical shape, a polygonal shape, or other suitable shape, for example.

In one embodiment illustrated in FIG. 3A, a diameter "r1" of each of the openings 36B is uniform regardless of the distance from the light source 20 (r1=a1), and the number of openings 36B per unit area decreases with increasing distance from the light source 20. In one embodiment illustrated in FIG. 3B, the number of openings 36B per unit area is constant regardless of the distance from the light source 20, and the diameters r1 of the openings 36B decrease with increasing distance from the light source 20. In FIG. 3B, note that the diameter r1 near the light source 20 is "a2", and the diameter r1 most distant from the light source 20 is "a3" (<a2). Thus, in each of the embodiments illustrated in FIGS. 3A and 3B, the density of the openings 36B (i.e., an occupancy of openings 36B per unit area) is rough or decreased with increasing distance from the light source 20. In other words, the pattern density of the top electrode 36 (i.e., an occupancy of a region per unit area in the top electrode 36 excluding the openings 36B) is dense or increased with increasing distance from the light source 20.

Figure 4A:
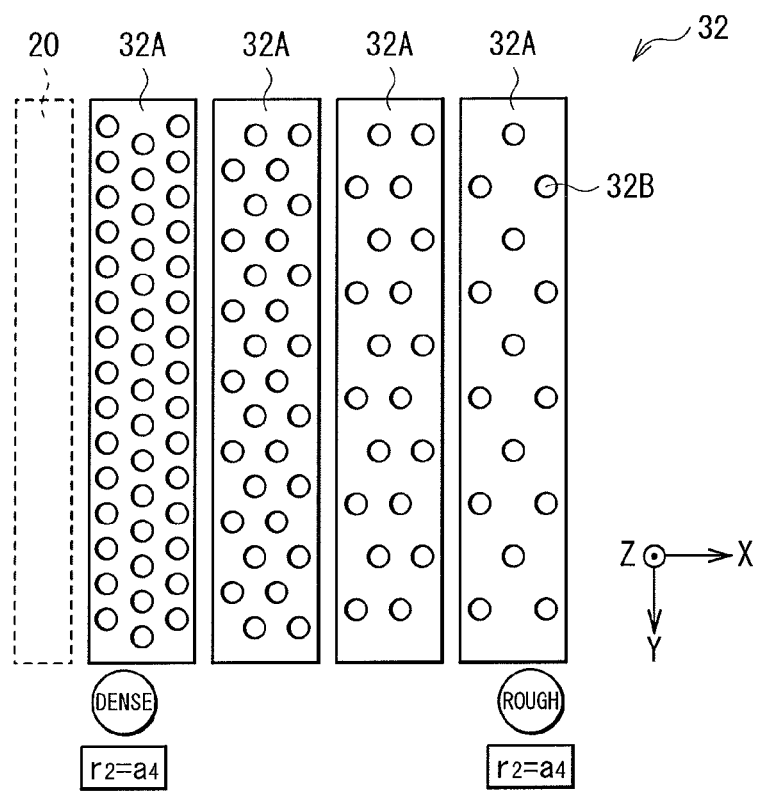
FIGS. 4A and 4B are plan views each illustrating an example of a configuration of an upper face of the bottom electrode illustrated in FIG. 1.
Figure 4B:
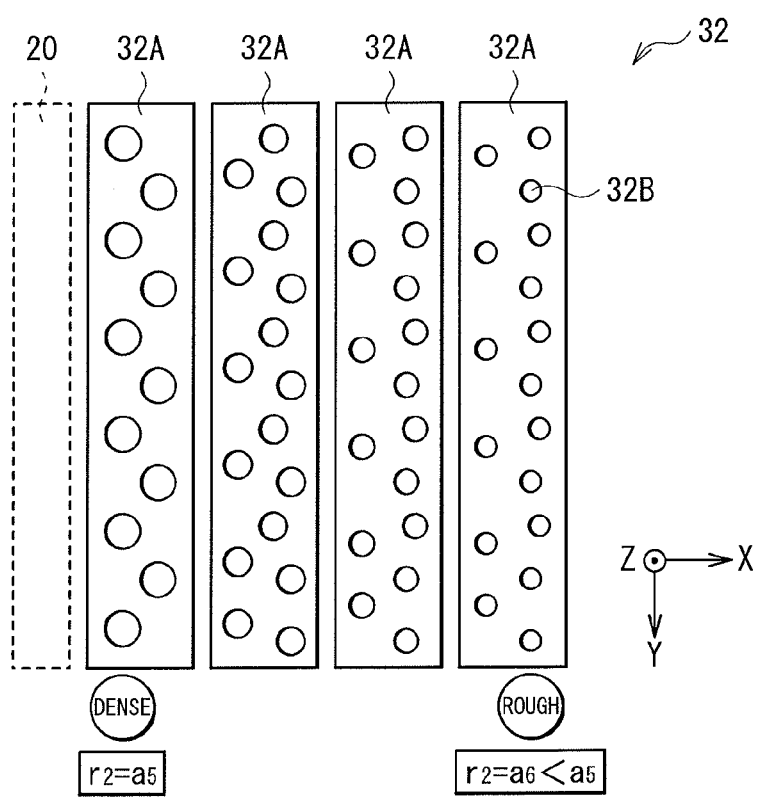

As illustrated in FIGS. 4A and 4B, when the partial electrodes 32A are patterned, each of the partial electrodes 32A is provided with a plurality of openings 32B, and a density of the openings 32B is varied depending on the distance, with respect to the bottom electrode 32 as a whole, from the light source 20. As for each of the partial electrodes 32A, the density of the openings 32B may be varied depending on the distance from the light source 20, or may be uniform regardless of the distance from the light source 20. The opening 32B may be circular in shape as illustrated in FIGS. 4A and 4B, although the opening 32B can have an elliptical shape, a polygonal shape, or other suitable shape, for example. In one embodiment illustrated in FIG. 4A, a diameter "r2" of each of the openings 32B is uniform regardless of the distance from the light source 20 (r2=a4), and the number of openings 32B per unit area decreases with increasing distance from the light source 20. In one embodiment illustrated in FIG. 4B, the number of openings 32B per unit area is constant regardless of the distance from the light source 20, and the diameters r2 of the openings 32B decrease with increasing distance from the light source 20. In FIG. 4B, note that the diameter r2 near the light source 20 is "a5", and the diameter r2 most distant from the light source 20 is "a6" (<a5). Thus, in each of the embodiments illustrated in FIGS. 4A and 4B, the density of the openings 32B (i.e., an occupancy of openings 32B per unit area) is rough or decreased with increasing distance from the light source 20. In other words, the pattern density of the bottom electrode 32 (i.e., an occupancy of a region per unit area in the bottom electrode 32 excluding the openings 32B) is dense or increased with increasing distance from the light source 20.

When both of the partial electrodes 32A and the partial electrodes 36A are patterned, the partial electrodes 36A are patterned as illustrated in FIGS. 3A and 3B, and the partial electrodes 32A are patterned as illustrated in FIGS. 4A and 4B, for example. In one embodiment where both of the partial electrodes 32A and the partial electrodes 36A are patterned, the pattern density of the partial electrodes 32A or the partial electrodes 36A may not have to be varied depending on the distance from the light source 20. That is, the pattern density of the partial electrodes 32A (i.e., the density of the openings 32B) may be varied depending on the distance, with respect to the bottom electrode 32 as a whole, from the light source 20, or the pattern density of the partial electrodes 36A (i.e., the density of the openings 36B) may be varied depending on the distance, with respect to the top electrode 36 as a whole, from the light source 20.

Figure 5A:
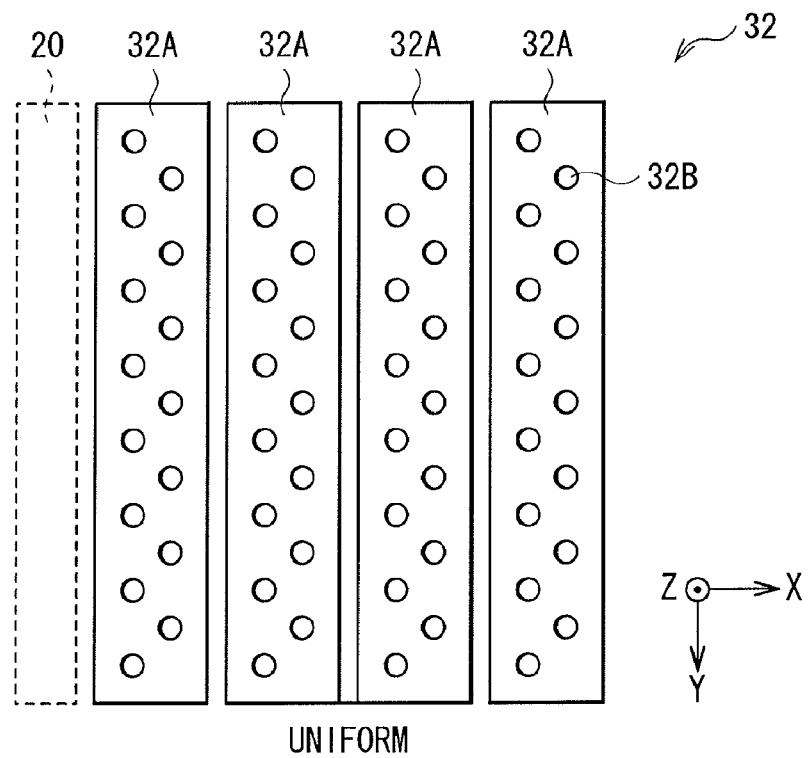
FIGS. 5A and 5B are plan views each illustrating another example of the configuration of the upper face of the top electrode illustrated in FIG. 1.
Figure 5B:
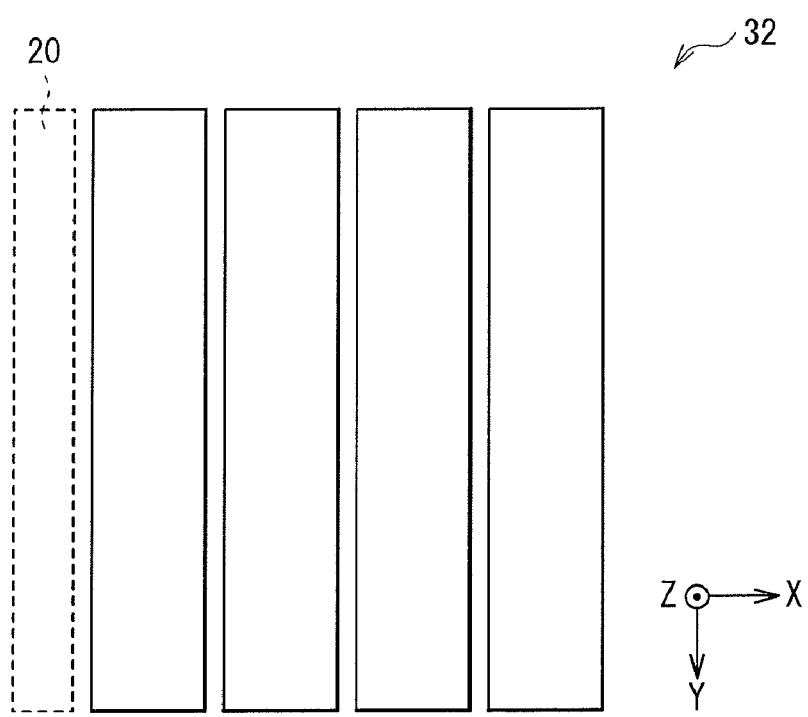

Referring to FIG. 5A, when the pattern density of the partial electrodes 36A is varied depending on the distance, with respect to the top electrode 36 as a whole, from the light source 20, the partial electrodes 32A may be provided with the plurality of opening 32B, and the density of the openings 32B may be uniform regardless of the distance from the light source 20. In one embodiment where the pattern density of the partial electrodes 36A is varied depending on the distance, with respect to the top electrode 36 as a whole, from the light source 20, each of the partial electrodes 32A may have a flat configuration having no openings, notches, or the like, without providing the patterns on the partial electrodes 32A, as illustrated in FIG. 5B.

Referring to FIG. 6A, when the pattern density of the partial electrodes 32A is varied depending on the distance, with respect to the bottom electrode 32 as a whole, from the light source 20, the partial electrodes 36A may be provided with the plurality of opening 36B, and the density of the openings 36B may be uniform regardless of the distance from the light source 20. In one embodiment where the pattern density of the partial electrodes 32A is varied depending on the distance, with respect to the bottom electrode 32 as a whole, from the light source 20, each of the partial electrodes 36A may have a flat configuration having no openings, notches, or the like, without providing the patterns on the partial electrodes 36A, as illustrated in FIG. 6B.

When both of the partial electrodes 32A and the partial electrodes 36A are patterned, the opening 32B may be provided at a position opposed completely to the opening 36B. However, it is preferable, but not required, that the opening 32B be provided at a position opposed partially to the opening 36B, or provided at a position not opposed to the opening 36B. Also, when both of the partial electrodes 32A and the partial electrodes 36A are patterned, the diameter of the opening 32B and that of the opening 36B are equal to each other, or may be different from each other.

At least the top electrode 36 (the electrodes on the upper face side of the backlight 1) in the bottom electrode 32 and the top electrode 36 includes a transparent conductive material, which can be indium tin oxide (ITO) or other suitable material. The bottom electrode 32 (the electrodes on the lower face side of the backlight 1) may not include a transparent material. For example, the bottom electrode 32 may include a metal. In one embodiment where the bottom electrode 32 is configured of a metal, the bottom electrode 32 also has a function of reflecting the light entering the light modulating element 30 from the back of the light guide plate 10, as with the reflector 40. Thus, the reflector 40 may not be provided as illustrated in FIG. 7, for example.

When the bottom electrode 32 and the top electrode 36 are seen from a direction of normal of the light modulating element 30, each region corresponding to a portion where the bottom electrode 32 and the top electrode 36 face each other in the light modulating element 30 structures a light modulating cell 30-1. Each of the light modulating cells 30-1 may be independently driven by applying a predetermined voltage to the bottom electrode 32 and the top electrode 36, and expresses a transparency or a scattering property to the light from the light source 20 in accordance with a magnitude of voltage value applied to the bottom electrode 32 and the top electrode 36. The transparency and the scattering property will be described in greater detail when description is made on the light modulation layer 34.

The orientation films 33 and 35 are provided to orientate liquid crystals or monomers used for the light modulation layer 34, for example. As the orientation films, there are a vertical orientation film and a horizontal orientation film, for example. This embodiment advantageously uses the horizontal orientation films for the orientation films 33 and 35. Examples of the horizontal orientation films include: an orientation film obtained by performing a rubbing process on a material, which can be polyimide, polyamide-imide, polyvinyl alcohol, or other suitable material; and an orientation film having grooves formed by a process such as a transfer process and an etching process. Further, examples of the horizontal orientation films include: an orientation film obtained by obliquely depositing an inorganic material, which can be silicon oxide or other suitable material; an orientation film including diamond-like carbon obtained by ion-beam irradiation; and an orientation film formed with slits of electrode pattern. Also, when using plastic films for the transparent substrates 31 and 37, it is preferable, but not required, that a baking temperature after applying the orientation films 33 and 35 on the surfaces of the transparent substrates 31 and 37 respectively in a manufacturing process be as low as possible. Thus, it is preferable, but not required, that polyamide-imide, capable of forming at a temperature of 100 degrees centigrade or below, be used as the orientation films 33 and 35.

It is sufficient for each of the vertical and horizontal orientation films to have the function of orientating the liquid crystals and the monomers, and reliability for repetitive application of voltage requested in an ordinary liquid crystal display or the like may be unnecessary, since the reliability for the voltage application after formation of a device is determined by an interface between a material formed by polymerizing the monomers and the liquid crystals. It is to be noted that the liquid crystals and the monomers used for the light modulation layer 34 may be orientated without using the orientation films, by applying an electric field or a magnetic field across the bottom electrode 32 and the top electrode 36, for example. More specifically, the electric field or the magnetic field may be applied across the bottom electrode 32 and the top electrode 36 while irradiating ultraviolet light to fix an orientation state of the liquid crystals and the monomers in a state where the voltage is applied. In one embodiment where the voltage is used for forming the orientation films, an electrode for orientation and an electrode for driving may be separately formed; or dual-frequency liquid crystals in which a sign of dielectric-constant anisotropy is inverted according to a frequency may be used as a liquid crystal material, for example. Also, in one embodiment where the magnetic field is used for the formation of the orientation films, a material having a high magnetic susceptibility anisotropy can be preferably used. For example, it is preferable, but not required, that a material having a large number of benzene rings be used as the material of the orientation films.

As illustrated in FIG. 1B, the light modulation layer 34 is a composite layer including a bulk 34A (a second region) and a plurality of microparticles 34B (a first region) dispersed in the bulk 34A, for example. The bulk 34A and the microparticles 34B both have an optical anisotropy.

Figure 8A:
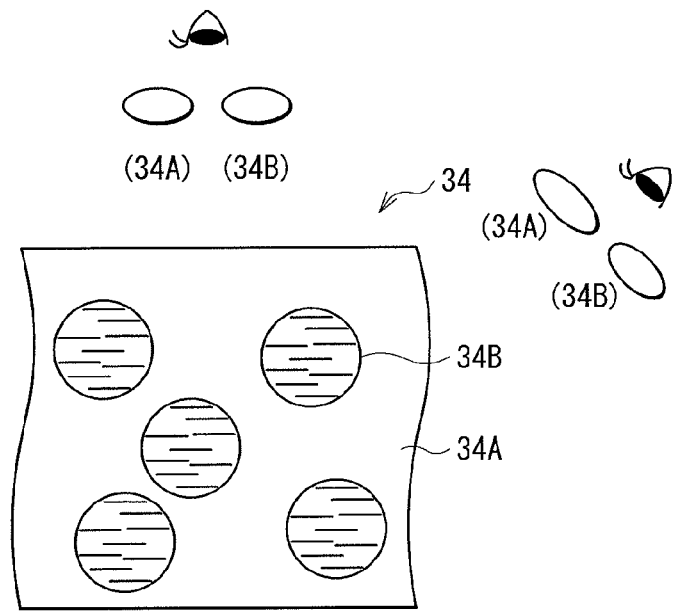
FIGS. 8A to 8C are schematic illustrations for describing an example of an operation of a light modulating element illustrated in FIG. 1.
Figure 8B:
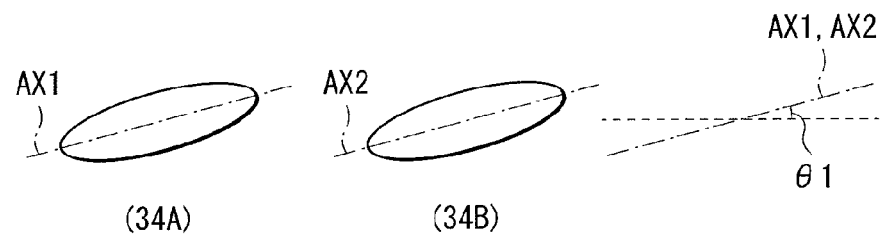
Figure 8C:
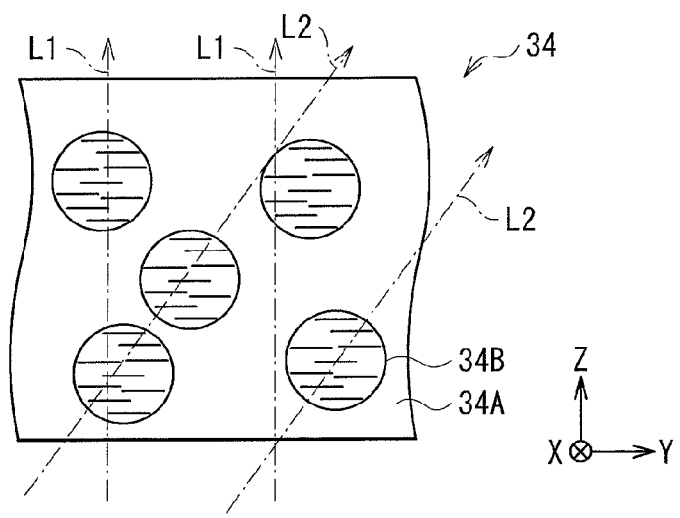

FIG. 8A schematically illustrates an example of an orientation state in the microparticles 34B when no voltage is applied across the bottom electrode 32 and the top electrode 36. Note that the orientation state in the bulk 34A is not illustrated in FIG. 8A. FIG. 8B illustrates an example of refractive-index ellipsoidal bodies expressing a refractive index anisotropy of the bulk 34A and the microparticles 34B when no voltage is applied across the bottom electrode 32 and the top electrode 36. The refractive-index ellipsoidal body expresses refractive indices of linearly polarized light entering from various directions by a tensor ellipsoid. The refractive-index ellipsoidal body can be utilized to know the refractive index geometrically by observing a cross-section of the ellipsoidal body from a direction in which the light is incident. FIG. 8C schematically illustrates an example of a state where light L1 traveling in a front direction and light L2 traveling in an oblique direction transmit through the light modulation layer 34 when no voltage is applied across the bottom electrode 32 and the top electrode 36.

Figure 9A:
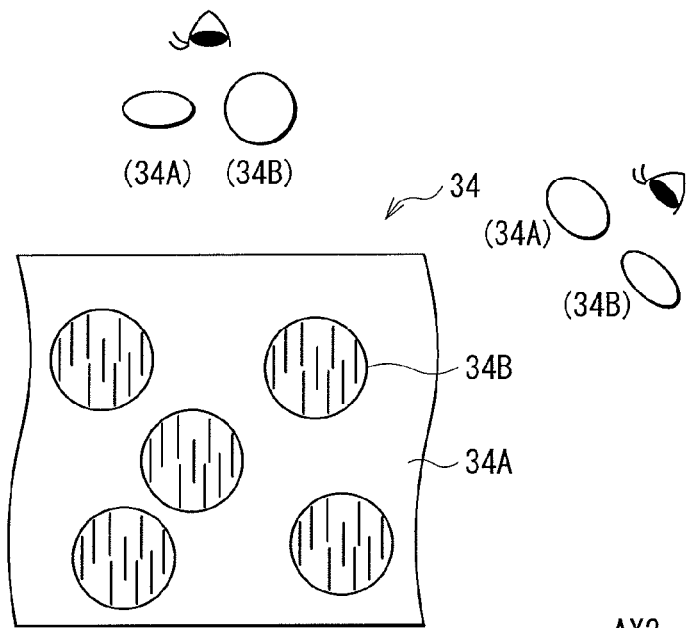
FIGS. 9A to 9C are schematic illustrations for describing another example of the operation of the light modulating element illustrated in FIG. 1.
Figure 9B:
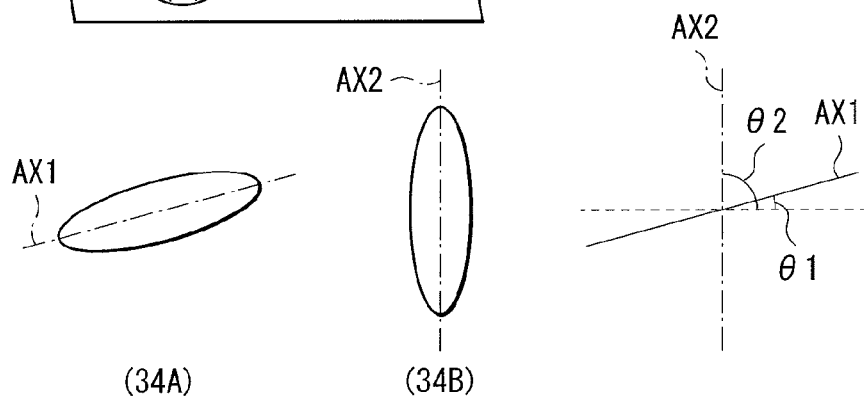
Figure 9C:
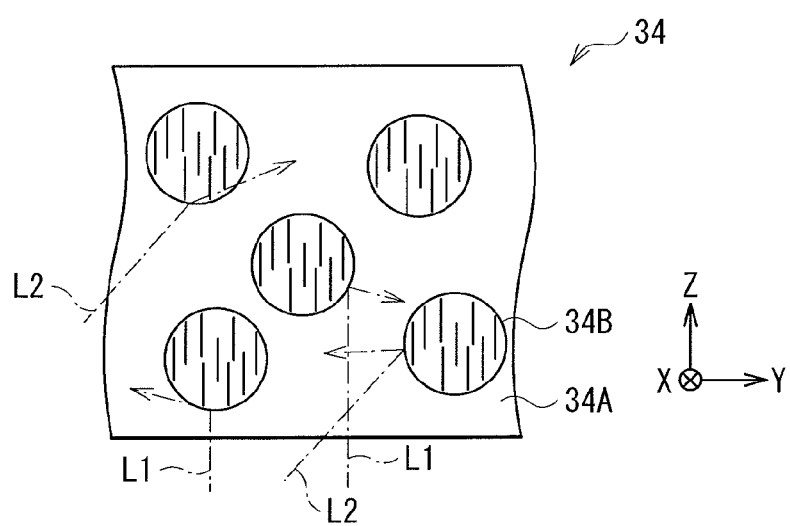

FIG. 9A schematically illustrates an example of an orientation state in the microparticles 34B when the voltage is applied across the bottom electrode 32 and the top electrode 36. Note that the orientation state in the bulk 34A is not illustrated in FIG. 9A. FIG. 9B illustrates an example of the refractive-index ellipsoidal bodies expressing the refractive-index anisotropy of the bulk 34A and the microparticles 34B when the voltage is applied across the bottom electrode 32 and the top electrode 36. FIG. 9C schematically illustrates an example of a state where the light L1 traveling in the front direction and the light L2 traveling in the oblique direction are scattered in the light modulation layer 34 when the voltage is applied across the bottom electrode 32 and the top electrode 36.

As illustrated in FIGS. 8A and 8B, the bulk 34A and the microparticle 34B are so structured that an orientation of an optical axis AX1 of the bulk 34A and an orientation of an optical axis AX2 of the microparticle 34B coincide with each other (i.e., are parallel to each other) when no voltage is applied across the bottom electrode 32 and the top electrode 36, for example. The optical axes AX1 and AX2 here each refer to such a line parallel to a traveling direction of light ray by which a refractive index has a certain one value irrespective of a polarization direction. It is to be noted that the orientations of the optical axes AX1 and AX2 do not necessarily have to be coincident with each other. The orientations of the optical axes AX1 and AX2 may be slightly deviated from each other due to a manufacturing error or the like, for example.

Also, the microparticle 34B is so structured that the optical axis AX2 becomes parallel to the light incident face 10A of the light guide plate 10 when no voltage is applied across the bottom electrode 32 and the top electrode 36, for example. Further, as illustrated in FIG. 8B, the microparticle 34B is so structured that the optical axis AX2 intersects the surfaces of the transparent substrates 31 and 37 at a slight angle θ1 (a first angle) when no voltage is applied across the bottom electrode 32 and the top electrode 36, for example. The angle θ1 will be described in greater detail when description is made on a material structuring the microparticles 34B.

On the other hand, the bulk 34A is so structured that the optical axis AX1 of the bulk 34A becomes uniform regardless of the presence of the voltage application across the bottom electrode 32 and the top electrode 36, for example. More specifically, as illustrated in FIGS. 8A, 8B, 9A, and 9B, the bulk 34A is so structured that the optical axis AX1 of the bulk 34A becomes parallel to the light incident face 10A of the light guide plate 10, and that the optical axis AX1 also intersects the surfaces of the transparent substrates 31 and 37 at a predetermined angle θ1 (the first angle), for example. That is, the optical axis AX1 of the bulk 34A is parallel to the optical axis AX2 of the microparticle 34B when no voltage is applied across the bottom electrode 32 and the top electrode 36.

Note that the optical axis AX2 does not necessarily have to be parallel to the light incident face 10A of the light guide plate 10 and intersects the surfaces of the transparent substrates 31 and 37 at the angle θ1. The surfaces of the transparent substrates 31 and 37 and the angle θ1 may intersect each other at an angle slightly different from the angle θ1, due to a manufacturing error or the like, for example. Also, the optical axes AX1 and AX2 do not necessarily have to be parallel to the light incident face 10A of the light guide plate 10. The optical axes AX1 and AX2 may intersect the light incident face 10A of the light guide plate 10 at a small angle, due to a manufacturing error or the like, for example.

It is preferable, but not required, that an ordinary light refractive index of the bulk 34A and that of the microparticle 34B be equal to each other, and an extraordinary light refractive index of the bulk 34A and that of the microparticle 34B be equal to each other. In this case, for example, when no voltage is applied across the bottom electrode 32 and the top electrode 36, there is hardly any difference in the refractive index in all of directions including the front direction and oblique directions as illustrated in FIG. 8B, and thus high transparency is obtained. Thereby, as illustrated in FIG. 8C, the light L1 traveling in the front direction and the light L2 traveling in the oblique direction transmit through the light modulation layer 34 without being scattered in the light modulation layer 34, for example. As a result, as illustrated in Part (A) and Part (B) of FIG. 10, light L from the light source 20 (i.e., the light from the oblique direction) is totally reflected by an interface of a transparent region 30A (i.e., an interface between the transparent substrate 31 or the light guide plate 10 and air), for example. Consequently, a luminance of the transparent region 30A (a luminance in black displaying) becomes lower than that in a case where the light modulating element 30 is not provided (denoted by a long-dashed-short-dashed line in Part (B) of FIG. 10).

Also, as illustrated in FIG. 9B, the bulk 34A and the microparticle 34B are so structured that the orientation of the optical axis AX1 and the orientation of the optical axis AX2 become different from each other (i.e., intersect each other) when the voltage is applied across the bottom electrode 32 and the top electrode 36. Further, the microparticle 34B is so structured that the optical axis AX2 of the microparticle 34B becomes parallel to the light incident face 10A of the light guide plate 10, and that the optical axis AX2 also intersects the surfaces of the transparent substrates 31 and 37 at an angle θ2 larger than the angle θ1 (a second angle), for example. The second angle θ2 in one embodiment illustrated in FIG. 9B is 90 degrees, although it is not limited thereto. The angle θ2 will be described in greater detail when description is made on a material structuring the microparticles 34B.

Thus, when the voltage is applied across the bottom electrode 32 and the top electrode 36, the difference in the refractive index increases in all of the directions including the front direction and the oblique directions in the light modulation layer 34, and thus high scattering property is obtained. Thereby, as illustrated in FIG. 9C, the light L1 traveling in the front direction and the light L2 traveling in the oblique direction are scattered in the light modulation layer 34, for example. As a result, as illustrated in Part (A) and Part (B) of FIG. 10, the light L from the light source 20 (i.e., the light from the oblique direction) transmits through the interface of the scatter region 30B (i.e., the interface between the transparent substrate 31 or the light guide plate 10 and air), and the light having transmitted therethrough toward the reflector 40 is reflected by the reflector 40, and transmits through the light modulating element 30, for example. Consequently, the luminance of the scatter region 30B becomes extremely higher than that in the case where the light modulation layer 30 is not provided (denoted by a long-dashed-short-dashed line in Part (B) of FIG. 10), and moreover, a luminance in partial white displaying (a luminance protrusion) increases by a decreased amount of the luminance in the transparent region 30A.

The ordinary light refractive index of the bulk 34A and that of the microparticle 34B may be slightly deviated from each other due to a manufacturing error or the like, and is preferably 0.1 or less, and is more preferably 0.05 or less, for example. The extraordinary light refractive index of the bulk 34A and that of the microparticle 34B may also be slightly deviated from each other due to the manufacturing error or the like, and is preferably 0.1 or less, and is more preferably 0.05 or less, for example.

Also, it is preferable, but not required, that the refractive index difference ($\Delta n_0$=extraordinary light refractive index $n_1$–ordinary light refractive index $n_0$) of the bulk 34A and the refractive index difference ($\Delta n_1$=extraordinary light refractive index $n_3$–ordinary light refractive index $n_2$) of the microparticle 34B be as large as possible. For example, the refractive index difference of the bulk 34A and the refractive index difference of the microparticle 34B are preferably 0.05 or larger, more preferably 0.1 or larger, and yet preferably 0.15 or larger. This is because the scattering power of the light modulation layer 34 becomes higher when the refractive index differences of the bulk 34A and the microparticle 34B are large, thereby making it possible to easily break conditions for guiding the light, and to easily extract the light from the light guide plate 10.

The bulk 34A and the microparticle 34B each have a mutually-different rate of response to the electric field. For example, the bulk 34A has a streaky structure or a porous structure which does not respond to the electric field, or has a rod structure whose response rate is lower than that of the microparticle 34B. The bulk 34A is formed by a high-molecular material obtained by polymerizing a low-molecular material (monomer), for example. In one embodiment, the bulk 34A is formed by polymerizing, with heat, light, or both, a material (for example, monomer) having an orientation property and a polymerization property, oriented along the orientation direction of the microparticles 34B or the orientation direction of the orientation films 33 and 35.

On the other hand, the microparticle 34B mainly includes a liquid crystal material, and has the response rate sufficiently higher than that of the bulk 34A, for example. The liquid crystal material (liquid crystal molecules) contained in the microparticles 34B includes rod-like molecules, for example. It is preferable, but not required, that the liquid crystal molecules have a positive dielectric anisotropy (a so-called positive liquid crystal).

A long axis direction of the liquid crystal molecules in the microparticle 34B is parallel to the optical axis AX2 when no voltage is applied across the bottom electrode 32 and the top electrode 36. At this time, a long axis of the liquid crystal molecules in the microparticle 34B is parallel to the light incident face 10A of the light guide plate 10, and also intersects the surfaces of the transparent substrates 31 and 37 at the slight angle θ1. The angle θ1 is a small angle of about one degree, and is a so-called pretilt angle. In other words, the liquid crystal molecules in the microparticle 34B are oriented in a state in which the liquid crystal molecules are tilted at the angle θ1 in a plane parallel to the light incident face 10A of the light guide plate 10, when no voltage is applied across the bottom electrode 32 and the top electrode 36.

When the voltage is applied across the bottom electrode 32 and the top electrode 36, the long axis direction of the liquid crystal molecules in the microparticle 34B intersects (or is orthogonal to) the optical axis AX2. At this time, the long axis of the liquid crystal molecules in the microparticle 34B is parallel to the light incident face 10A of the light guide plate 10, and also intersects the surfaces of the transparent substrates 31 and 37 at the angle θ2 larger than the angle θ1 (for example but not limited to 90 degrees). In other words, the liquid crystal molecules in the microparticle 34B are oriented in a state in which the liquid crystal molecules are tilted at the angle θ2 in a plane parallel to the light incident face 10A of the light guide plate 10, or oriented in a state in which the liquid crystal molecules are stood up straight at the at the angle θ2 (=90 degrees), when the voltage is applied across the bottom electrode 32 and the top electrode 36.

The monomers having the orientation property and the polymerization property described above can be a material, having an optical anisotropy and which are combined with the liquid crystals. In this embodiment, it is preferable, but not required, that the monomers having the orientation property and the polymerization property be low-polymer monomers which are cured by ultraviolet light. Herein, a direction of the optical anisotropy of the liquid crystals and that of a material (high-polymer material) obtained by polymerizing the low-polymer monomers preferably coincide with each other in the state in which the voltage is not applied. Thus, it is preferable, but not required, that the liquid crystals and the low-polymer monomers be oriented in the same direction before curing with the ultraviolet light. Also, in one embodiment where the liquid crystals are used as the microparticles 34B, it is preferable, but not required, that the shape of the monomer material used be a rod-like shape as well, when the liquid crystals include the rod-like molecules. For these reasons, it is preferable, but not required, that the material having the polymerization property and the liquid crystal property be used for the monomer material. For example, it is preferable to have at least one functional group selected from a group of an acrylate group, a methacrylate group, an acryloyloxy group, a methacryloyloxy group, a vinyl ether group, and an epoxy group, as a polymerizable functional group. These functional groups may be polymerized by irradiating ultraviolet light, infrared light, or an electron beam thereon, or heating the same. A liquid crystal material having a polyfunctional group may be added to suppress a decrease in a degree of orientation at the time of the ultraviolet irradiation.

The drive circuit 50 controls a magnitude of the voltage applied to the pair of electrodes (i.e., the bottom electrode 32 and the top electrode 36) in each of the light modulating cells 30-1, so that the optical axis AX2 of the microparticle 34B becomes parallel (or substantially parallel) to the optical axis AX1 of the bulk 34A in one of the light modulating cells 30-1, and that the optical axis AX2 of the microparticle 34B intersects (or becomes orthogonal to) the optical axis AX1 of the bulk 34A in other light modulating cell 30-1, for example. In other words, the drive circuit 50 is possible to allow the orientation of the optical axis AX1 of the bulk 34A and the orientation of the optical axis AX2 of the microparticle 34B to coincide each other (or to substantially coincide each other), or to be different from each other (or to be orthogonal to each other), by an electric field control.

Now, a method of manufacturing the backlight 1 according to this embodiment will be described below with reference to FIGS. 11A-11C to 13A-13C.

Figure 11A:
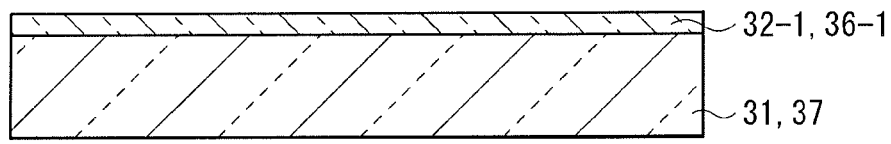
FIGS. 11A to 11C are cross-sectional views for describing manufacturing processes of the backlight illustrated in FIG. 1.
Figure 11B:
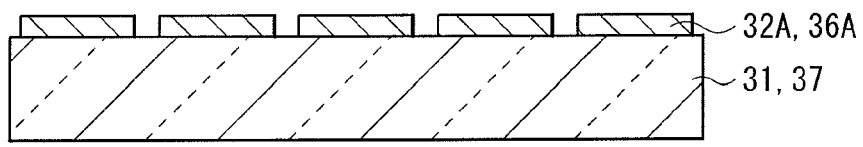

First, as illustrated in FIG. 11A, transparent conductive films 32-1 and 36-1 are formed on the transparent substrates 31 and 37, respectively. The transparent conductive films 32-1 and 36-1 can be ITO, and the transparent substrates 31 and 37 can be glass substrates or plastic film substrates, for example. Then, as illustrated in FIG. 11B, a resist layer is formed on the entire surface thereof, and thereafter, an electrode pattern is formed in the resist layer by patterning. Thereby, the plurality of partial electrodes 32A and the plurality of partial electrodes 36A are formed. Herein, the pattern, in which the pattern density is varied depending on the distance from the light source 20, is formed for the partial electrodes 32A or the partial electrodes 36A (unillustrated in this drawing).

A method for the patterning used herein can be a photolithography method, a laser processing method, a pattern printing method, a screen printing method, or other suitable method. Alternatively, the patterning may be achieved by performing a screen printing with a "HyperEtch" material, available from Merck Ltd., Japan located in Tokyo, Japan, then performing predetermined heating, and then performing rinsing with water. The electrode pattern is determined by the driving method, and the number of divisions of partial driving. For example, when dividing a 42-inch display into 12-by-6 pieces, a width of electrode may be about 80 mm, and a width of a slit between electrodes may be about 500 micrometers (μm). A material of the electrode can be ITO, IZO, ZnO, or other suitable material. This electrode material may be used for both of the bottom electrode 32 and the top electrode 36. Alternatively, that electrode material may be used only for one of the bottom electrode 32 and the top electrode 36, and a metal material having a high reflectivity may be used for the other of the bottom electrode 32 and the top electrode 36.

Figure 11C:
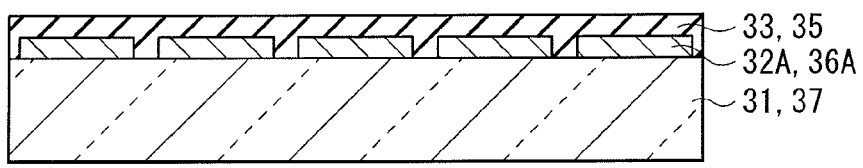

Then, as illustrated in FIG. 11C, the orientation films 33 and 35 are applied on the entire surface thereof, and are then dried and burned. In one embodiment where a polyimide-based material is used for the orientation films 33 and 35, NMP (N-methyl-2-pyrrolidone) may be used as a solvent, with a temperature in the atmosphere can be about 200 degrees centigrade. When using the plastic substrates as the transparent substrates 31 and 37, the orientation films 33 and 35 may be vacuum-dried at 100 degrees centigrade and burned. Thereafter, the rubbing process is performed on each of the orientation films 33 and 35. Thereby, each of the orientation films 33 and 35 functions as the horizontal orientation films, making it possible to form a pretilt in a rubbing direction of each of the orientation films 33 and 35.

Figure 12A:
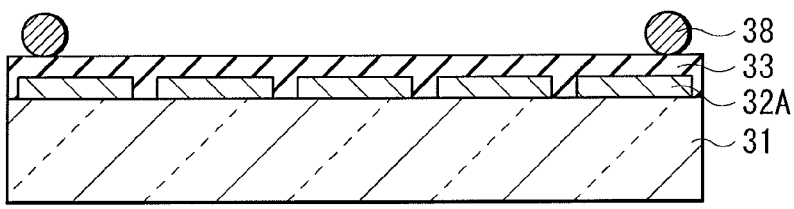
FIGS. 12A to 12C are cross-sectional views for describing manufacturing processes subsequent to that of FIG. 11C.

Then, as illustrated in FIG. 12A, spacers 38 for forming cell-gaps are sprayed on the orientation film 33 with a dry method or a wet method. In one embodiment where the light modulating cells 30-1 are formed by a vacuum joining method, the spacers 38 may be mixed beforehand in a mixture to be dropped. Alternatively, columnar spacers may be formed by a photolithography method, instead of the spacers 38.

Figure 12B:
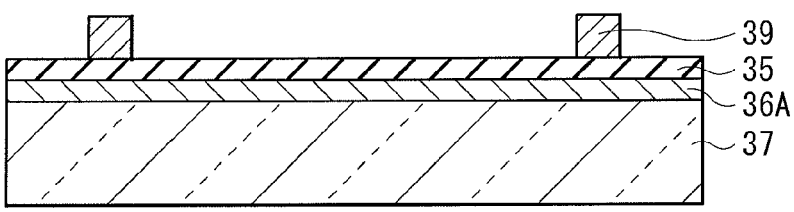

Then, as illustrated in FIG. 12B, a seal agent 39 for attachment and preventing leakage of the liquid crystal is applied on the orientation film 35. The seal agent 39 may be applied in a frame shape, for example. A pattern of the seal agent 39 may be formed by a dispenser method, a screen printing method, or other suitable method.

In the following, the vacuum joining method (a one-drop-fill method, or an "ODF method") will be described. Note that the light modulating cells 30-1 may also be formed by a vacuum injection method or the like.

Figure 12C:
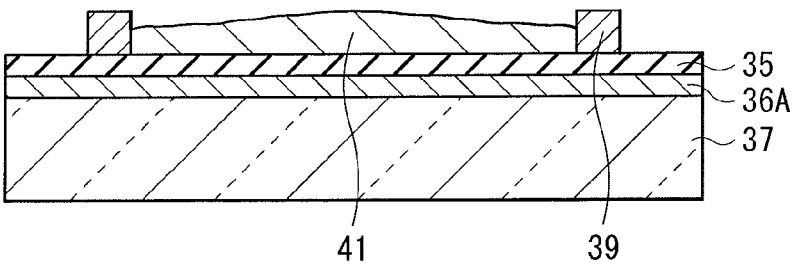

First, as illustrated in FIG. 12C, a mixture 41 of liquid crystals and monomers, corresponding to a volume determined by a cell gap, a cell area, or the like, is dropped uniformly within a plane. It is preferable, but not required, that the mixture 41 be dropped using a linear guide precise dispenser. Alternatively, the pattern of the seal agent 39 may be utilized as a bank to use a die coater or the like.

The materials described before may be used as the liquid crystals and the monomers. A ratio by weight between the liquid crystals and the monomers is 98:2 to 50:50, preferably 95:5 to 75:25, and more preferably 92:8 to 85:15. It is possible to lower a drive voltage by increasing the ratio of the liquid crystals. However, there may be a tendency that, when the liquid crystals are increased too much, a degree of white at the time of the voltage application may be decreased, or the response rate after turning-off of the voltage may be decreased and a state may not easily return to a transparent state.

Besides the liquid crystals and the monomers, a polymerization initiator may be added to the mixture 41. A monomer ratio of the polymerization initiator to be added may be adjusted in a range of 0.1 to 10% by weight in accordance with an ultraviolet wavelength used. Optionally, the mixture may be added with other additives as necessary, which can be a polymerization inhibitor, a plasticizer, a viscosity modifier, or other suitable additive. When the monomers are a solid or gel at a room temperature, it is preferable, but not required, that members such as a cap, a syringe, and a substrate be warmed.

Figure 13A:
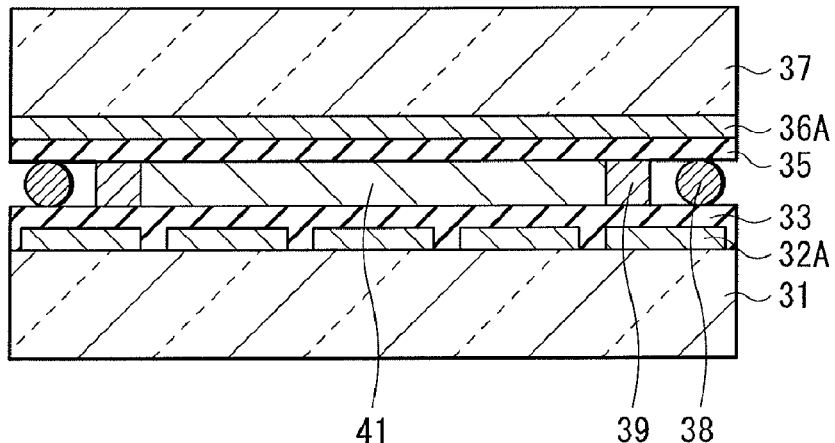
FIGS. 13A to 13C are cross-sectional views for describing manufacturing processes subsequent to that of FIG. 12C.

Then, as illustrated in FIG. 13A, the transparent substrates 31 and 37 are disposed in an unillustrated vacuum joining system, and thereafter, evacuation is performed to join the transparent substrates 31 and 37. The resultant is then released to the atmosphere to uniformize the cell-gaps by uniform pressurization of atmospheric pressure. The cell-gap may be selected as needed based on a relationship between a white luminance (the degree of whiteness) and the drive voltage. For example, the cell-gap is 5 to 40 micrometers (μm), preferably 6 to 20 micrometers, and more preferably 7 to 10 micrometers.

Figure 13B:
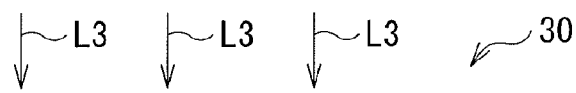
Figure 13B:
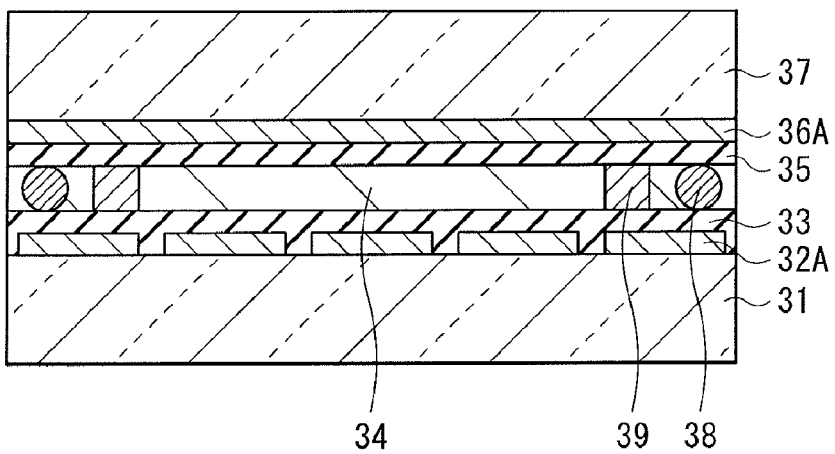
Figure 13C:

After the joining operation, it is preferable, but not required, that an orientating process be performed as necessary (not illustrated). In a case where alignment irregularities are generated by an insertion of the joined cells between Crossed-Nicol polarizers, the cells may be heated for a predetermined time or left at a room temperature to orientate the same. Thereafter, as illustrated in FIG. 13B, ultraviolet rays L3 are irradiated to polymerize the monomers so as to form a polymer. The light modulating element 30 is thus manufactured in a manner described above.

It is preferable, but not required, that the temperature of the cells be prevented from being changed while the ultraviolet rays are irradiated. In this case, it is advantageous to use an infrared cut filter, or use an UV-LED or the like as a source of light. Since the ultraviolet illumination exerts an influence on an organization structure of a composite material, it is preferable that the ultraviolet illumination be adjusted as needed based on the liquid crystal material and the monomer material used, or based on a composition of the liquid crystal material and the monomer material. In this regard, a range of 0.1 to 500 mW/cm$^2$ is preferable, and a range of 0.5 to 30 mW/cm$^2$ is more preferable for the ultraviolet illumination. There is a tendency that the lower the ultraviolet illumination is, the lower the drive voltage becomes. Thus, preferable ultraviolet illumination may be selected in terms of both the productivity and the characteristics.

Then, the light modulating element 30 is attached to the light guide plate 10. The attachment of the light modulating element 30 and the light guide plate 10 may be carried by adhesion or bonding. It is preferable, but not required, that the light modulating element 30 be adhered or bonded with a material, having a refractive index which is close to a refractive index of the light guide plate 10 and a refractive index of a substrate material of the light modulating element 30 as much as possible. Finally, unillustrated interconnection lines are attached to each of the bottom electrode 32 and the top electrode 36. The backlight 1 according to this embodiment is thus manufactured in a manner described above.

The process of forming the light modulating element 30 and finally attaching the light modulating element 30 to the light guide plate 10 has been described. However, it is also possible to previously attach the transparent substrate 37, over which the orientation film 35 is formed, to the surface of the light guide plate 10, and to form the backlight 1 thereafter. Also, the backlight 1 may be formed by a sheet method, a roll-to-roll method, or other suitable method.

Now, an operation and an effect of the backlight 1 according to this embodiment will be described.

In the backlight 1 according to this embodiment, the voltage is applied to the pair of electrodes (i.e., the bottom electrode 32 and the top electrode 36) in each of the light modulating cells 30-1, so that the optical axis AX2 of the microparticle 34B becomes parallel or substantially parallel to the optical axis AX1 of the bulk 34A in one of the light modulating cells 30-1, and that the optical axis AX2 of the microparticle 34B intersects or becomes orthogonal to the optical axis AX1 of the bulk 34A in other light modulating cell 30-1, for example. Thus, the light emitted from the light source 20 and entered the light guide plate 10 transmits through the transparent region 30A, in which the optical axis AX1 and the optical axis AX2 are parallel or substantially parallel to each other, in the light modulating element 30. On the other hand, the light emitted from the light source 20 and entered the light guide plate 10 is scattered in the scatter region 30B, in which the optical axis AX1 and the optical axis AX2 intersect or are orthogonal to each other, in the light modulating element 30. The light having transmitted through the under face of the scatter region 30B in the scattered light is reflected by the reflector 40, and returns to the light guide plate 10 again, and is then emitted from the top face of the backlight 1. Also, the light having traveled toward the top face of the scatter region 30B in the scattered light transmits through the light guide plate 10, and is then emitted from the top face of the backlight 1. In this embodiment, the light is thus hardly emitted from the top face of the transparent region 30A, but is emitted from the top face of the scatter region 30B, thereby increasing a modulation ratio in the front direction.

In general, the PDLC is a composite layer formed by mixing the liquid crystal material and an isotropic low-polymer material and by causing a phase separation by means of an ultraviolet irradiation, drying of a solvent, or the like, and in which microparticles of the liquid crystal material are dispersed in a high-polymer material. The liquid crystal material in the composite layer is oriented in random directions and thus shows the scattering property when no voltage is applied. In contrast, when the voltage is applied, the liquid crystal material is oriented in the electric field direction, and thus, in a case where the ordinary light refractive index of the liquid crystal material and the refractive index of the high-polymer material are equal to each other, expresses a high transparency in the front direction (in a direction of normal of the PDLC). However, in this liquid crystal material, a difference between the extraordinary light refractive index of the liquid crystal material and the refractive index of the high-polymer material becomes significant in an oblique direction. Thus, even when the transparency is expressed in the front direction, the scattering property appears in the oblique direction.

Usually, the light modulating element utilizing the PDLC often has a structure in which the PDLC is interposed between two glass plates on each of which a transparent conductive film is formed. When the light is obliquely incident from the air onto the light modulating element having the structure described before, the light incident from the oblique direction is refracted by a refractive index difference between the air and the glass plate, and is thus incident on the PDLC at a smaller angle. Consequently, large scattering does not occur in such a light modulating element. For example, when the light is incident from the air at an angle of 80 degrees, an incident angle of the light to the PDLC is decreased to about 40 degrees by refraction in a glass interface.

In the edge light scheme utilizing the light guide plate, however, the light crosses the PDLC at a large angle of about 80 degrees, since the light is incident through the light guide plate. Thus, the difference between the extraordinary light refractive index of the liquid crystal material and the refractive index of the high-polymer material is large. Further, since the light crosses the PDLC at the larger angle, an optical path subjected to the scattering becomes longer as well. For example, when microparticles of a liquid crystal material having an ordinary light refractive index of 1.5 and an extraordinary light refractive index of 1.65 are dispersed in a high-polymer material having a refractive index of 1.5, there is no refractive index difference in the front direction (the normal direction of the PDLC), but the refractive index difference is large in the oblique direction. Thus, the scattering property may not be decreased in the oblique direction, so that a viewing angle characteristic is disadvantageous. Further, when an optical film such as a diffusion film is provided on the light guide plate, oblique leak light is diffused also in the front direction by the diffusion film. Thus, the light leakage in the front direction increases, thereby decreasing the modulation ratio in the front direction.

In contrast, in this embodiment, the bulk 34A and the microparticles 34B mainly include the optical anisotropy material. Thus, the scattering property decreases in the oblique direction, thereby improving the transparency. For example, the bulk 34A and the microparticles 34B mainly include the optical anisotropic materials whose ordinary light refractive indices are equal to each other and whose extraordinary light refractive indices are also equal to each other, and in addition thereto, the directions of the optical axes thereof coincide or substantially coincide with one another in the region in which the voltage is not applied between the bottom electrode 32 and the top electrode 36. Thereby, the refractive index difference is reduced or eliminated in all of the directions including the front direction (the normal direction of the light modulating element 30) and the oblique direction, making it possible to achieve high transparency. As a result, it is possible to reduce or substantially eliminate the leakage of light in a range having a large viewing angle, and to improve the viewing angle characteristic.

For example, when a liquid crystal having an ordinary light refractive index of 1.5 and an extraordinary light refractive index of 1.65, and liquid crystal monomers having an ordinary light refractive index of 1.5 and an extraordinary light refractive index of 1.65, are mixed, and when the liquid crystal monomers are polymerized in a state where the liquid crystal and the liquid crystal monomers are oriented by an orientation film or by an electric field, an optical axis of the liquid crystal and that of a polymer formed by polymerizing the liquid crystal monomers coincide with each other. Thereby, the refractive indices coincide with one another in all of the directions, making it possible to achieve a state where the transparency is high, and to further improve the viewing angle characteristic.

Figure 10:
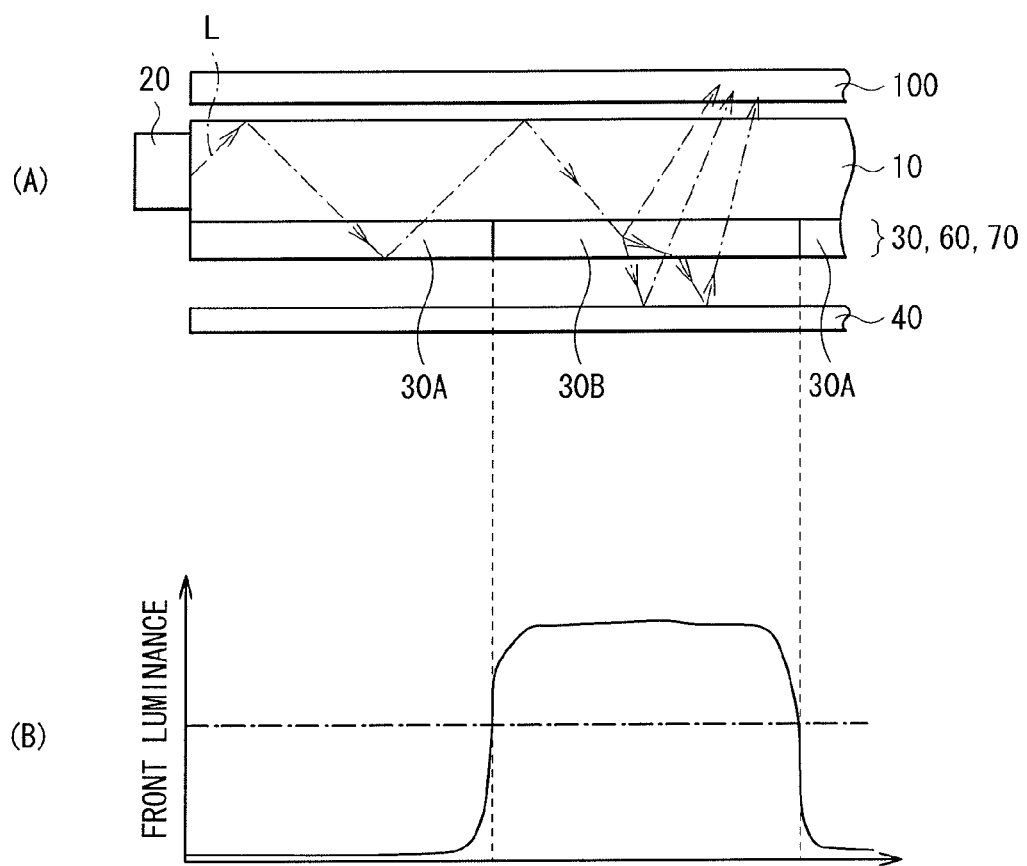
FIG. 10 is a schematic view for describing an operation of the backlight illustrated in FIG. 1.

Also, in this embodiment, as illustrated in Part (A) and Part (B) of FIG. 10, the luminance in the transparent region 30A (luminance in black displaying) is decreased as compared with an example where the light modulating element 30 is not provided (denoted by a long-dashed-short-dashed line in Part (B) of FIG. 10). On the other hand, the luminance in the scatter region 30B is increased significantly as compared with the example where the light modulating element 30 is not provided (denoted by a long-dashed-short-dashed line in Part (B) of FIG. 10). Moreover, the luminance in the partial white displaying (the luminance protrusion) is increased by a decreased amount of the luminance in the transparent region 30A.

Incidentally, the luminance protrusion is a technique of increasing luminance when white displaying is performed partially in comparison to a case where the white displaying is performed for the entire screen. The luminance protrusion is generally used in a CRT, PDP, or the like. However, in a liquid crystal display, a backlight generates light uniformly irrespective of an image, so that the luminance may not be increased partially. When an LED backlight in which a plurality of LEDs are two-dimensionally disposed is used as the backlight, the LEDs may be partially turned off. In such a case, however, there is no diffusion light from a dark region in which the LEDs are turned off. Thus, the luminance becomes lower as compared with a case where all of the LEDs are turned on. Also, the luminance may be increased by increasing a current applied to the LEDs which are being partially turned on. In such a case, however, a large current flows in a very short time, raising an issue in terms of a load imposed on a circuit and of reliability.

In contrast, in this embodiment, the bulk 34A and the microparticles 34B mainly include the optical anisotropy material. Thus, the scattering property in the oblique direction is suppressed, and the leak light from the light guide plate in a dark state is little. Thereby, the light is guided from the part having the partially-dark state to the part having a partially-blight state, making it possible to achieve the luminance protrusion without increasing electric power supplied to the backlight 1.

Also, in this embodiment, the optical axis AX2 of the microparticle 34B is parallel to the light incident face 10A of the light guide plate 10 and intersects the surfaces of the transparent substrates 31 and 37 at the slight angle $\theta 1$, in the region in which the voltage is not applied across the bottom electrode 32 and the top electrode 36. In other words, the liquid crystal molecules included in the microparticle 34B are oriented in a state in which the liquid crystal molecules are tilted at the angle $\theta 1$ in a plane parallel to the light incident face 10A (i.e., a state in which the pretilt angle is applied). Thereby, the liquid crystal material included in the microparticle 34B does not stand in random directions when the voltage is applied across the bottom electrode 32 and the top electrode 36, but rather stands in the plane parallel to the light incident face 10A. At this time, the optical axis AX1 of the bulk 34A and the optical axis AX2 of the microparticle 34B intersect or become orthogonal to each other in the plane parallel to the light incident face 10A. Thus, the refractive index difference increases in all of the directions including the front direction (the normal direction of the light modulating element 30) and the oblique directions in the region in which the voltage is applied across the bottom electrode 32 and the top electrode 36, making it possible to obtain high scattering property. As a result, it is possible to improve the luminance in displaying. Also, it is possible to further improve the displaying luminance due to the effect of the luminance protrusion.

Consequently, in this embodiment, it is possible to reduce or substantially eliminate the leakage of light in a range in which a viewing angle is large, while improving the displaying luminance, thereby making it possible to increase the modulation ratio in the front direction.

Figure 14:
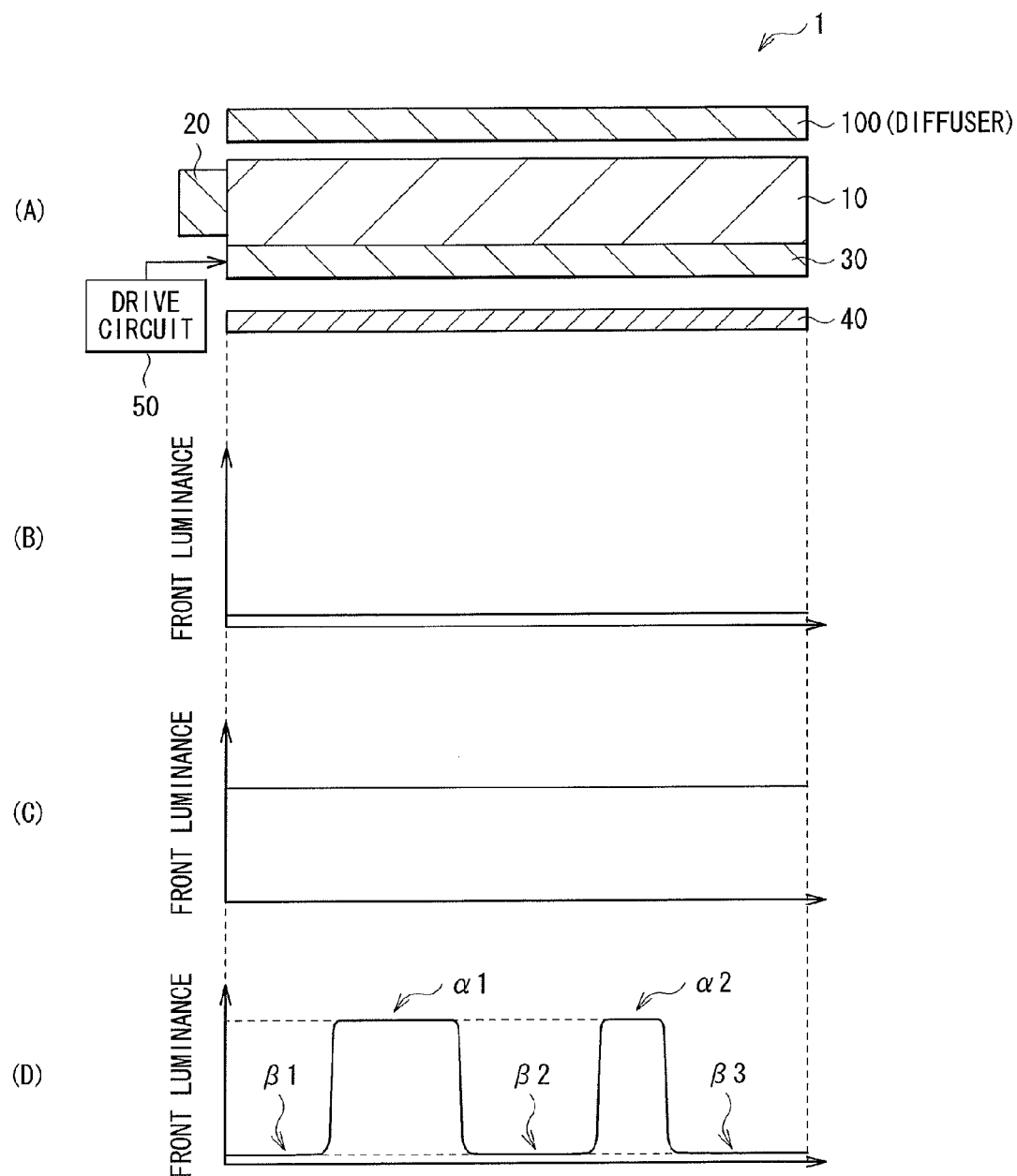
FIG. 14 is a characteristic diagram for describing a front luminance of the backlight illustrated in FIG. 1.

In addition thereto, in this embodiment, the bottom electrode 32 (or the partial electrodes 32A), the top electrode 36 (or the partial electrodes 36A), or both of the bottom and the top electrodes 32 and 36 (or the partial electrodes 32A and 36A), is/are patterned, and further, the pattern density of the electrodes in the bottom and the top electrodes 32 and 36 (or the partial electrodes 32A and 36A) to which the patterning is applied is varied depending on the distance, with respect to the electrodes as a whole, from the light source 20. This allows a density distribution of the transparent region and the scatter region in a light exit region to have a desired distribution. Thereby, the luminance on the light source 20 side in the light exit region of the backlight 1 is suppressed lower than a case where the light modulating element 30 is not provided, and the luminance on the opposite side to the light source 20 in the light exit region of the backlight 1 is more increased than the case where the light modulating element 30 is not provided. As a result, it is possible to uniformize an in-plane luminance not only when the entire light exit region of the backlight 1 is caused to have a dark state as illustrated in Part (B) of FIG. 14, but also when the entire light exit region of the backlight 1 is caused to have a blight state as illustrated in Part (C) of FIG. 14, for example. Consequently, as illustrated in Part (D) of FIG. 14, when white displaying is performed on a regional which is close to the light source 20 and on a region $\alpha 2$ which is far from the light source 20, it is possible to allow a luminance of white in both of the regions $\alpha 1$ and $\alpha 2$ to be equal to each other. Also, as illustrated in Part (D) of FIG. 14, when black displaying is performed on a region 131 which is closer to the light source 20 than the regional, on a region 132 which is between the regions $\alpha 1$ and $\alpha 2$, and on a region P3 which is farther from the light source 20 than the region $\beta 2$, it is possible to allow a luminance of black in these regions $\beta 1$, $\beta 2$, and $\beta 3$ to be equal to one another, for example. Therefore, this embodiment makes it possible to uniformize the in-plane luminance while increasing the modulation ratio.

Second Embodiment

The backlight according to a second embodiment will now be described. The backlight according to the second embodiment differs from the structure of the backlight 1 according to the first embodiment described above, in that vertical orientation films are utilized as the orientation films 33 and 35, and that a light modulating element 60 (see FIGS. 19 to 21, for example) having a light modulation layer 64 is provided. In the following, description will be made mainly on differences in structure between the second embodiment and the first embodiment, and structures which are common therebetween will not be described in detail.

As mentioned earlier, this embodiment utilizes the vertical orientation films for the orientation films 33 and 35. Examples of the vertical orientation film include a silane coupling material, polyvinyl alcohol (PVA), a polyimide-based material, a surface-activating agent, and other suitable material. For example, a rubbing process is performed after application and drying of the material described before, to form a pretilt in a rubbing direction. Thereby, a direction in which liquid crystals on the vertical orientation film tilt by the application of voltage is determined. Also, when using plastic films for the transparent substrates 31 and 37, it is preferable, but not required, that a baking temperature after applying the orientation films 33 and 35 on the surfaces of the transparent substrates 31 and 37 respectively in a manufacturing process be as low as possible. Thus, it is preferable, but not required, that a silane coupling material, for which an alcohol-based solvent is usable, be used as the orientation films 33 and 35.

When using the vertical orientation films for the orientation films 33 and 35, it is preferable, but not required, that liquid crystal molecules have a negative dielectric anisotropy (a so-called negative liquid crystal) be used for the liquid crystal molecules included in a microparticle 64B.

Now, the light modulation layer 64 according to the second embodiment will be described. As in the first embodiment described above, the light modulation layer 64 is a composite layer including a bulk 64A (a second region) and a plurality of microparticles 64B (a first region) dispersed in the bulk 64A, for example. The bulk 64A and the microparticles 64B both have an optical anisotropy.

Figure 15A:
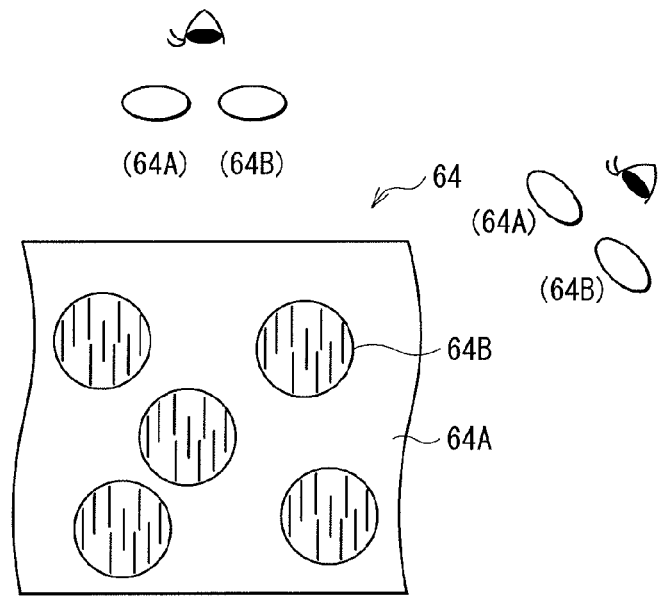
FIGS. 15A to 15C are schematic illustrations for describing an example of an operation of a light modulating element provided in a backlight according to a second embodiment.
Figure 15B:
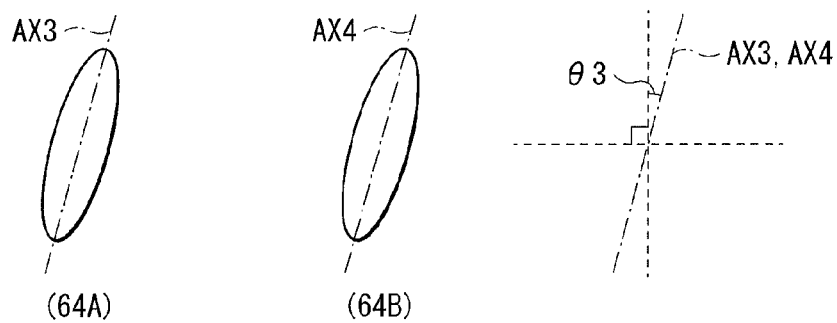
Figure 15C:
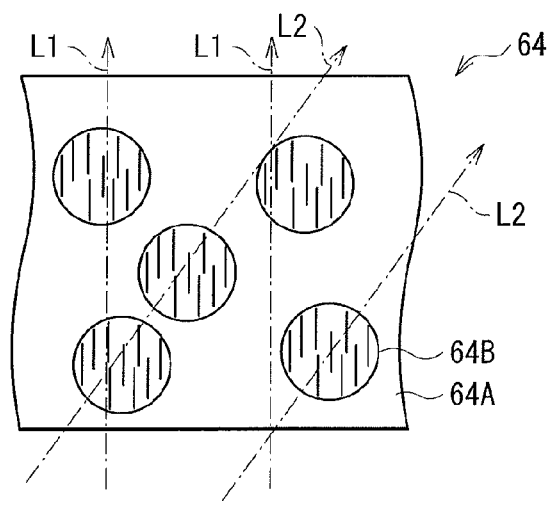

FIG. 15A schematically illustrates an example of an orientation state in the microparticles 64B when no voltage is applied across the bottom electrode 32 and the top electrode 36. Note that the orientation state in the bulk 64A is not illustrated in FIG. 15A. FIG. 15B illustrates an example of refractive-index ellipsoidal bodies expressing a refractive index anisotropy of the bulk 64A and the microparticles 64B when no voltage is applied across the bottom electrode 32 and the top electrode 36. FIG. 15C schematically illustrates an example of a state where the light L1 traveling in the front direction and light L2 traveling in the oblique direction transmit through the light modulation layer 64 when no voltage is applied across the bottom electrode 32 and the top electrode 36.

Figure 16A:
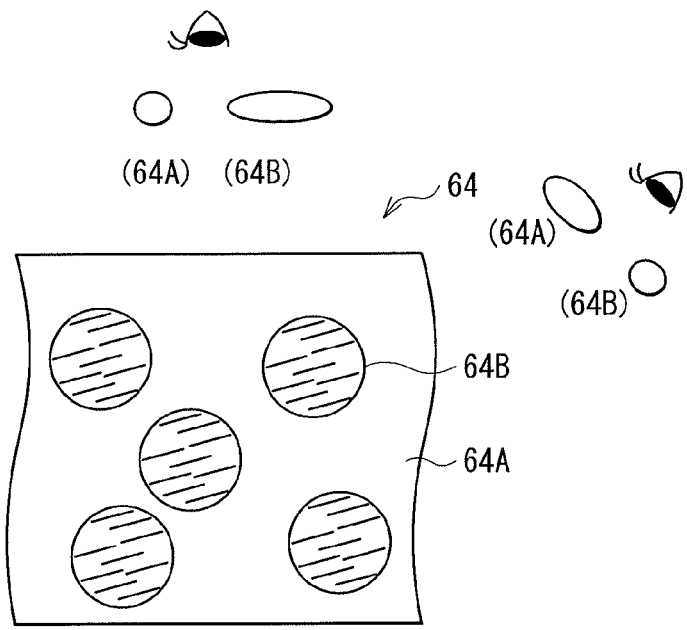
FIGS. 16A to 16C are schematic illustrations for describing another example of the operation of the light modulating element of FIG. 15A to 15C.
Figure 16B:
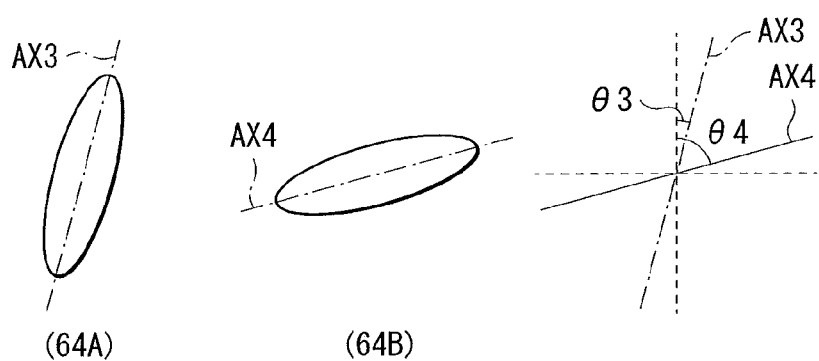
Figure 16C:
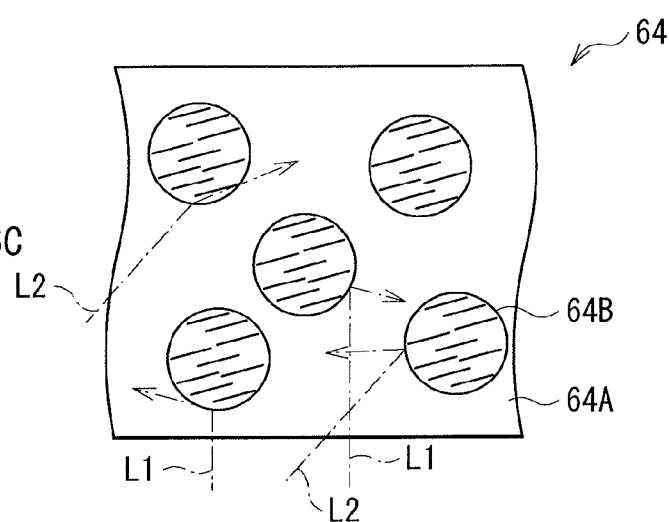

FIG. 16A schematically illustrates an example of an orientation state in the microparticles 64B when the voltage is applied across the bottom electrode 32 and the top electrode 36. Note that the orientation state in the bulk 64A is not illustrated in FIG. 16A. FIG. 16B illustrates an example of the refractive-index ellipsoidal bodies expressing the refractive-index anisotropy of the bulk 64A and the microparticles 64B when the voltage is applied across the bottom electrode 32 and the top electrode 36. FIG. 16C schematically illustrates an example of a state where the light L1 traveling in the front direction and the light L2 traveling in the oblique direction are scattered in the light modulation layer 64 when the voltage is applied across the bottom electrode 32 and the top electrode 36.

As illustrated in FIGS. 15A and 15B, the bulk 64A and the microparticle 64B are so structured that an orientation of an optical axis AX3 of the bulk 64A and an orientation of an optical axis AX4 of the microparticle 64B coincide with each other (i.e., are parallel to each other) when no voltage is applied across the bottom electrode 32 and the top electrode 36, for example. The optical axes AX3 and AX4 here each refer to such a line parallel to a traveling direction of light ray by which a refractive index has a certain one value irrespective of a polarization direction. It is to be noted that the orientations of the optical axes AX3 and AX4 do not necessarily have to be coincident with each other. The orientations of the optical axes AX3 and AX4 may be slightly deviated from each other due to a manufacturing error or the like, for example.

Also, the microparticle 64B is so structured that the optical axis AX4 becomes parallel to the light incident face 10A of the light guide plate 10 when no voltage is applied across the bottom electrode 32 and the top electrode 36, for example. Further, as illustrated in FIG. 15B, the microparticle 64B is so structured that the optical axis AX4 intersects the surfaces of the transparent substrates 31 and 37 at a slight angle θ3 (a third angle) when no voltage is applied across the bottom electrode 32 and the top electrode 36, for example. The angle θ3 will be described in greater detail when description is made on a material structuring the microparticles 64B.

On the other hand, the bulk 64A is so structured that the optical axis AX4 of the bulk 64A becomes uniform regardless of the presence of the voltage application across the bottom electrode 32 and the top electrode 36, for example. More specifically, as illustrated in FIGS. 15A, 15B, 16A, and 16B, the bulk 64A is so structured that the optical axis AX3 of the bulk 64A becomes parallel to the light incident face 10A of the light guide plate 10, and that the optical axis AX3 also intersects the surfaces of the transparent substrates 31 and 37 at a predetermined angle θ4 (a fourth angle), for example. That is, the optical axis AX3 of the bulk 64A is parallel to the optical axis AX4 of the microparticle 64B when no voltage is applied across the bottom electrode 32 and the top electrode 36.

Note that the optical axis AX4 does not necessarily have to be parallel to the light incident face 10A of the light guide plate 10 and intersects the surfaces of the transparent substrates 31 and 37 at the angle θ3. The surfaces of the transparent substrates 31 and 37 and the angle θ3 may intersect each other at an angle slightly different from the angle θ3, due to a manufacturing error or the like, for example. Also, the optical axes AX3 and AX4 do not necessarily have to be parallel to the light incident face 10A of the light guide plate 10. The optical axes AX3 and AX4 may intersect the light incident face 10A of the light guide plate 10 at a small angle, due to a manufacturing error or the like, for example.

It is preferable, but not required, that an ordinary light refractive index of the bulk 64A and that of the microparticle 64B be equal to each other, and an extraordinary light refractive index of the bulk 64A and that of the microparticle 64B be equal to each other. In this case, for example, when no voltage is applied across the bottom electrode 32 and the top electrode 36, there is hardly any difference in the refractive index in all of the directions including the front direction and oblique directions as illustrated in FIG. 15B, and thus high transparency is obtained. Thereby, as illustrated in FIG. 15C, the light L1 traveling in the front direction and the light L2 traveling in the oblique direction transmit through the light modulation layer 64 without being scattered in the light modulation layer 64, for example. As a result, as illustrated in Part (A) and Part (B) of FIG. 10, the light L from the light source 20 (i.e., light from the oblique direction) is totally reflected by the interface of the transparent region 30A (i.e., the interface between the transparent substrate 31 or the light guide plate 10 and air) as in the first embodiment described above, for example. Consequently, the luminance of the transparent region 30A (the luminance in black displaying) becomes lower than that in the case where the light modulating element 60 is not provided (denoted by the long-dashed-short-dashed line in Part (B) of FIG. 10).

Also, as illustrated in FIG. 16B, the bulk 64A and the microparticle 64B are so structured that the orientation of the optical axis AX3 and the orientation of the optical axis AX4 become different from each other (i.e., intersects each other) when the voltage is applied across the bottom electrode 32 and the top electrode 36. Further, when the voltage is applied across the bottom electrode 32 and the top electrode 36, the microparticle 64B is so structured that the optical axis AX4 of the microparticle 64B becomes parallel to the light incident face 10A of the light guide plate 10, and that the optical axis AX4 also intersects the surfaces of the transparent substrates 31 and 37 at an angle θ4 larger than the angle θ3 (a fourth angle) or becomes parallel to the surfaces of the transparent substrates 31 and 37, for example. The angle θ4 will be described in greater detail when description is made on a material structuring the microparticles 64B.

Thus, when the voltage is applied across the bottom electrode 32 and the top electrode 36, the refractive index difference increases in all of the directions including the front direction and the oblique directions in the light modulation layer 64, and thus high scattering property is obtained. Thereby, as illustrated in FIG. 16C, the light L1 traveling in the front direction and the light L2 traveling in the oblique direction are scattered in the light modulation layer 64, for example. As a result, as illustrated in Part (A) and Part (B) of FIG. 10, the light L from the light source 20 (i.e., the light from the oblique direction) transmits through the interface of the scatter region 30B (i.e., the interface between the transparent substrate 31 or the light guide plate 10 and air), and the light having transmitted therethrough toward the reflector 40 is reflected by the reflector 40, and transmits through the light modulating element 60, for example. Consequently, the luminance of the scatter region 30B becomes extremely higher than that in the case where the light modulation layer 60 is not provided (denoted by the long-dashed-short-dashed line in Part (B) of FIG. 10), and moreover, the luminance in the partial white displaying (the luminance protrusion) increases by a decreased amount of the luminance in the transparent region 30A.

The ordinary light refractive index of the bulk 64A and that of the microparticle 64B may be slightly deviated from each other due to a manufacturing error or the like, and is preferably 0.1 or less, and is more preferably 0.05 or less, for example. The extraordinary light refractive index of the bulk 64A and that of the microparticle 64B may also be slightly deviated from each other due to the manufacturing error or the like, and is preferably 0.1 or less, and is more preferably 0.05 or less, for example.

Also, it is preferable, but not required, that the refractive index difference ($\Delta n_0$=extraordinary light refractive index $n_1$–ordinary light refractive index $n_0$) of the bulk 64A and the refractive index difference ($\Delta n_1$=extraordinary light refractive index $n_3$–ordinary light refractive index $n_2$) of the microparticle 64B be as large as possible. For example, the refractive index difference of the bulk 64A and the refractive index difference of the microparticle 64B are preferably 0.05 or larger, more preferably 0.1 or larger, and yet preferably 0.15 or larger. This is because the scattering power of the light modulation layer 64 becomes higher when the refractive index differences of the bulk 64A and the microparticle 64B are large, thereby making it possible to easily break the conditions for guiding the light, and to easily extract the light from the light guide plate 10.

The bulk 64A and the microparticle 64B each have a mutually-different rate of response to the electric field. For example, the bulk 64A has a streaky structure or a porous structure which does not respond to the electric field, or has a rod structure whose response rate is lower than that of the microparticle 64B. The bulk 64A is formed by a high-molecular material obtained by polymerizing a low-molecular material (monomer), for example. In one embodiment, the bulk 64A is formed by polymerizing, with heat, light, or both, a material (for example, monomer) having an orientation property and a polymerization property, oriented along the orientation direction of the microparticles 64B or the orientation direction of the orientation films 33 and 35.

On the other hand, the microparticle 64B mainly includes a liquid crystal material, and has the response rate sufficiently higher than that of the bulk 64A, for example. The liquid crystal material (liquid crystal molecules) contained in the microparticle 64B includes rod-like molecules, for example. It is preferable, but not required, that the liquid crystal molecules have the negative dielectric anisotropy (the so-called negative liquid crystal).

A long axis direction of the liquid crystal molecules in the microparticle 64B is parallel to the optical axis AX4 when no voltage is applied across the bottom electrode 32 and the top electrode 36. At this time, a long axis of the liquid crystal molecules in the microparticle 64B is parallel to the light incident face 10A of the light guide plate 10, and also intersects a normal of the transparent substrates 31 and 37 at the slight angle θ3. The angle θ3 is a small angle of about one degree, and is the so-called pretilt angle. In other words, the liquid crystal molecules in the microparticle 64B are oriented in a state in which the liquid crystal molecules are tilted at the angle θ3 in a plane parallel to the light incident face 10A of the light guide plate 10, when no voltage is applied across the bottom electrode 32 and the top electrode 36.

When the voltage is applied across the bottom electrode 32 and the top electrode 36, the long axis direction of the liquid crystal molecules in the microparticle 64B intersects (or is orthogonal to) the optical axis AX4. At this time, the long axis of the liquid crystal molecules in the microparticle 64B is parallel to the light incident face 10A of the light guide plate 10, and also intersects the normal of the transparent substrates 31 and 37 at the angle θ4 larger than the angle θ3. In other words, the liquid crystal molecules in the microparticle 64B are oriented in a state in which the liquid crystal molecules are tilted at the angle θ4 in a plane parallel to the light incident face 10A of the light guide plate 10, or oriented in a state in which the liquid crystal molecules are laid horizontally at the at the angle θ4 (for example but not limited to, 90 degrees), when the voltage is applied across the bottom electrode 32 and the top electrode 36.

The monomers having the orientation property and the polymerization property described above can be a material, having an optical anisotropy and which are combined with the liquid crystals. In this embodiment, it is preferable, but not required, that the monomers having the orientation property and the polymerization property be low-polymer monomers which are cured by ultraviolet light. Herein, a direction of the optical anisotropy of the liquid crystals and that of a material (high-polymer material) obtained by polymerizing the low-polymer monomers preferably coincide with each other in the state in which the voltage is not applied. Thus, it is preferable, but not required, that the liquid crystals and the low-polymer monomers be oriented in the same direction before curing with the ultraviolet light. Also, in one embodiment where the liquid crystals are used as the microparticles 64B, it is preferable, but not required, that the shape of the monomer material used be a rod-like shape as well, when the liquid crystals include the rod-like molecules. For these reasons, it is preferable, but not required, that the material having the polymerization property and the liquid crystal property be used for the monomer material. For example, it is preferable to have at least one functional group selected from a group of an acrylate group, a methacrylate group, an acryloyloxy group, a methacryloyloxy group, a vinyl ether group, and an epoxy group, as a polymerizable functional group. These functional groups may be polymerized by irradiating ultraviolet light, infrared light, or an electron beam thereon, or heating the same. A liquid crystal material having a polyfunctional group may be added to suppress a decrease in a degree of orientation at the time of the ultraviolet irradiation.

Now, an operation and an effect of the backlight according to the second embodiment will be described.

In the backlight according to this embodiment, the voltage is applied to the pair of electrodes (i.e., the bottom electrode 32 and the top electrode 36) in each of the light modulating cells 30-1, so that the optical axis AX4 of the microparticle 64B becomes parallel or substantially parallel to the optical axis AX3 of the bulk 64A in one of the light modulating cells 30-1, and that the optical axis AX4 of the microparticle 64B intersects or becomes orthogonal to the optical axis AX3 of the bulk 64A in other light modulating cell 30-1, for example. Thus, the light emitted from the light source 20 and entered the light guide plate 10 transmits through the transparent region 30A, in which the optical axis AX3 and the optical axis AX4 are parallel or substantially parallel to each other, in the light modulating element 60. On the other hand, the light emitted from the light source 20 and entered the light guide plate 10 is scattered in the scatter region 30B, in which the optical axis AX3 and the optical axis AX4 intersect or are orthogonal to each other, in the light modulating element 60. The light having transmitted through the under face of the scatter region 30B in the scattered light is reflected by the reflector 40, and returns to the light guide plate 10 again, and is then emitted from the top face of the backlight. Also, the light having travelled toward the top face of the scatter region 30B in the scattered light transmits through the light guide plate 10, and is then emitted from the top face of the backlight. In the second embodiment, the light is thus hardly emitted from the top face of the transparent region 30A, but is emitted from the top face of the scatter region 30B, thereby increasing the modulation ratio in the front direction.

In this embodiment, the bulk 64A and the microparticles 64B mainly include the optical anisotropy material. Thus, the scattering property decreases in the oblique direction, thereby improving the transparency. For example, the bulk 64A and the microparticles 64B mainly include the optical anisotropic materials whose ordinary light refractive indices are equal to each other and whose extraordinary light refractive indices are also equal to each other, and in addition thereto, the directions of the optical axes thereof coincide or substantially coincide with one another in the region in which the voltage is not applied between the bottom electrode 32 and the top electrode 36. Thereby, the refractive index difference is reduced or eliminated in all of the directions including the front direction (the normal direction of the light modulating element 60) and the oblique direction, making it possible to achieve high transparency. As a result, it is possible to reduce or substantially eliminate the leakage of light in a range having a large viewing angle, and to improve the viewing angle characteristic.

For example, when a liquid crystal having an ordinary light refractive index of 1.5 and an extraordinary light refractive index of 1.65, and liquid crystal monomers having an ordinary light refractive index of 1.5 and an extraordinary light refractive index of 1.65, are mixed, and when the liquid crystal monomers are polymerized in a state where the liquid crystal and the liquid crystal monomers are oriented by an orientation film or by an electric field, an optical axis of the liquid crystal and that of a polymer formed by polymerizing the liquid crystal monomers coincide with each other. Thereby, the refractive indices coincide with one another in all of the directions, making it possible to achieve a state where the transparency is high, and to further improve the viewing angle characteristic.

Also, in this embodiment, as illustrated in Part (A) and Part (B) of FIG. 10, the luminance in the transparent region 30A (the luminance in the black displaying) is decreased as compared with an example where the light modulating element 60 is not provided (denoted by the long-dashed-short-dashed line in Part (B) of FIG. 10). On the other hand, the luminance in the scatter region 30B is increased significantly as compared with the example where the light modulating element 60 is not provided (denoted by the long-dashed-short-dashed line in Part (B) of FIG. 10). Moreover, the luminance in the partial white displaying (the luminance protrusion) is increased by a decreased amount of the luminance in the transparent region 30A. This is because, in this embodiment, the bulk 64A and the microparticles 64B mainly include the optical anisotropy material. Thus, the scattering property in the oblique direction is suppressed, and the leak light from the light guide plate in the dark state is little. Thereby, the light is guided from the part having the partially-dark state to the part having the partially-blight state, making it possible to achieve the luminance protrusion without increasing electric power supplied to the backlight.

Also, in this embodiment, the optical axis AX4 of the microparticle 64B is parallel to the light incident face 10A of the light guide plate 10 and intersects the normal of the transparent substrates 31 and 37 at the slight angle θ3, in the region in which the voltage is not applied across the bottom electrode 32 and the top electrode 36. In other words, the liquid crystal molecules included in the microparticle 64B are oriented in a state in which the liquid crystal molecules are tilted at the angle θ3 in a plane parallel to the light incident face 10A (i.e., a state in which the pretilt angle is applied). Thereby, the liquid crystal material included in the microparticle 64B does not fall in random directions when the voltage is applied across the bottom electrode 32 and the top electrode 36, but rather falls in the plane parallel to the light incident face 10A. At this time, the optical axis AX3 of the bulk 64A and the optical axis AX4 of the microparticle 64B intersect or become orthogonal to each other in the plane parallel to the light incident face 10A. Thus, the refractive index difference increases in all of the directions including the front direction (the normal direction of the light modulating element 60) and the oblique directions in the region in which the voltage is applied across the bottom electrode 32 and the top electrode 36, making it possible to obtain high scattering property. As a result, it is possible to improve the displaying luminance. Also, it is possible to further improve the displaying luminance due to the effect of the luminance protrusion.

Consequently, in the second embodiment, it is possible to reduce or substantially eliminate the leakage of light in a range in which a viewing angle is large, while improving the displaying luminance, thereby making it possible to increase the modulation ratio in the front direction.

In addition thereto, as in the first embodiment described above, the bottom electrode 32 (or the partial electrodes 32A), the top electrode 36 (or the partial electrodes 36A), or both of the bottom and the top electrodes 32 and 36 (or the partial electrodes 32A and 36A), is/are patterned, and further, the pattern density of the electrodes in the bottom and the top electrodes 32 and 36 (or the partial electrodes 32A and 36A) to which the patterning is applied is varied depending on the distance, with respect to the electrodes as a whole, from the light source 20. This allows the density distribution of the transparent region and the scatter region in the light exit region to have a desired distribution. Therefore, as with the first embodiment described above, the second embodiment makes it possible to uniformize the in-plane luminance while increasing the modulation ratio.

First Modification

In the embodiments described above, the bulk 34A and the bulk 64A each have the optical anisotropy. However, the bulk 34A and the bulk 64A each may have an optical isotropy, where each of the bulk 34A and the bulk 64A is formed by curing a low-molecular material having an isotropy, and thus is formed with by a high-molecular material which expresses the isotropy to the light from the light source 20.

For the purpose of convenience in description, the bulk having the optical isotropy will be hereinafter referred to as a "bulk 74A". In the first modification, the bulk 74A is used instead of the bulk 34A. In the following, optical characteristics of a light modulating element 70 (see FIGS. 19 to 21 for example), provided with a light modulation layer 74 including the bulk 74A and the microparticles 34B, will be described.

Figure 17A:
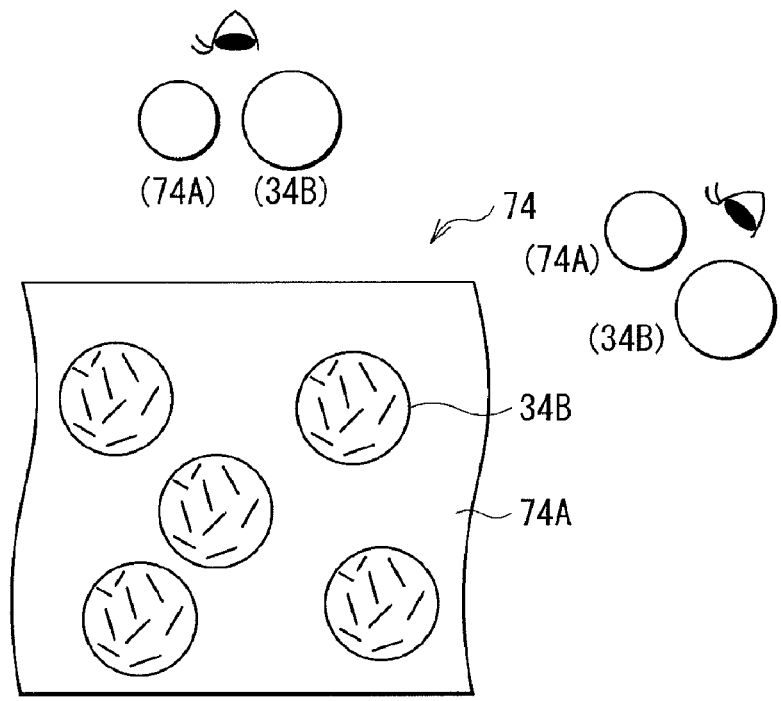
FIGS. 17A and 17B are schematic illustrations for describing an example of an operation according to a modification of the light modulating element illustrated in FIG. 1.
Figure 17B:
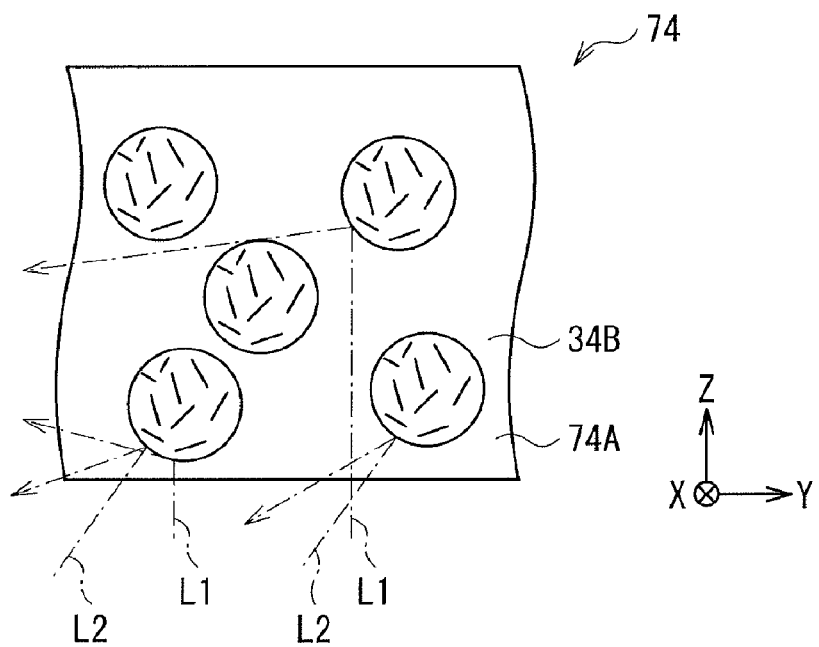

FIG. 17A schematically illustrates an example of an orientation state in the microparticles 34B when no voltage is applied across the bottom electrode 32 and the top electrode 36. It is to be note that the bulk 74A and the microparticles 34B express the isotropy, and are not oriented. FIG. 17B schematically illustrates an example of a state where the light L1 traveling in the front direction and the light L2 traveling in the oblique direction are scattered in the light modulation layer 74 when no voltage is applied across the bottom electrode 32 and the top electrode 36.

Figure 18A:
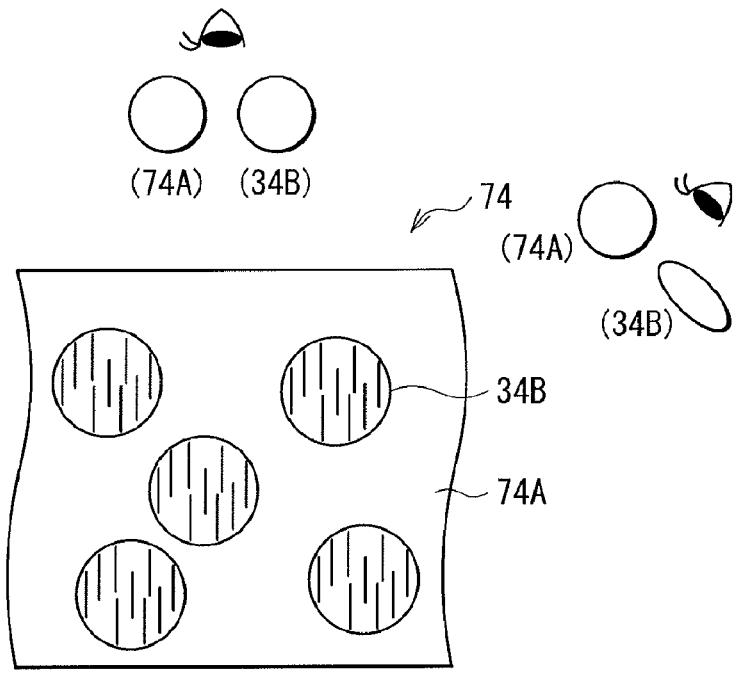
FIGS. 18A and 18B are schematic illustrations for describing another example of the operation of the light modulating element illustrated in FIGS. 17A and 17B.
Figure 18B:
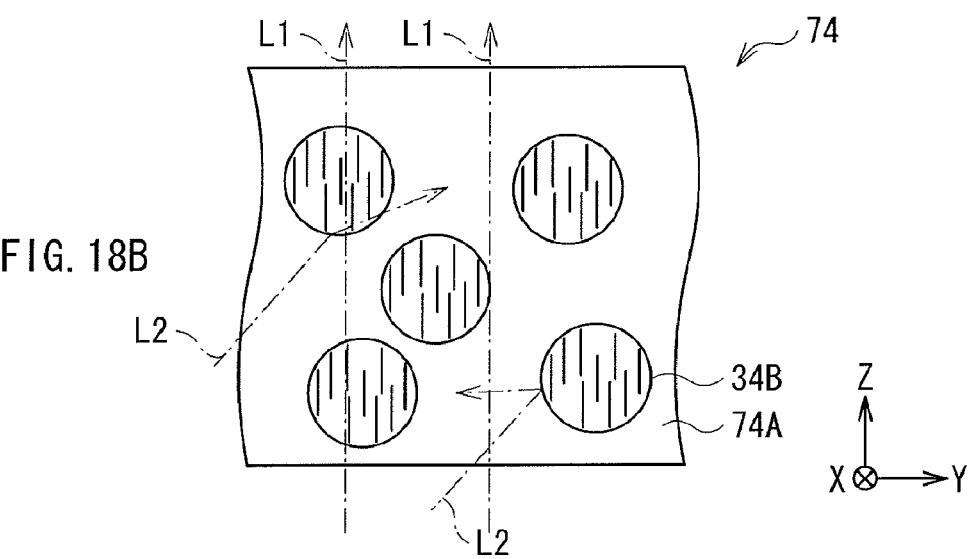

FIG. 18A schematically illustrates an example of an orientation state in the microparticles 34B when the voltage is applied across the bottom electrode 32 and the top electrode 36. It is to be note that the bulk 74A expresses the isotropy also at this time when the voltage is applied across the bottom electrode 32 and the top electrode 36, and is not oriented. The microparticles 34B are oriented in a direction of the application of the voltage. FIG. 18B schematically illustrates an example of a state where the light L1 traveling in the front direction and light L2 traveling in the oblique direction transmit through the light modulation layer 74 when the voltage is applied across the bottom electrode 32 and the top electrode 36.

When the voltage is not applied across the bottom electrode 32 and the top electrode 36, the optical axis of the microparticle 34B is oriented in random directions, and thus the optical isotropy is expressed in the microparticle 34B as a whole, for example. When the voltage is applied across the bottom electrode 32 and the top electrode 36, the optical axis of the microparticle 34B is parallel to the light incident face 10A of the light guide plate 10, and is orthogonal to the surfaces of the transparent substrates 31 and 37, for example. On the other hand, the bulk 74A expresses the isotropy irrespective of the presence of the voltage applied across the bottom electrode 32 and the top electrode 36.

A refractive index of the bulk 74A and the ordinary light refractive index of the microparticle 34B are equal to each other, or basically equal to each other. The refractive index of the bulk 74A and an extraordinary light refractive index of the microparticle 34B are different from each other. Further, the refractive index of the bulk 74A and that of the microparticle 34B when the microparticle 34B expresses the optical isotropy are different from each other.

When the voltage is applied across the bottom electrode 32 and the top electrode 36, there is hardly any difference in the refractive index between the bulk 74A and the microparticle 34B in a direction orthogonal to the surfaces of the transparent substrates 31 and 37, and there is a large difference in the in the refractive index between the bulk 74A and the microparticle 34B in a direction parallel to the surfaces of the transparent substrates 31 and 37. Thereby, as illustrated in FIG. 18B, high transparency is obtained in the direction orthogonal to the surfaces of the transparent substrates 31 and 37, and high scattering property is obtained in the direction parallel to the surfaces of the transparent substrates 31 and 37. As a result, as illustrated in Part (A) and Part (B) of FIG. 10, the light L from the light source 20 (i.e., the light from the oblique direction) is totally reflected by the interface of the transparent region 30A (i.e., the interface between the transparent substrate 31 or the light guide plate 10 and air), for example. Consequently, the luminance of the transparent region 30A (the luminance in the black displaying) becomes lower than that in the case where the light modulating element 70 is not provided (denoted by the long-dashed-short-dashed line in Part (B) of FIG. 10). Thus, it is possible to reduce or substantially eliminate the leakage of light in a range having a large viewing angle, and to improve the viewing angle characteristic.

On the other hand, when the voltage is not applied across the bottom electrode 32 and the top electrode 36, the difference in the refractive index between the bulk 74A and the microparticle 34B increases in all of the directions, and thus high scattering property is obtained as illustrated in FIG. 17B.

As a result, as illustrated in Part (A) and Part (B) of FIG. 10, the light L from the light source 20 (i.e., the light from the oblique direction) transmits through the interface of the scatter region 30B (i.e., the interface between the transparent substrate 31 or the light guide plate 10 and air), and the light having transmitted therethrough toward the reflector 40 is reflected by the reflector 40, and transmits through the light modulating element 70, for example. Consequently, the luminance of the scatter region 30B becomes extremely higher than that in the case where the light modulation layer 70 is not provided (denoted by the long-dashed-short-dashed line in Part (B) of FIG. 10), and moreover, the luminance in the partial white displaying (the luminance protrusion) increases by a decreased amount of the luminance in the transparent region 30A.

Consequently, in this modification, it is possible to reduce or substantially eliminate the leakage of light in a range in which a viewing angle is large, while improving the displaying luminance, thereby making it possible to increase the modulation ratio in the front direction.

In addition thereto, in this modification, the bottom electrode 32 (or the partial electrodes 32A), the top electrode 36 (or the partial electrodes 36A), or both of the bottom and the top electrodes 32 and 36 (or the partial electrodes 32A and 36A), is/are patterned, and further, the pattern density of the electrodes in the bottom and the top electrodes 32 and 36 (or the partial electrodes 32A and 36A) to which the patterning is applied is varied depending on the distance from the light source 20, as with the first embodiment described above.

When the partial electrodes 36A are patterned, the density of the openings 36B provided on the partial electrodes 36A is varied depending on the distance, with respect to the top electrode 36 as a whole, from the light source 20, for example (not illustrated in the figure). In one embodiment, the diameter r1 of each of the openings 36B is uniform regardless of the distance from the light source 20 (r1=a1), and the number of openings 36B per unit area increases with increasing distance from the light source 20. In an alternative embodiment, the number of openings 36B per unit area is constant regardless of the distance from the light source 20, and the diameters r1 of the openings 36B increase with increasing distance from the light source 20. Thus, in each of these embodiments, the density of the openings 36B (i.e., an occupancy of openings 36B per unit area) is dense or increased with increasing distance from the light source 20. In other words, the pattern density of the top electrode 36 (i.e., an occupancy of a region per unit area in the top electrode 36 excluding the openings 36B) is rough or decreased with increasing distance from the light source 20.

When the partial electrodes 32A are patterned, the density of the openings 32B provided on the partial electrodes 32A is varied depending on the distance, with respect to the bottom electrode 32 as a whole, from the light source 20, for example (not illustrated in the figure). In one embodiment, the diameter r2 of each of the openings 32B is uniform regardless of the distance from the light source 20 (r2=a4), and the number of openings 32B per unit area increases with increasing distance from the light source 20. In an alternative embodiment, the number of openings 32B per unit area is constant regardless of the distance from the light source 20, and the diameters r2 of the openings 32B increase with increasing distance from the light source 20. Thus, in each of these embodiments, the density of the openings 32B (i.e., an occupancy of openings 32B per unit area) is dense or increased with increasing distance from the light source 20. In other words, the pattern density of the bottom electrode 32 (i.e., an occupancy of a region per unit area in the bottom electrode 32 excluding the openings 32B) is rough or decreased with increasing distance from the light source 20.

For the reasons, this modification allows the density distribution of the transparent region and the scatter region in the light exit region to have a desired distribution. Therefore, as with the embodiments described above, the first modification makes it possible to uniformize the in-plane luminance while increasing the modulation ratio.

Second Modification

Figure 19:
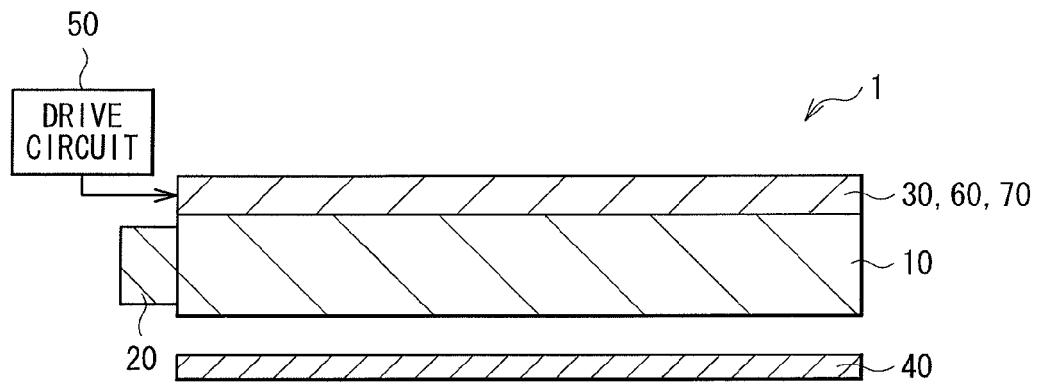
FIG. 19 is a cross-sectional view illustrating yet another example of the configuration of the backlight illustrated in FIG. 1.
Figure 20:
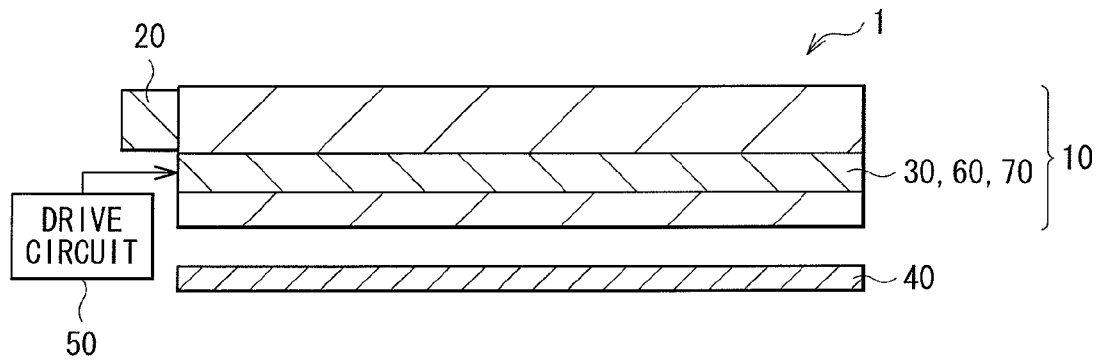
FIG. 20 is a cross-sectional view illustrating yet another example of the configuration of the backlight illustrated in FIG. 1.

In the embodiments and the modification thereof described above, each of the light modulating elements 30, 60, and 70 is closely attached to the back (i.e., the lower face) of the light guide plate 10 without interposing the air layer in between. In a second modification, the light modulating element 30, 60, or 70 is closely attached to the upper face of the light guide plate 10 without interposing the air layer in between, as illustrated in FIG. 19. Alternatively, in the second modification, the light modulating element 30, 60, or 70 is interposed or provided inside of the light guide plate 10, as illustrated in FIG. 20. In a case of the second modification illustrated in FIG. 20, the light modulating element 30, 60, or 70 is closely attached to the light guide plate 10 without interposing the air layer in between.

Third Modification

Figure 21:
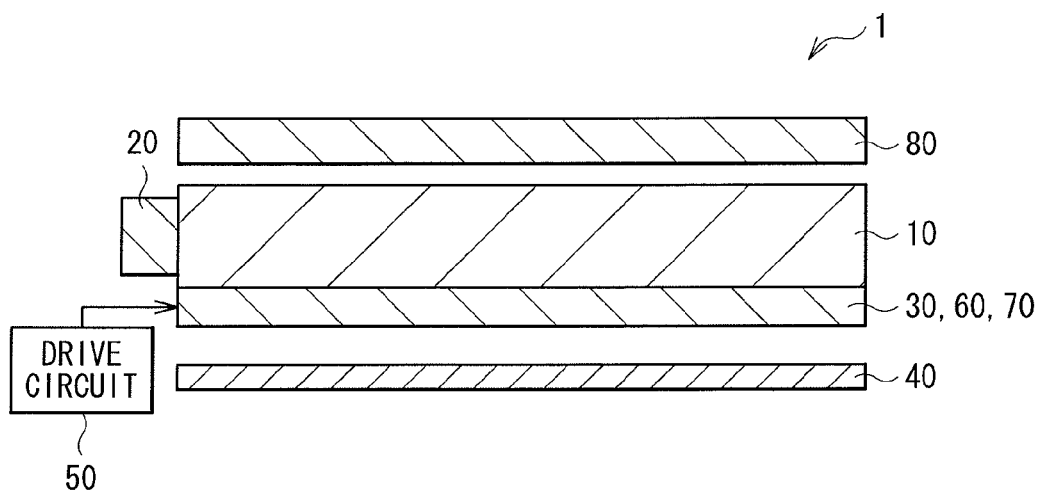
FIG. 21 is a cross-sectional view illustrating yet another example of the configuration of the backlight illustrated in FIG. 1.

In a third modification, an optical sheet 80 is provided on the light guide plate 10 of the first embodiment, the second embodiment, or the modification thereof, as illustrated in FIG. 21. The optical sheet 80 can be a diffuser, a diffusion sheet, a lens film, a polarization separation sheet, or other suitable optical member. By doing so, a part of the light exit from the light guide plate 10 in an oblique direction is raised in a front direction. Therefore, it is possible to effectively improve the modulation ratio.

Fourth Modification

In each of the embodiments and the modifications thereof, the density of pattern of the electrodes in the bottom and the top electrodes 32 and 36 (or the partial electrodes 32A and 36A) to which the patterning is applied is varied depending on the distance, with respect to the electrodes as a whole, from the light source 20. In a fourth modification, the pattern density is varied depending on the distance from the light source 20, for each portion (or each "block") in which the bottom electrode 32 and the top electrode are opposed to each other.

Figure 22A:
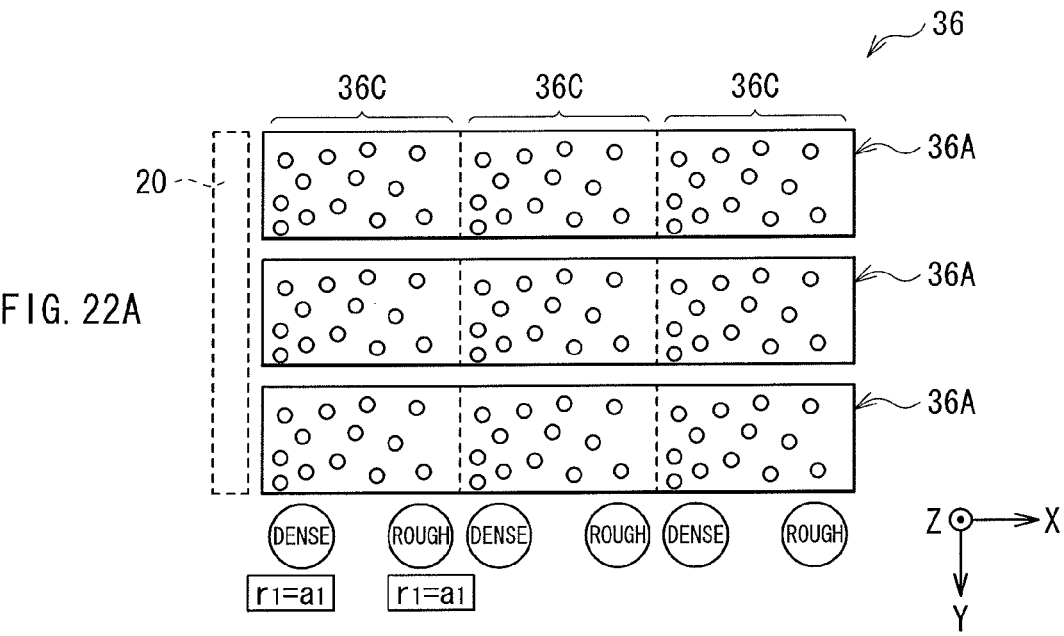
FIGS. 22A and 22B are plan views each illustrating yet another example of the configuration of the upper face of the top electrode illustrated in FIG. 1.
Figure 22B:
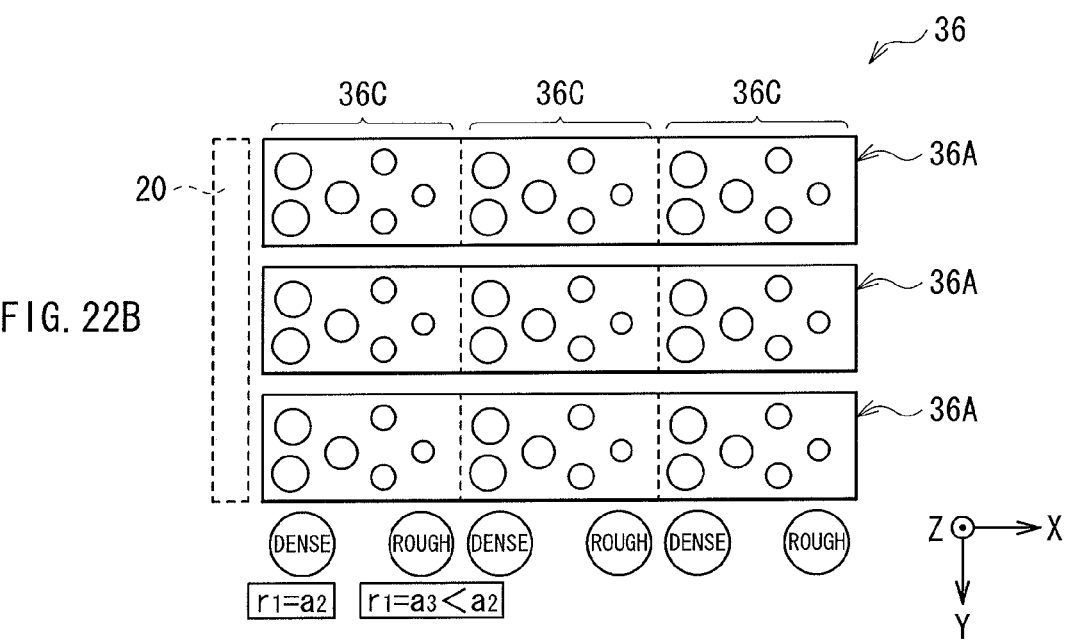

As illustrated in FIGS. 22A and 22B, when the partial electrodes 36A are patterned, the density of the openings 36B provided on the partial electrodes 36A is varied, for each portion (or each "block 36C") opposed to the bottom electrode 32, depending on the distance from the light source 20. In one embodiment illustrated in FIG. 22A, the diameter r1 of each of the openings 36B is uniform regardless of the distance from the light source 20 (r1=a1), and the number of openings 36B per unit area, for each of the blocks 36C, decreases with increasing distance from the light source 20. In an alternative embodiment illustrated in FIG. 22B, the number of openings 36B per unit area is constant regardless of the distance from the light source 20, and the diameters r1 of the openings 36B, for each of the blocks 36C, decrease with increasing distance from the light source 20. In FIG. 22B, note that, in each of the blocks 36C, the diameter r1 near the light source 20 is α2, and the diameter r1 most distant from the light source 20 is a3 (<a2). Thus, in each of the embodiments illustrated in FIGS. 22A and 22B, the density of the openings 36B (i.e., an occupancy of openings 36B per unit area) is rough or decreased with increasing distance from the light source 20, for each of the blocks 36C.

Figure 23A:
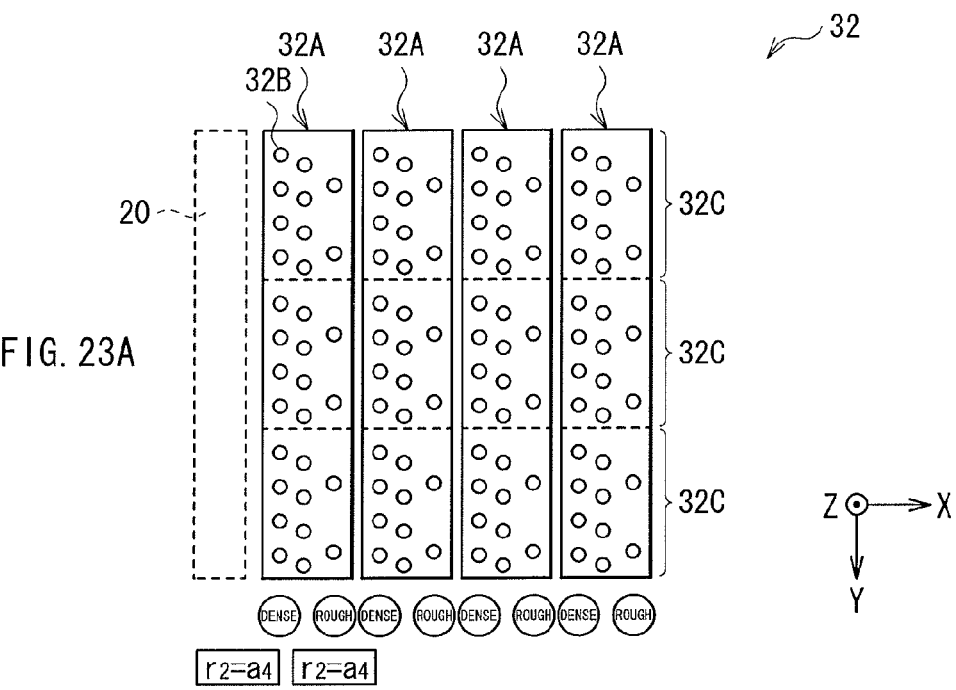
FIGS. 23A and 23B are plan views each illustrating yet another example of the configuration of the upper face of the bottom electrode illustrated in FIG. 1.
Figure 23B:
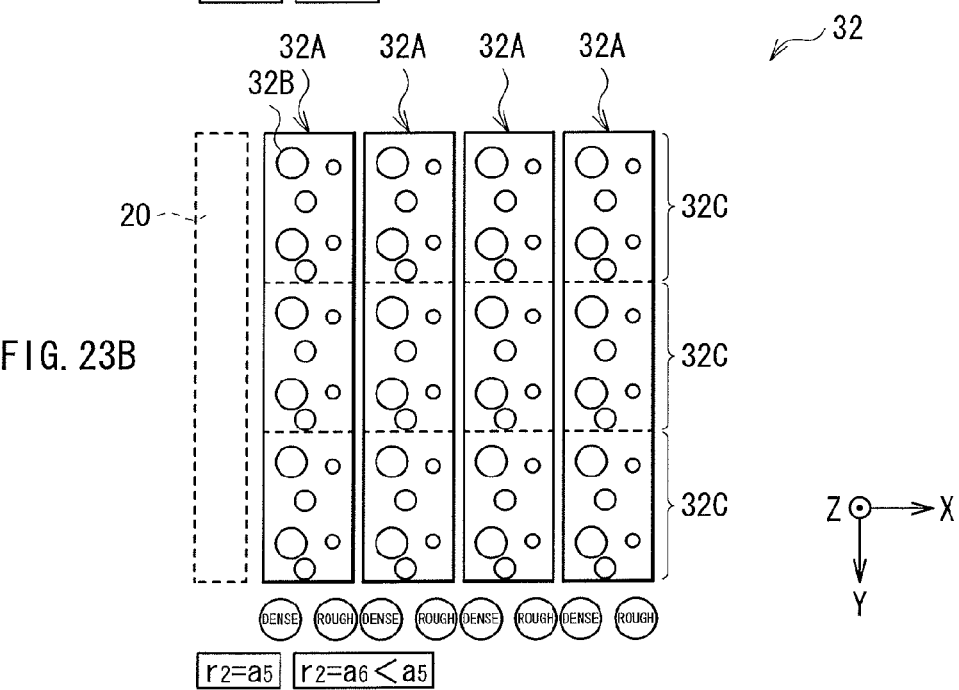

As illustrated in FIGS. 23A and 23B, when the partial electrodes 32A are patterned, the density of the openings 32B provided on the partial electrodes 32A is varied, for each portion (or each "block 32C") opposed to the bottom electrode 32, depending on the distance from the light source 20. In one embodiment illustrated in FIG. 23A, the diameter r2 of each of the openings 32B is uniform regardless of the distance from the light source 20 (r2=a4), and the number of openings 32B per unit area, for each of the blocks 32C, decreases with increasing distance from the light source 20. In an alternative embodiment illustrated in FIG. 23B, the number of openings 32B per unit area is constant regardless of the distance from the light source 20, and the diameters r2 of the openings 32B, for each of the blocks 32C, decrease with increasing distance from the light source 20. In FIG. 22B, note that, in each of the blocks 32C, the diameter r2 near the light source 20 is a5, and the diameter r2 most distant from the light source 20 is a6 (<a5). Thus, in each of the embodiments illustrated in FIGS. 23A and 23B, the density of the openings 32B (i.e., an occupancy of openings 32B per unit area) is rough or decreased with increasing distance from the light source 20, for each of the blocks 32C.

In the fourth modification, the drive circuit 50 applies a voltage, having a crest value corresponding to the distance from the light source 20, on the plurality of light modulating cells 30-1 corresponding to the respective blocks 32C and 36C. More specifically, the drive circuit 50 applies the voltage, whose crest value increases with increasing distance from the light source 20, on the plurality of light modulating cells 30-1. In other words, in this modification, a light extraction efficiency is controlled based on an extent of the pattern density of the electrodes in the bottom and the top electrodes 32 and 36 (or the partial electrodes 32A and 36A) to which the patterning is applied, and on a magnitude of the voltage applied to the light modulating cells 30-1. Thereby, when an image by which only a part of a display region turns out to have a white luminance is displayed, a difference in a degree of the white luminance between an occasion when the part turned out to have the white luminance is close to the light source 20 and an occasion when the part turned out to have the white luminance is far from the light source 20 is less likely to occur or is eliminated. As a result, the degree of the white luminance is uniformized irrespective of a position of the white luminance in the display region, thereby making it possible to increase the modulation ratio in the display region as a whole.

[Driving Method]

In the following, driving methods of the backlight according to each of the embodiments and the modifications thereof will be described.

Figure 24:
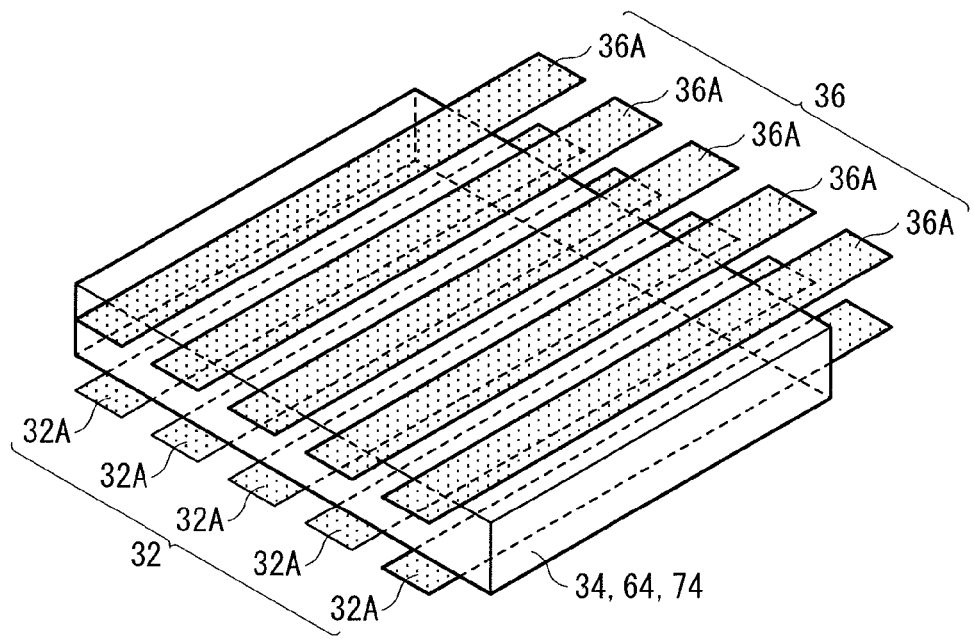
FIG. 24 is a perspective view illustrating a first modification of the electrode configuration illustrated in FIG. 2.
Figure 25:
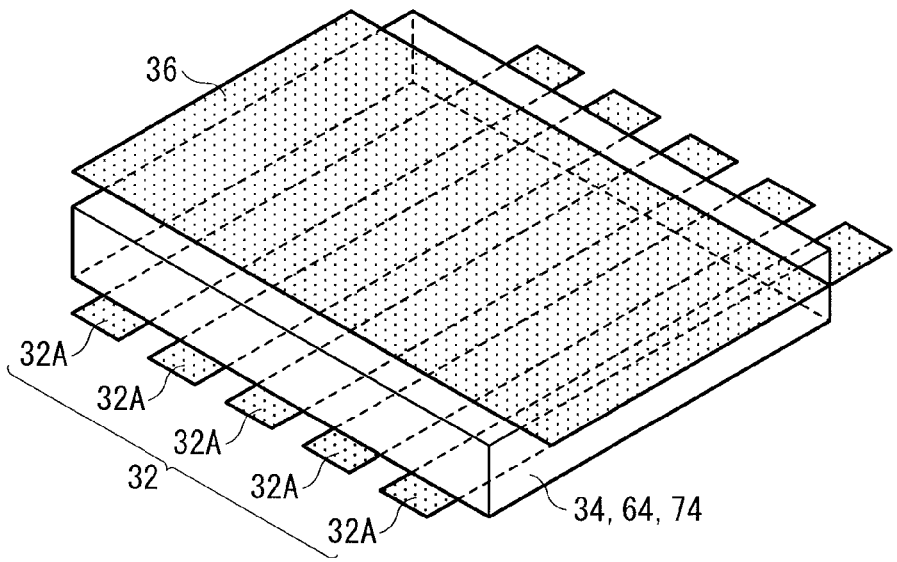
FIG. 25 is a perspective view illustrating a second modification of the electrode configuration illustrated in FIG. 2.
Figure 26:
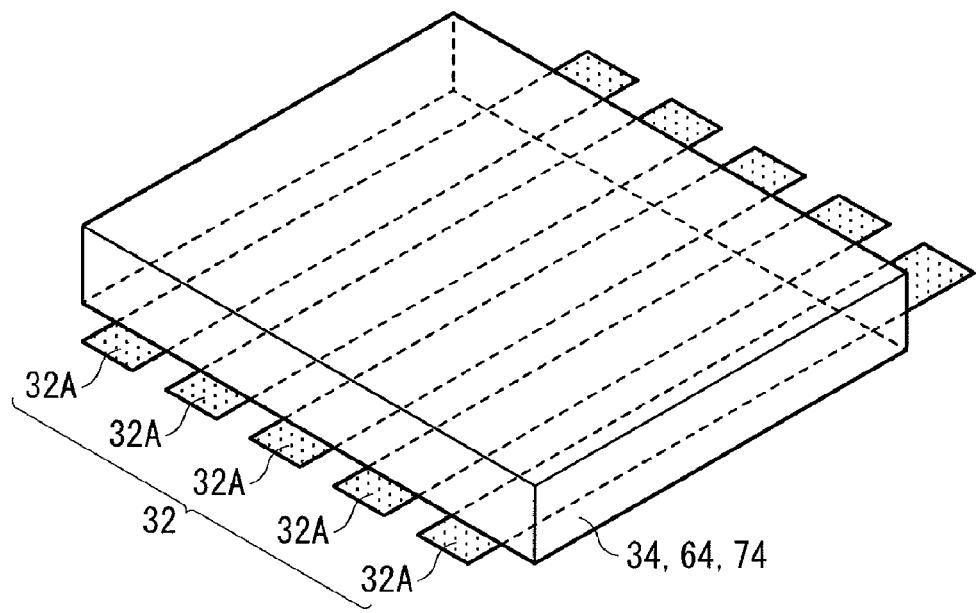
FIG. 26 is a perspective view illustrating a third modification of the electrode configuration illustrated in FIG. 2.
Figure 27:
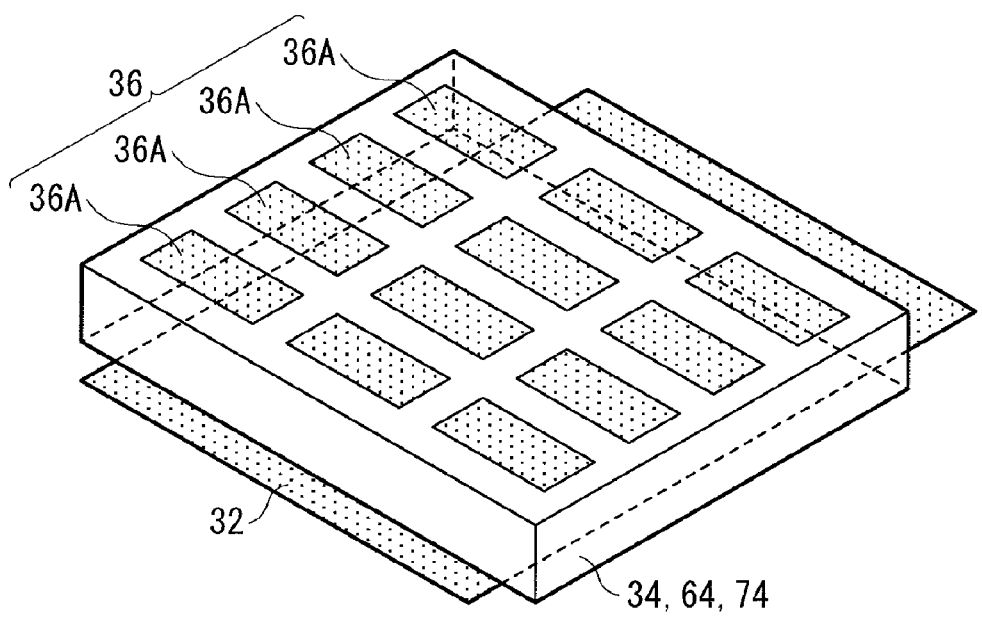
FIG. 27 is a perspective view illustrating a fourth modification of the electrode configuration illustrated in FIG. 2.

For example, in the embodiments illustrated in FIGS. 2 and 24, where the bottom electrode 32 and the top electrode have the band-like partial electrodes 32A and 36A which are arranged in parallel to one another, respectively, each of the partial electrodes 32A and 36A may be driven by a simple-matrix driving method, for example. FIG. 24 illustrates the embodiment where the partial electrodes 36A extend in a direction parallel to an extending direction of the partial electrodes 32A. In an embodiment illustrated in FIG. 25, where one of the bottom electrode 32 and the top electrode 36 has a solid film and the other of the bottom electrode 32 and the top electrode 36 has the band-like partial electrodes 32A or 36A which are arranged in parallel to one another, each of the partial electrodes 32A or 36A may be driven in a direction to which the partial electrodes 32A or 36A are arranged, for example. In an embodiment illustrated in FIG. 26, where the top electrode 36 is eliminated to remain only the bottom electrode 32 and where the bottom electrode 32 has the band-like partial electrodes 32A which are arranged in parallel to one another, a potential difference may be applied to two mutually-adjacent partial electrodes 32A, for example. The embodiment illustrated in FIG. 26 allows an in-plane electric field to be generated in the light modulation layer 34 or 64, thereby making it possible to control an orientation direction of the liquid crystal molecules in the microparticle 34B or 64B by the in-plane electric field. In an embodiment illustrated in FIG. 27, where one of the bottom electrode 32 and the top electrode 36 has a solid film and the other of the bottom electrode 32 and the top electrode 36 has a block configuration provided with fine interconnection lines, each of the segmented blocks of the block configuration may be driven independently, for example. The electrodes illustrated in each of FIGS. 24 to 27 are applied with the patterning according to one of the embodiments and the modifications thereof described in the foregoing (illustration of which is omitted for the purpose of convenience in illustration).

In uniformizing the in-plane luminance of the backlight or allowing the luminance of the partial white displaying (the luminance protrusion) to be constant in a plane of the backlight in the various driving methods described before, the embodiments and the modifications thereof encompass the following two methods as a method of adjusting a luminance of light output from each of the light modulating cells 30-1.

First adjusting method: an amplitude, a pulse width, or a frequency of the voltage applied to the light modulating cells 30-1 is set for each of the light modulating cells 30-1.

Second adjusting method: an amplitude, a pulse width, or a frequency of a current caused to flow in the light source 20 is set over time, in addition to the implementation of the first adjusting method.

[First Adjusting Method]

Figure 28:
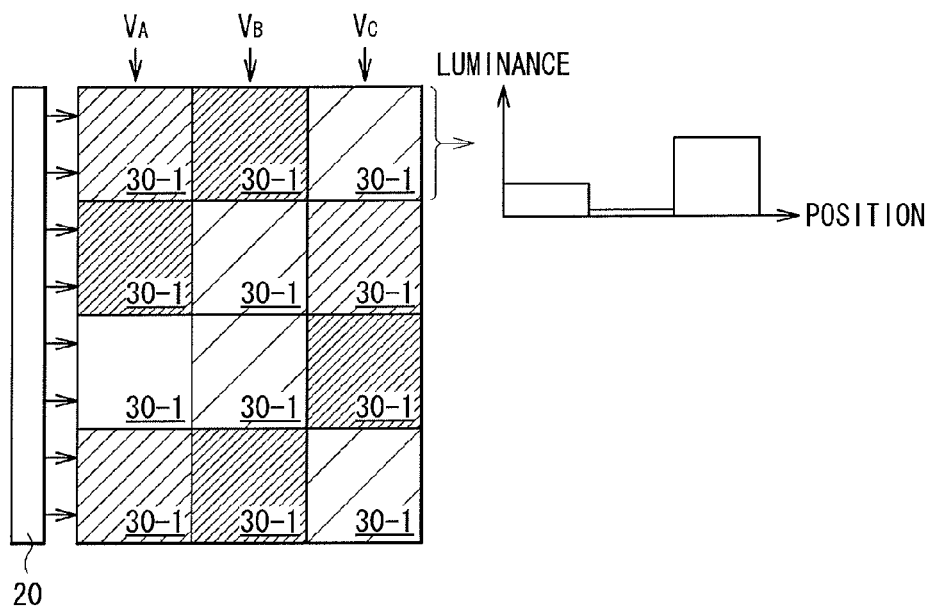
FIG. 28 schematically illustrates a state in which an emission luminance differs for each light modulating cell.
Figure 29A:
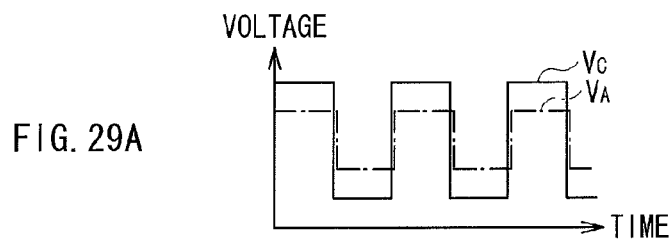
FIGS. 29A to 29C are waveform charts each illustrating an example of voltage waveforms applied to the light modulating cells.
Figure 29B:
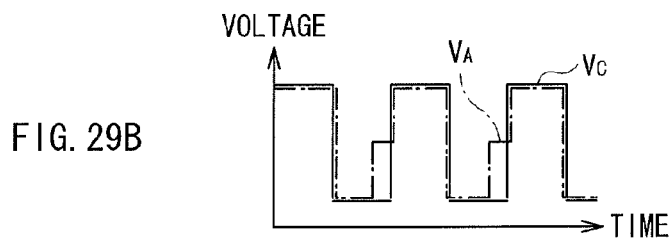
Figure 29C:
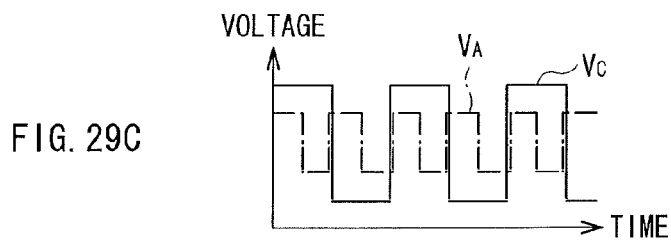

FIG. 28 schematically illustrates a state in which an emission luminance differs for each of the light modulating cells 30-1. FIG. 28 illustrates an example where twelve light modulating cells 30-1 are aligned in a four-by-three matrix. FIGS. 29A to 29C illustrate examples of waveforms of voltages $V_A$, $V_B$, and $V_C$ applied to three light modulating cells 30-1 included in a first row of lines illustrated in FIG. 28. FIG. 29A illustrates an example of an amplitude modulation, in which amplitudes of the voltages $V_A$, $V_B$, and $V_C$ are set for the respective light modulating cells 30-1. FIG. 29B illustrates an example of a pulse-width modulation, in which duty ratios of the voltages $V_A$, $V_B$, and $V_C$ are set for the respective light modulating cells 30-1. FIG. 29C illustrates an example of a frequency modulation, in which frequencies of the voltages $V_A$, $V_B$, and $V_C$ are set for the respective light modulating cells 30-1.

In the example of the amplitude modulation illustrated in FIG. 29A, there is no change in time in a scattering state. Thus, a flicker or the like is less likely to occur. From FIG. 29A, it can be seen that the luminance increases as the amplitudes of the voltages $V_A$, $V_B$, and $V_C$ applied to the light modulating cells 30-1 are increased.

In the example of the pulse-width modulation illustrated in FIG. 29B, there is no state (i.e., an intermediate state) between a scattering state and a non-scattering state. Thus, a luminance profile is retained, making it possible to maintain a chromaticity even when the luminance is changed. It can be seen from FIG. 29B that the luminance increases as the duty ratios of the voltages $V_A$, $V_B$, and $V_C$ applied to the light modulating cells 30-1 are increased.

In the example of the frequency modulation illustrated in FIG. 29C, effective voltages applied to the light modulating cells 30-1 are determined depending on frequencies of voltage pulses. Thus, the flicker is somewhat likely to occur. It can be seen from FIG. 29C that the luminance increases as the frequencies of the voltages $V_A$, $V_B$, and $V_C$ applied to the light modulating cells 30-1 are decreased.

Figure 30:
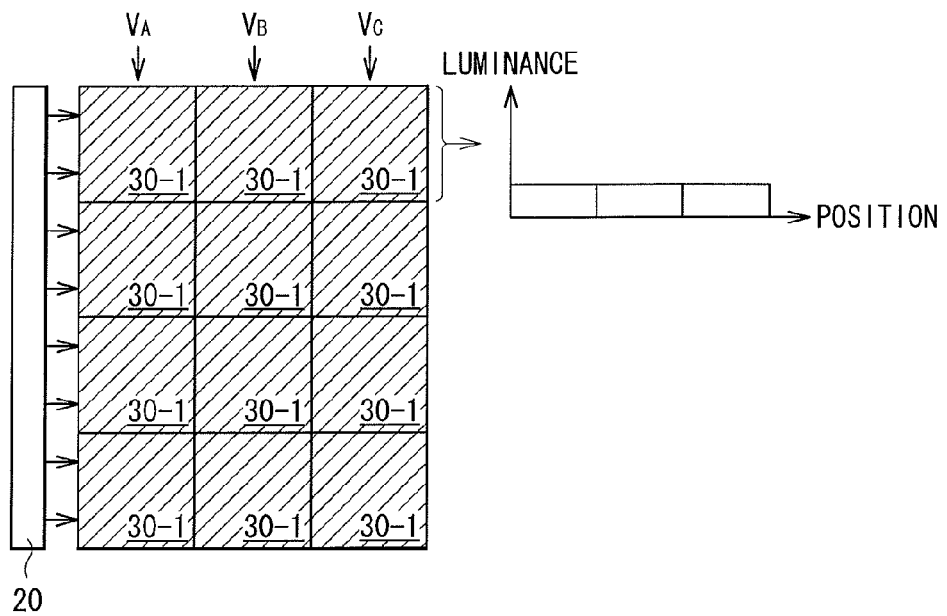
FIG. 30 schematically illustrates a state in which the emission luminance in each of the light modulating cells is made equal.
Figure 31A:
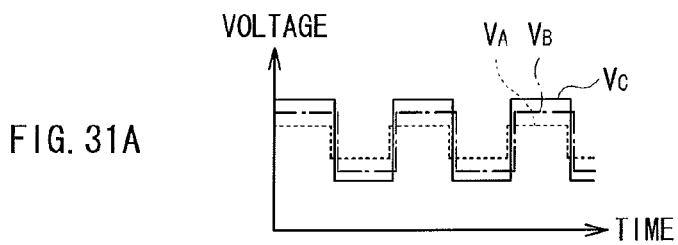
FIGS. 31A and 31B are waveform charts each illustrating an example of the voltage waveforms applied to the light modulating cells.
Figure 31B:
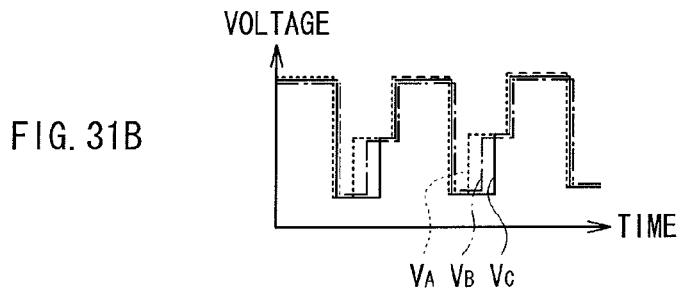

FIG. 30 schematically illustrates a state in which the emission luminance in each of the light modulating cells 30-1 is made equal to one another. For example, it can be seen form FIG. 31A that the in-plane luminance is uniformized by increasing the amplitudes of the voltages $V_A$, $V_B$, and $V_C$ applied to the light modulating cells 30-1 with increasing distance from the light source 20. Also, it can be seen form FIG. 31B that the in-plane luminance is uniformized by increasing the duty ratios of the voltages $V_A$, $V_B$, and $V_C$ applied to the light modulating cells 30-1 with increasing distance from the light source 20, for example.

Figures 32, 33:
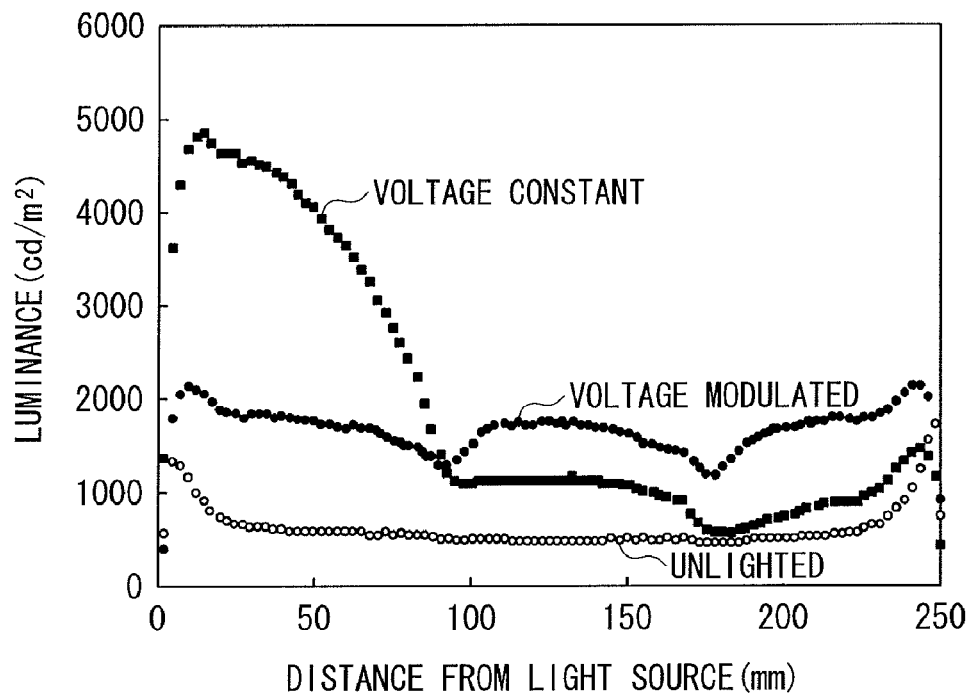
FIG. 32 represents measurements of emission luminance distributions for a single line.
FIG. 33 represents drive conditions for measuring the emission luminance distributions of FIG. 32.

FIG. 32 represents a luminance distribution when all of the duty ratios of the voltages $V_A$, $V_B$, and $V_C$ are set at 100%, a luminance distribution when the duty ratios of the voltages $V_A$, $V_B$, and $V_C$ are set at 32%, 52%, and 100%, respectively, and a luminance distribution when the voltages $V_A$, $V_B$, and $V_C$ are at 0 volts. FIG. 33 represents the drive conditions of the voltages $V_A$, $V_B$, and $V_C$. In FIG. 32, a distribution denoted as "voltage constant" corresponds to the luminance distribution when all of the duty ratios of the voltages $V_A$, $V_B$, and $V_C$ are set at 100%. A distribution denoted as "voltage modulated" in FIG. 32 corresponds to the luminance distribution when the duty ratios the $V_A$, $V_B$, and $V_C$ are mutually varied. A distribution denoted as "unlighted" in FIG. 32 corresponds to the luminance distribution when the voltages $V_A$, $V_B$, and $V_C$ are at 0 volts.

It can be seen from FIG. 32 that the in-plane luminance becomes extremely high on the light source 20 side when the same voltage is applied to all of the light modulating cells 30-1. Also, from FIG. 32, it can be seen that, by appropriately adjusting the duty ratios of the voltages $V_A$, $V_B$, and $V_C$ applied to the light modulating cells 30-1, it is possible to uniformize the distribution of the in-plane luminance.

Figure 34:
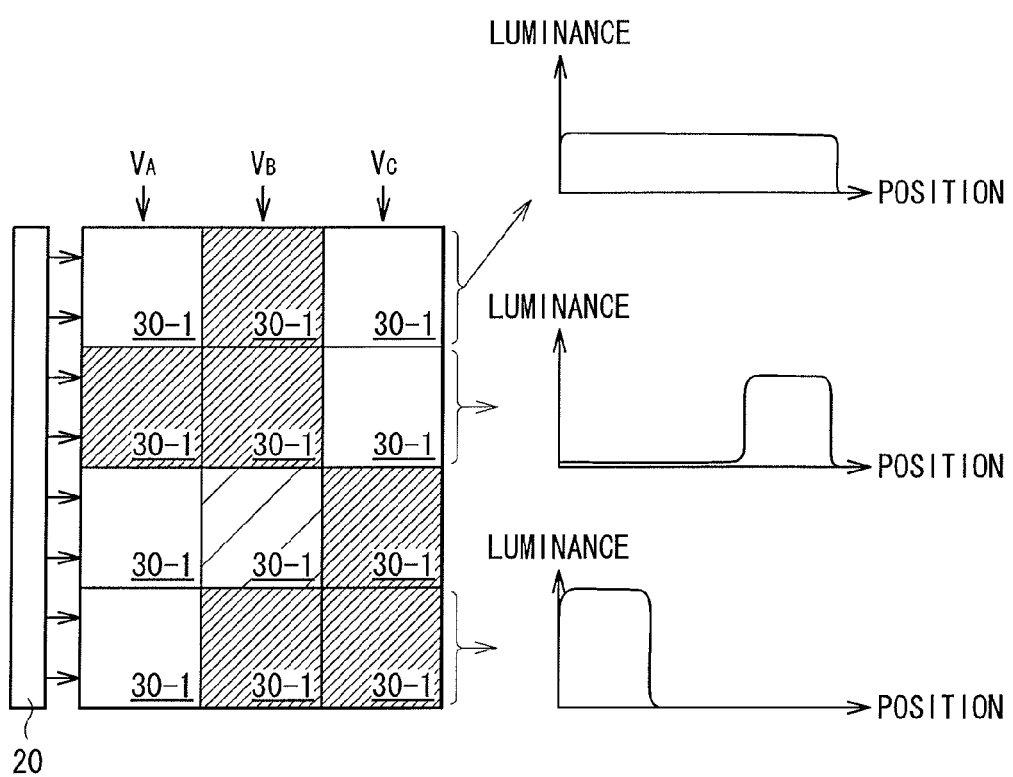
FIG. 34 schematically illustrates a state in which the emission luminance differs for each of the light modulating cells.

FIG. 34 schematically illustrates a state in which one of the light modulating cells 30-1 in the two mutually-adjacent light modulating cells 30-1 emits at the maximum luminance, and the other of the light modulating cell 30-1 emits at the minimum luminance. In the following, a state in which the light modulating cell 30-1 emits at the maximum luminance is referred to as a "white state", and a state in which the light modulating cell 30-1 emits at the minimum luminance is referred to as a "black state"

When assuming that 140 Vpp is applied to the leftmost light modulating cell 30-1 in a fourth row of lines, and that zero Vpp is applied to the two remaining light modulating cells 30-1 in the fourth row of lines, for example, light output from the light source 20 to the fourth row of lines is output mainly from the leftmost light modulating cell 30-1. Herein, the luminance, in theory, will be three times the luminance of light output from the first row of lines (when the first row of lines as a whole emits simultaneously). Meanwhile, when assuming that 140 Vpp is applied to the rightmost light modulating cell 30-1 in a second row of lines, and that zero Vpp is applied to the two remaining light modulating cells 30-1 in the second row of lines, for example, light output from the light source 20 to the second row of lines is output mainly from the rightmost light modulating cell 30-1, although the luminance thereof will be lower than the luminance in the fourth row of lines. This is because the light output from the light source 20 to the second row of lines is absorbed or scattered in the two light modulating cells 30-1 each having the black state, before reaching the rightmost light modulating cell 30-1. Thus, it can be seen that the emission luminance differs depending on the distances of the light modulating cells 30-1 from the light source 20, and on the emission states (i.e., the white state and the black state, for example) of the light modulating cells 30-1 interposed in a reaching path of the light from the light source 20, even when voltage values applied to the light modulating cells 30-1 are the same.

Figures 35, 36:
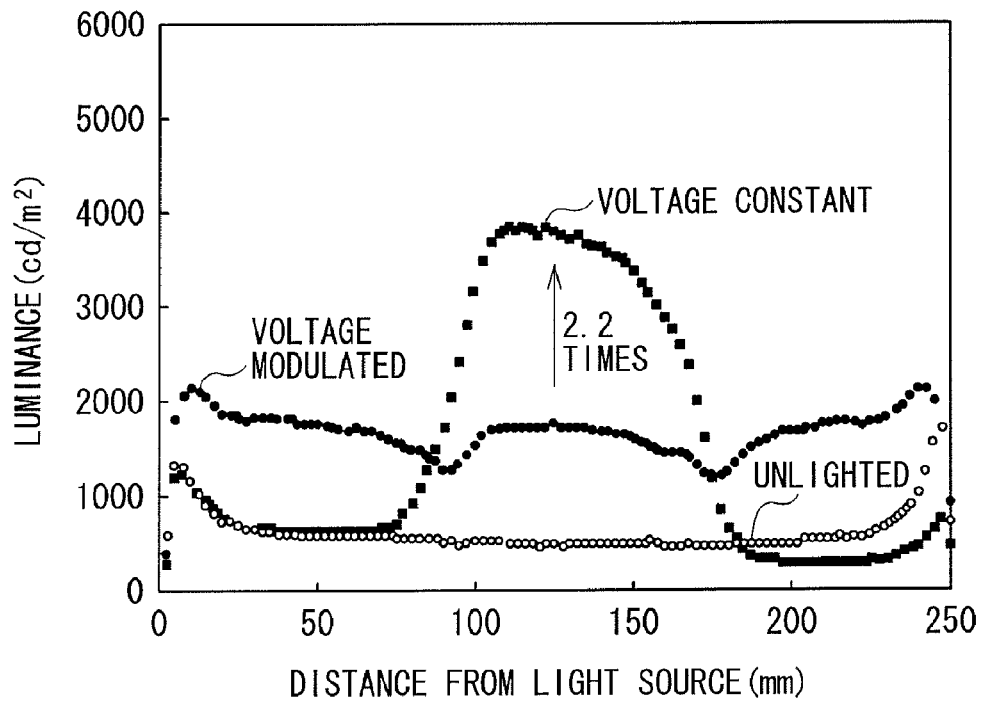
FIG. 35 represents measurements of the emission luminance distributions for a single line.
FIG. 36 represents drive conditions for measuring the emission luminance distributions of FIG. 35.

FIG. 35 represents a luminance distribution when only the light modulating cell 30-1 in the middle is emitted, and a luminance distribution when a single line as a whole is emitted. FIG. 36 represents drive conditions of the voltages $V_A$, $V_B$, and $V_C$. It can be seen from FIG. 35 that, by emitting only the middle light modulating cell 30-1, the luminance of the middle light modulating cell 30-1 is as high as about 2.2 times the luminance of a case where the single line as a whole is emitted.

Figure 37:
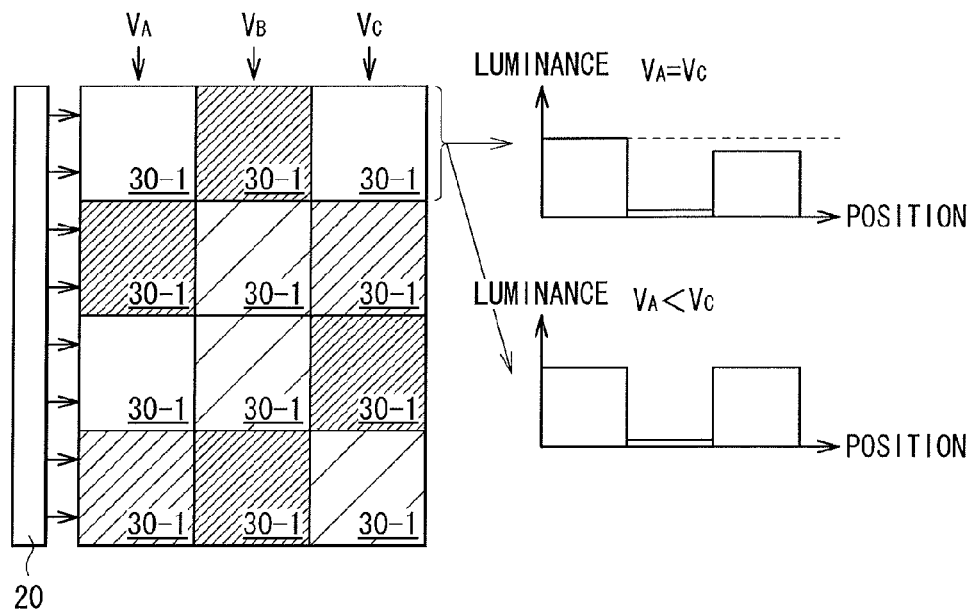
FIG. 37 schematically illustrates a state in which the emission luminance differs for each of the light modulating cells.

FIG. 37 schematically illustrates a state in which the emission luminance differs for each of the light modulating cells 30-1. When assuming that 140 Vpp is applied to the light modulating cells 30-1 at both ends in the first row of lines, and that zero Vpp is applied to the remaining light modulating cell 30-1 in the first row of lines, for example, the luminance of the leftmost light modulating cell 30-1 becomes higher than that of the rightmost light modulating cell 30-1 as represented by an upper right graph in FIG. 37. Also, when assuming that 140 Vpp is applied to the rightmost light modulating cell 30-1 in the first row of lines, and that a voltage whose voltage value is smaller than that of the voltage applied to the rightmost light modulating cell 30-1 (for example, 120 Vpp) is applied to the leftmost light modulating cell 30-1, the luminance of the leftmost light modulating cell 30-1 and the luminance of the rightmost light modulating cell 30-1 become equal to each other as represented by a right-center graph in FIG. 37.

Thus, when emitting the respective light modulating cells 30-1 included in the single line simultaneously as a whole, it is possible to allow the emission luminance of the plurality of particular light modulating cells 30-1 in the plane to be equal to one another, by adjusting the voltage values applied to the light modulating cells 30-1 based on: (1) a set luminance of the light modulating cell 30-1 to be emitted; (2) the emission luminance of the light modulating cell 30-1 located between the light modulating cell 30-1 to be emitted and the light source 20; and (3) the distance from the light source 20 of the light modulating cell 30-1 to be emitted. Also, when emitting the respective light modulating cells 30-1 included in the single line time-divisionally, it is possible to allow the emission luminance of the plurality of particular light modulating cells 30-1 in the plane to be equal to one another, by adjusting the voltage values applied to the light modulating cells 30-1 based on: (1) the set luminance of the light modulating cell 30-1 to be emitted; and (2) the distance from the light source 20 of the light modulating cell 30-1 to be emitted.

[Second Adjusting Method]

Figure 38:
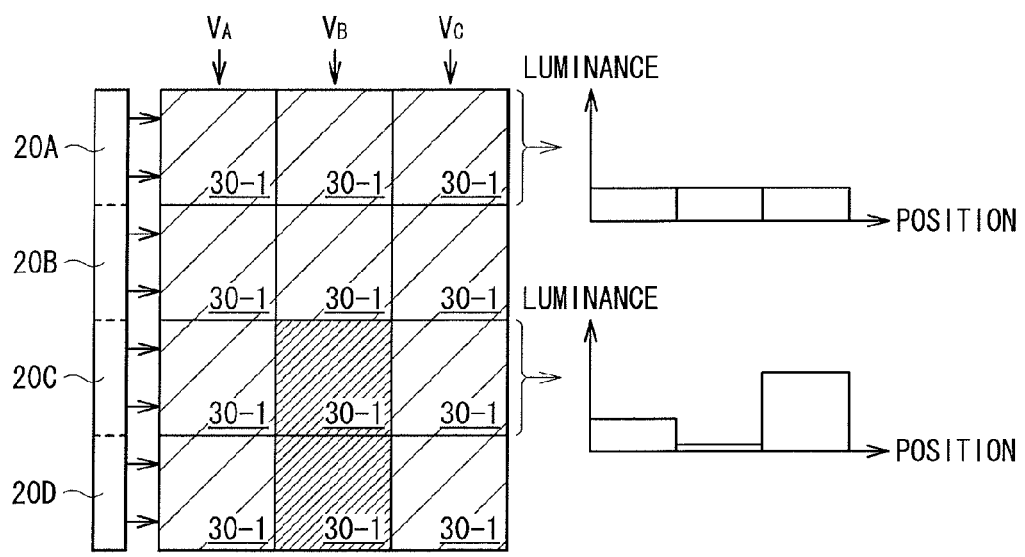
FIG. 38 schematically illustrates a state in which the emission luminance differs for each of the light modulating cells.

FIG. 38 schematically illustrates a state in which the light source 20 is divided corresponding to each of the lines of the light modulating cells 30-1. As illustrated in FIG. 38, the light source 20 is provided with light source blocks 20A to 20D, which are provided corresponding to the respective lines of the light modulating cells 30-1. The respective light source blocks 20A to 20D are driven (i.e., output the light) independently of one another. For example, in uniformizing the luminance of all of the light modulating cells 30-1 except for the two light modulating cells 30-1 each having the black state as illustrated in FIG. 38, the following method may be advantageously employed as mentioned above. The method is that, the amplitude, the pulse width, or the frequency of the voltage applied to the light modulating cells 30-1 is set for each of the light modulating cells 30-1 as described above, and in addition thereto, the current caused to flow in the light source 20 is synchronized, and the amplitude, the pulse width, or the frequency of the current or the voltage thereof is set over time. In the following, description will be made on one embodiment where the amplitude of the current caused to flow in the light source 20 is set over time.

Figure 39:
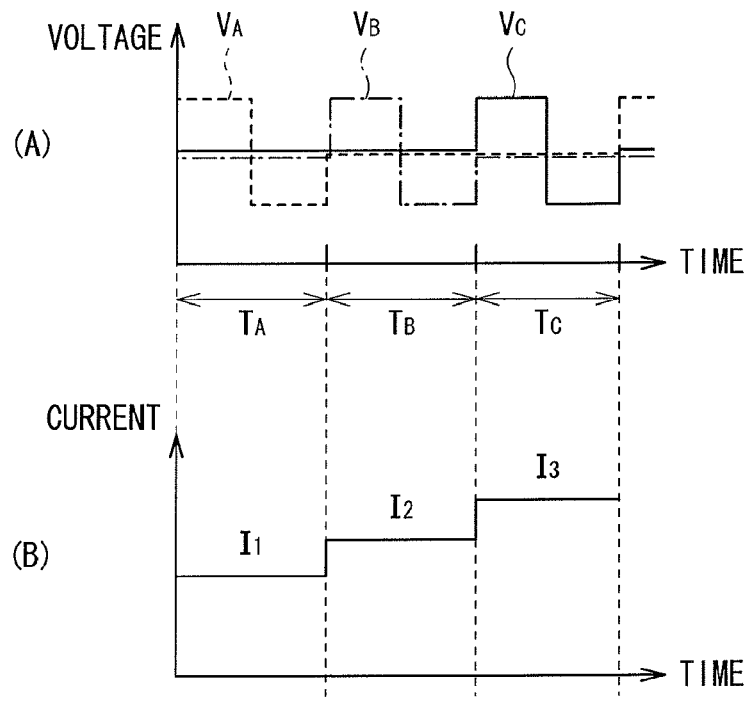
FIG. 39 is a waveform chart representing an example of voltage waveforms applied to the light modulating cells, and an example of a current waveform applied to a light source.

FIG. 39 is a waveform chart representing an example of voltage waveforms applied to three light modulating cells 30-1 included in the first row of lines, and an example of a current waveform applied to the light source block 20A corresponding to the first row of lines. Referring to FIG. 39, crest values of voltage pulses to be applied to all of the light modulating cells 30-1 included in the first row of lines are equal to one another, whereas timings (periods $T_A$, $T_B$, and $T_C$) of applying the voltage pulses to the respective light modulating cells 30-1 are different from one another. For example, the voltage pulses are applied in order from the light source 20 side as illustrated in Part (A) of FIG. 39. In other words, the respective light modulating cells 30-1 included in the single line are caused to emit in a time-divisional fashion. Herein, the magnitude of the current applied to the light source block 20A corresponding to the first row of lines differs for each of the periods $T_A$, $T_B$, and $T_C$.

In one embodiment, when applying the voltage pulses to the three light modulating cells 30-1 included in the first row of lines in order from the light source 20 side as illustrated in Part (A) and Part (B) of FIG. 39, the current is so applied to the light source 20A corresponding to the first row of lines while varying the current over time, that $I_1$, $I_2$, and $I_3$ satisfy a following relational expression:

$$I_1 < I_2 < I_3$$

where $I_1$ is a current value applied during the initial period $T_A$, $I_2$ is a current value applied during the subsequent period $T_B$, and $I_3$ is a current value applied during the last period $T_C$.

Figure 40:
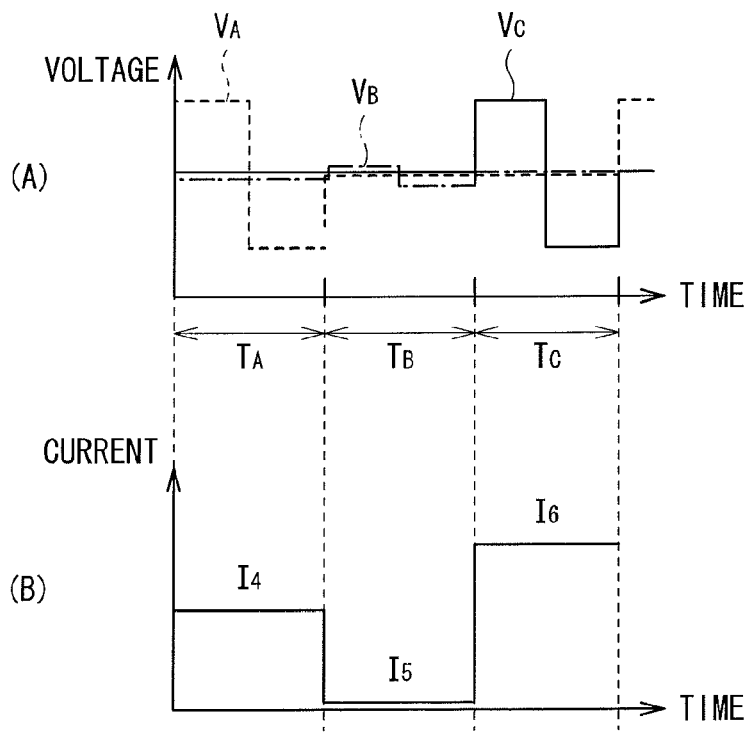
FIG. 40 is a waveform chart representing another example of the voltage waveforms applied to the light modulating cells, and another example of the current waveform applied to the light source.
Figure 41:
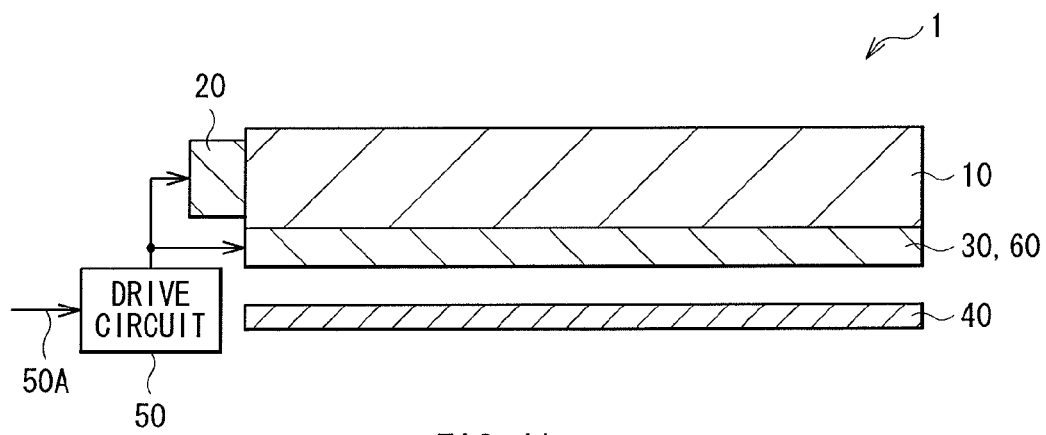
FIG. 41 is a cross-sectional view illustrating yet another example of the configuration of the backlight illustrated in FIG. 1.

FIG. 40 is a waveform chart representing an example of voltage waveforms applied to three light modulating cells 30-1 included in a third row of lines, and an example of a current waveform applied to the light source block 20C corresponding to the third row of lines. Referring to FIG. 40, the crest values of the voltage pulses to be applied to all of the light modulating cells 30-1 included in the third row of lines are equal to one another, except for the light modulating cell 30-1 in the middle. Also, the timings (the periods $T_A$, $T_B$, and $T_C$ of applying the voltage pulses to the respective light modulating cells 30-1 included in the third row of lines are different from one another. For example, the voltage pulses are applied in order from the light source 20 side as illustrated in Part (A) of FIG. 40. In other words, the respective light modulating cells 30-1 included in the single line are caused to emit in the time-divisional fashion. Herein, the magnitude of the current applied to the light source block 20C corresponding to the third row of lines differs for each of the periods $T_A$, $T_B$, and $T_C$. In one embodiment, when applying the voltage pulses to the three light modulating cells 30-1 included in the third row of lines in order from the light source 20 side as illustrated in Part (A) and Part (B) of FIG. 40, the current is so applied to the light source 20C corresponding to the third row of lines while varying the current over time, that $I_4$, $I_5$, and $I_6$ satisfy following relational expressions:

$$I_4 < I_6$$

$I_5 = 0$ A, or a current value to an extent capable of maintaining the black state where $I_4$ is a current value applied during the initial period $T_A$, $I_5$ is a current value applied during the subsequent period $T_B$, and $I_6$ is a current value applied during the last period $T_C$. Thus, the current value applied to the light source block 20C is adjusted based on: (1) the set luminance of the light modulating cell 30-1 to be emitted; and (2) the distance from the light source 20 of the light modulating cell 30-1 to be emitted. Herein, the emission state of the light modulating cell 30-1 located between the light modulating cell 30-1 to be emitted and the light source 20 is always the black state. Consequently, it is possible to allow the emission luminance of the plurality of particular light modulating cells 30-1 in the plane to be equal to one another, by adjusting the current value applied to the light source block 20C based on: (1) the set luminance of the light modulating cell 30-1 to be emitted; and (2) the distance from the light source 20 of the light modulating cell 30-1 to be emitted.

Also, the time-divisional driving of the plurality of light modulating cells 30-1 included in the single line as illustrated in FIGS. 39 and 40 makes it possible to allow a time for black insertion for the respective light modulating cells 30-1 to be mutually equal. Thereby, it is possible to suppress a color shift to be little even when a chromaticity differs in the white and the black states, for example.

In the first adjusting method and the second adjusting method, the luminance of the light modulating cell 30-1 to be emitted may be varied based on a picture signal. In one embodiment where the luminance of the light modulating cell 30-1 to be emitted is varied based on the picture signal, a picture signal 50A may be input to the drive circuit 50 which drives the light modulating element 30 or 60 and the light source 20. Also, in a case where the emission luminance differs largely between two mutually-adjacent light modulating cells 30-1 and thus a change in luminance of the backlight can be clearly seen even when the display panel is placed on the backlight, the application voltage or the like may be adjusted in the first adjusting method or in the first and the second adjusting method, such that the light modulating cell 30-1 of the two mutually-adjacent light modulating cells 30-1 having relatively the lower emission luminance than the other becomes slightly brighter (the scattering property becomes slightly larger), for example. Alternatively, the application voltage or the like may be adjusted in the first adjusting method or in the first and the second adjusting method, such that the light modulating cell 30-1 of the two mutually-adjacent light modulating cells 30-1 having relatively the higher emission luminance than the other becomes slightly darker (the scattering property becomes slightly smaller), for example.

Figure 42:
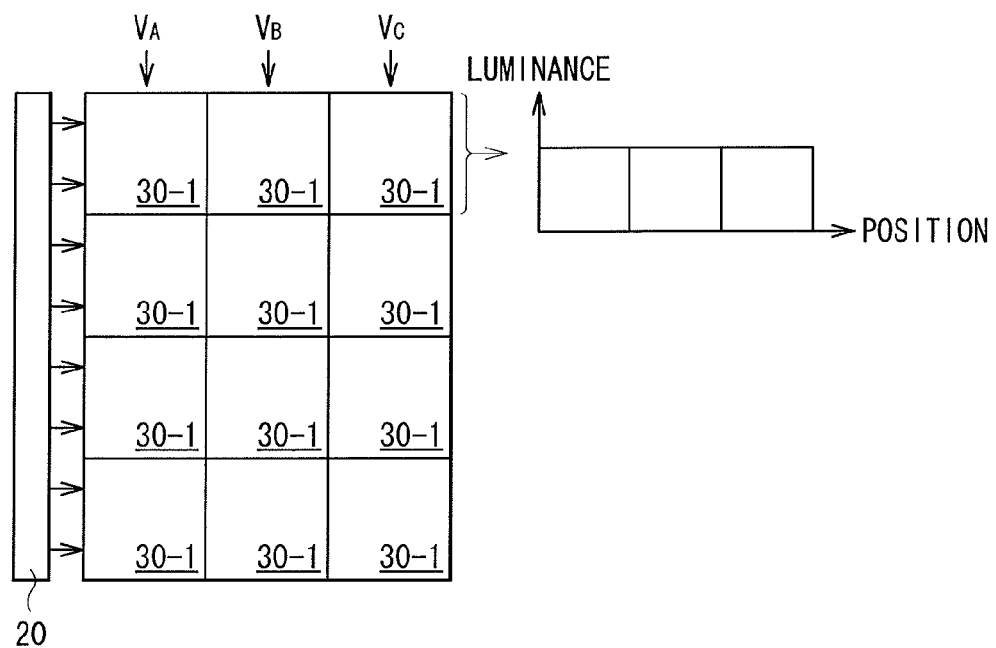
FIG. 42 schematically illustrates a state in which all of the light modulating cells are in a bright state.
Figure 43:
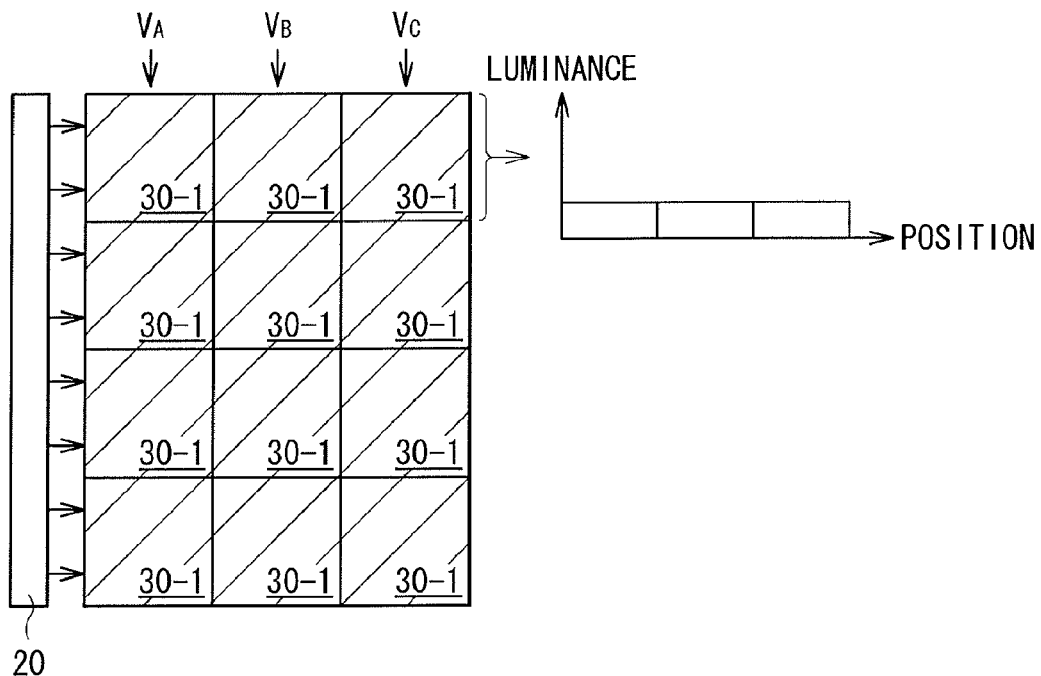
FIG. 43 schematically illustrates a state in which all of the light modulating cells are in a slightly dark state.
Figure 44:
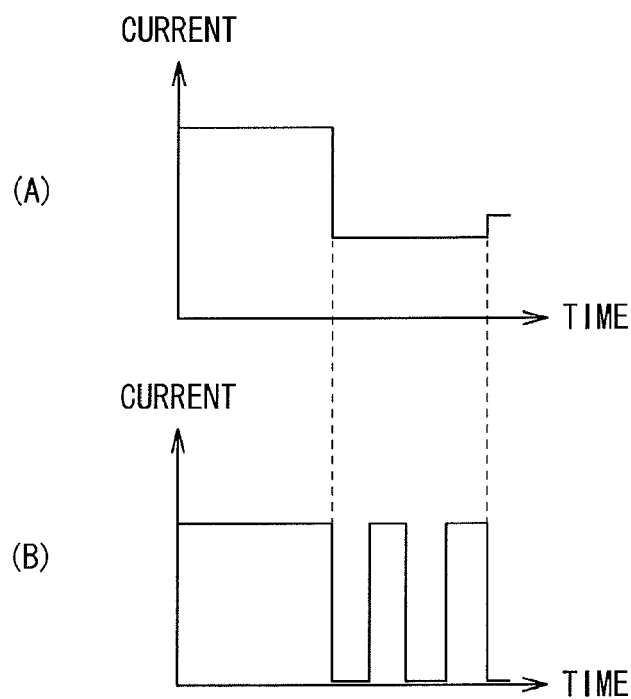
FIG. 44 illustrates waveform charts each representing an example of a current waveform applied to the light source.

Herein, although the luminance of the backlight as a whole is controlled by the voltage pulses applied to the light modulating cells 30-1, the luminance of the backlight may be controlled by a current pulse applied to the light source 20. In one embodiment, when turning a state of the backlight as a whole from a bright state illustrated in FIG. 42 to a slightly dark state illustrated in FIG. 43, a crest value of the current pulse applied to the light source 20 may be varied as illustrated in Part (A) of FIG. 44. In an alternative embodiment, a duty ratio of the current pulse applied to the light source 20 may be varied as illustrated in Part (B) of FIG. 44 when turning the state of the backlight as a whole from the bright state illustrated in FIG. 42 to the slightly dark state illustrated in FIG. 43.

Incidentally, in driving liquid crystals, a delay in response of about several milliseconds (ms) occurs from the application of voltage to the liquid crystals to the rising of the liquid crystals. For the purpose of reducing the response delay, a driving scheme referred to as an overdrive, which inputs a short pulse voltage having a high output at the time of the rising of the liquid crystals, may be employed, although a response rate thereof remains about several hundreds microseconds (μs) at the shortest. On the other hand, as for a current modulation of LEDs, causes for the response delay are limited to a delay due to electric resistance and a time required for fluorescence excitation. Thus, a fast response in the order of nanoseconds (ns) which does not rely on the response rate of the liquid crystals is possible. Consequently, it is possible to modulate the luminance of the backlight as a whole at high speed when the LEDs are used for the light source 20.

APPLICATION EXAMPLE

An application example of the backlight according to the embodiments and the modifications thereof described above will now be described.

Figure 45:
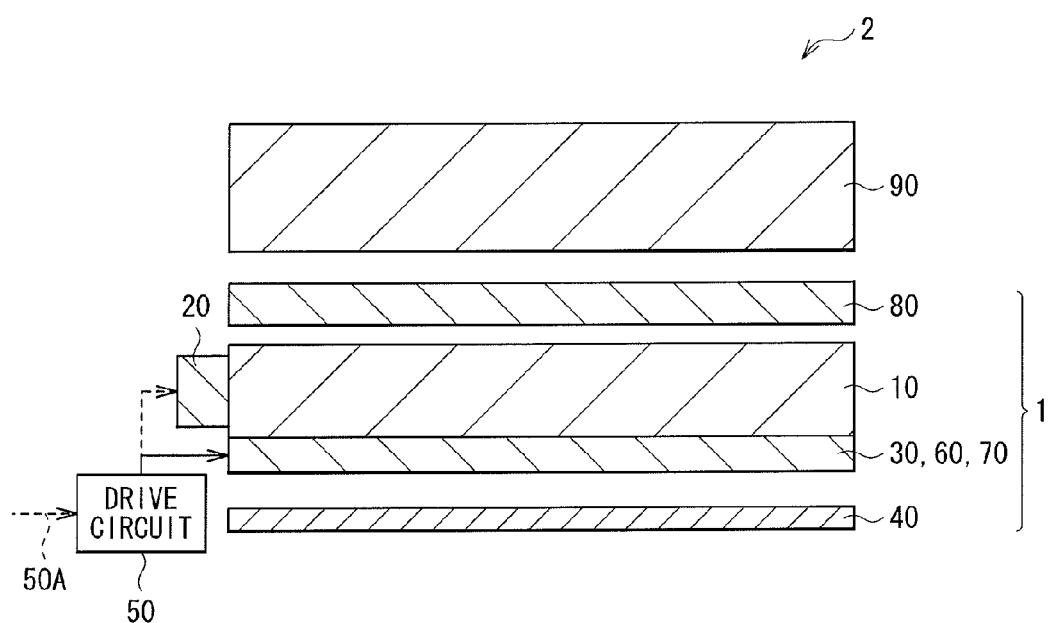
FIG. 45 is a cross-sectional view illustrating an example of a display device according to an application example.

FIG. 45 illustrates an example of a schematic configuration of a display device 2 according to the application example. The display device 2 is provided with a liquid crystal display panel 90 (a display panel), the backlight 1 disposed at the back of the liquid crystal display panel 90, the drive circuit 50 for driving the backlight 1, and a drive circuit (not illustrated) for driving the liquid crystal display panel 90. As the backlight provided in the display device 2, any one of the backlights according to the first embodiment, the second embodiment, and the modifications thereof is employed.

The liquid crystal display panel 90 is provided with a plurality of pixels, which are arranged in matrix and driven based on an image signal, to display a picture. The liquid crystal display panel 90 is, for example, a transmissive liquid crystal display in which the respective pixels are driven in accordance with the image signal, and has a configuration in which a liquid crystal layer is sandwiched by a pair of transparent substrates. More specifically, the liquid crystal display panel 90 includes a polarizer, a transparent substrate, pixel electrodes, an orientation film, the liquid crystal layer, an orientation film, a common electrode, a color filter, a transparent substrate, and a polarizer, in order from the backlight 1 side.

Each of the transparent substrates is a substrate transparent to visible light, which can be a plate glass or other suitable member. The transparent substrate on the backlight 1 side is formed with an active drive circuit including: thin-film transistors (TFT) electrically connected to pixel electrodes; wires; and so forth, which are not illustrated. The pixel electrodes and the common electrode are each configured of, for example, ITO (Indium Tin Oxide). The pixel electrodes are disposed in lattice or delta arrangement on the transparent substrate, and function as electrodes for the respective pixels. On the other hand, the common electrode is formed on the entire surface of the color filter, and function as an electrode which is common to and which faces the respective pixel electrodes. Each of the orientation films is configured of a high polymer material which can be a polyimide or other suitable material, and performs an orienting process on the liquid crystals. The liquid crystal layer includes, for example, liquid crystals in a VA (Vertical Alignment) mode, a TN (Twisted Nematic) mode, or an STN (Super Twisted Nematic) mode. The liquid crystal layer has a function of changing, for each of the pixels, an orientation of a polarizing axis of the light emitted from the backlight 1 by an application voltage supplied from the drive circuit (not illustrated). An orientation of a transmission axis of each of the pixels may be adjusted in multiple stages by changing the arrangement of the liquid crystals in multiple stages. The color filter has a configuration in which color filters for separating the light, having passed through the liquid crystal layer, into three primary colors of red (R), green (G), and blue (B) or into four colors of R, G, B, and white (W), are arranged in association with the arrangement of the pixel electrodes. A filter array (the pixel arrangement) can be a stripe array, a diagonal array, a delta array, a rectangle array, or other suitable array.

Each of the polarizers is a kind of an optical shutter, and allows only the light in a certain vibration direction (polarized light) to pass therethrough. The polarizer may be an absorption polarizing element that absorbs the light in the vibration direction (the polarized light) other than a transmission axis, but may be preferably a polarizing element of a reflection type that reflects the light to the backlight 1 side, from a viewpoint of an improved luminance. The polarizers are disposed so that their polarization axes are different by 90 degrees. Thereby, the light emitted from the backlight 1 transmits through the liquid crystal layer, or is interrupted by the liquid crystal layer.

The drive circuit 50 controls the magnitude of the voltage applied to the pair of electrodes (i.e., the bottom electrode 32 and the top electrode 36) of each of the light modulating cells 30-1. The drive circuit 50 controls the magnitude of the voltage applied to the pair of electrodes (i.e., the bottom electrode 32 and the top electrode 36) of each of the light modulating cells 30-1, so that the optical axis AX2 of the microparticle 34B becomes parallel to the optical axis AX1 of the bulk 34A in a cell corresponding to a pixel position of black displaying in the plurality of light modulating cells 30-1, and that the optical axis AX2 of the microparticle 34B intersects the optical axis AX1 of the bulk 34A in a cell corresponding to a pixel position of white displaying in the plurality of light modulating cells 30-1, for example.

In this application example, the backlight 1 according to any one of the embodiments and the modifications thereof is used as the light source for illuminating the liquid crystal display panel 90. This makes it possible to reduce or almost eliminate the leakage of light in the range where the viewing angle is large, while improving the display luminance. As a result, it is possible to increase the modulation ratio in the front direction. Also, it is possible to realize the luminance protrusion without increasing the power supplied to the backlight 1.

Also, in this application example, the backlight 1 modulates an intensity of light partially entering the liquid crystal display panel 90 in accordance with a display image. However, when there is a sharp change in lightness in an edge part of patterns of the electrodes (i.e., the bottom electrode 32 and the top electrode 36) included in the light modulating element 30, 60, or 70, a boundary part of the sharp change in lightness is seen in the display image as well. Thus, a characteristic that the lightness monotonously changes in the boundary part of the electrodes as much as possible has been demanded, which characteristic may be referred to as a blur characteristic. In order to increase the blur characteristic, use of a diffuser having a strong diffusion property is effective. However, when the diffusion property is strong, a total light transmittance becomes low, and the lightness is likely to decrease accordingly. For these reasons, when using the diffuser as the optical sheet 80 in this application example, the total light transmittance of the diffuser is preferably 50% to 85% and, more preferably 60% to 80%. Also, the longer a spatial distance between the light guide plate 10 and the diffuser in the backlight 1 is, the better the blur characteristic becomes. Further, it is also possible to increase the number of patterns of the electrodes (i.e., the bottom electrode 32 and the top electrode 36) included in the light modulating element 30, 60, or 70 and adjust the voltage of each of the electrodes so that states change monotonously as much as possible between the dark state and the blight state.

According to this application example, the boundary part of bright and dark in the illumination light is blurred, thereby making it possible to suppress a degradation in image quality due to the electrode patterns in the light modulating elements 30, 60, or 70. Also, further reduction in thickness is achieved when the diffuser is not added in blurring the boundary part of bright and dark in the illumination light.

EXAMPLES

Examples of the embodiments and the modifications will now be described below. Note that the examples are illustrative, and the embodiments and the modifications are not limited to these examples.

[Cell Fabrication Method]

A liquid crystal cell having a size of 300 mm-by-250 mm was fabricated as follows. First, indium-tin-oxide (ITO) was applied on a film substrate made of PET, and ITO electrodes were formed thereafter using a patterning method by means of a laser processing. Then, a polyamide-imide solution was applied using a bar coater on a surface of the film substrate on which the ITO electrodes were formed, which was thereafter dried at a temperature of 80 degrees centigrade for 10 minutes, and a rubbing process was performed thereafter using a rubbing cloth, to fabricate an orientation film. The thus-fabricated orientation film was attached using an adhesive material to a light guide plate having a thickness of 5 mm, to fabricate an ITO film having the light guide plate. Further, a solution, in which liquid crystals, liquid crystalline monomers having an ultraviolet-curable property, and a polymerization initiator (hereinafter referred to as "monomer-mixed liquid crystals") were mixed to have a predetermined composition, was dropped under the atmosphere on the ITO film having the light guide plate. Thereafter, an ITO film having an orientation film, fabricated likewise, was attached to the ITO film having the light guide plate under vacuum, to fabricate a film liquid crystal cell having the light guide plate.

The liquid crystals used here had an ordinary light refractive index of 1.513, an extraordinary light refractive index of 1.714, both at a wavelength of 589 nm at a temperature of 25 degrees centigrade, and a nematic-liquid crystal phase transition temperature of 106 degrees centigrade. For the liquid crystalline monomers, bifunctional monomers having similarly an ordinary light refractive index of 1.49, an extraordinary light refractive index of 1.64, and a nematic-liquid crystal phase transition temperature of 106 degrees centigrade were used. These liquid crystals and the liquid crystalline monomers were mixed at a weight ratio of 90:10, and the polymerization initiator corresponding to 1% of weight ratio of the liquid crystalline monomers was added. As for the polymerization initiator, a polymerization initiator available from ADEKA Corporation, located in Tokyo, Japan, under the trade name of "N-1919", was used. Then, ultraviolet light was irradiated to cure the liquid crystalline monomers in the liquid crystals.

[Measurement Method of In-Plane Luminance Distribution]

White LED light was irradiated on an edge face of the light guide plate attached to the fabricated cell. A diffusion sheet and a lens sheet were provided in this order on the light guide plate. An in-plane luminance was measured by using an in-plane luminance measurement system while applying a voltage to the cell. As for the in-plane luminance measurement system, a system available from Yugen Kaisha HI-LAND, located in Tokyo, Japan, under the trade name of "RISA Color", was used.

Example 1

Two film substrates, each having a size of 320 mm-by-270 mm, were provided. An ITO film was thereafter formed on one of the film substrates, which was patterned in a band-like configuration to have three lines of band-like ITO electrodes each having a width of 83 mm. Each of the band-like ITO electrodes was formed with a plurality of holes having a predetermined size in a range of 100 micrometers to 700 micrometers (μm). A density of the holes formed in the band-like ITO electrodes was adjusted so that a proportion of the holes in each of the ITO electrodes became smaller with increasing distance from a position at which the white LEDs were located. The density of the holes here was made equal in a single ITO electrode. An ITO film was also formed on the other film substrate, which was patterned in a band-like configuration to have four lines of band-like electrodes each having a width of 75 mm. These two ITO film substrates were so superimposed as to establish a four-by-three matrix configuration with a size of 75 mm-by-83 mm. The ITO film having the orientation film was attached to the ITO film having the light guide plate, such that the ITO electrodes and the ITO electrodes formed with the plurality of holes were orthogonal to one another when viewed from a direction of normal of the film substrates. The diffusion sheet and the lens sheet were provided in this order on the thus-fabricated film liquid crystal cell having the light guide plate according to the Example 1. Thereafter, a pulse voltage of 100 Hz and 140 Vpp was applied across the pair of ITO electrodes, such that the light of the white LEDs transmitted through the film liquid crystal cell having the light guide plate according to the Example 1. As a result, an in-plane luminance of 3,000 cd/m$^2$±5% was obtained. This white luminance was at a value durable for practical use. Also, the application of voltage was stopped to measure the in-plane luminance distribution of black luminance. As a result, the in-plane luminance of 500 cd/m$^2$±5% was obtained. This black luminance was also at a value durable for practical use.

Example 2

A film liquid crystal cell having a light guide plate according to Example 2 was fabricated in a similar fashion as that in the Example 1, except that the holes formed in each of the band-like ITO electrodes were decreased in size with increasing distance from the position at which the white LEDs were located, in order to allow the proportion of the holes in each of the ITO electrodes to be smaller with increasing distance from the position of the white LEDs. The diffusion sheet and the lens sheet were provided in this order on the thus-fabricated film liquid crystal cell having the light guide plate according to the Example 2. Thereafter, the pulse voltage of 100 Hz and 140 Vpp was applied across the pair of ITO electrodes, such that the light of the white LEDs transmitted through the film liquid crystal cell having the light guide plate according to the Example 2. As a result, the in-plane luminance of 2,900 cd/m$^2$±5% was obtained. This white luminance was at a value durable for practical use. Also, the application of voltage was stopped to measure the in-plane luminance distribution of black luminance. As a result, the in-plane luminance of 480 cd/m$^2$±5% was obtained. This black luminance was also at a value durable for practical use.

Example 3

A film liquid crystal cell having a light guide plate according to Example 3 was fabricated in a similar fashion as that in the Example 1, except that the density of the holes formed in each of the band-like ITO electrodes provided on one of the film substrates was decreased, within each of the ITO electrodes (i.e., within a single block among three-by-four blocks), with increasing distance from the position at which the white LEDs were located. The diffusion sheet and the lens sheet were provided in this order on the thus-fabricated film liquid crystal cell having the light guide plate according to the Example 3. Thereafter, the pulse voltage of 100 Hz and 48 Vpp was applied across the pair of ITO electrodes which were nearest to the position of the white LEDs, the pulse voltage of 100 Hz and 62 Vpp was applied across the pair of ITO electrodes which were next nearest to the position of the white LEDs, and the pulse voltage of 100 Hz and 140 Vpp was applied across the pair of ITO electrodes which were most distant from the position of the white LEDs, such that the light of the white LEDs transmitted through the film liquid crystal cell having the light guide plate according to the Example 3. As a result, the in-plane luminance of 3,000 cd/m$^2$±5% was obtained. This white luminance was at a value durable for practical use. Also, the application of voltage was stopped to measure the in-plane luminance distribution of black luminance. As a result, the in-plane luminance of 500 cd/m$^2$±5% was obtained. This black luminance was also at a value durable for practical use.

Comparative Example 1

A film liquid crystal cell having a light guide plate according to Comparative Example 1 was fabricated in a similar fashion as that in the Example 1, except that the holes were not formed in each of the ITO electrodes provided on one of the film substrates. The diffusion sheet and the lens sheet were provided in this order on the film liquid crystal cell having the light guide plate according to the Comparative Example 1. A result of the measurement of the in-plane luminance distribution of the black luminance was similar to that in the Example 1. However, the measurement of the in-plane luminance distribution of the white luminance revealed that the luminance became drastically small with increasing distance from the white LEDs, and the in-plane luminance became ununiform.

Comparative Example 2

A film liquid crystal cell having a light guide plate according to Comparative Example 2 was fabricated in a similar fashion as that in the Example 1, except that the holes were not formed in each of the ITO electrodes provided on one of the film substrates, and that a light guide plate, in which a density of presence of silica particles was changed in printing the light guide plate, was used. The diffusion sheet and the lens sheet were provided in this order on the film liquid crystal cell having the light guide plate according to the Comparative Example 2. The measurement of the in-plane luminance distribution of the white luminance revealed an improvement in the ununiformity of the in-plane luminance as compared with that in the Comparative Example 1. However, the measurement of the in-plane luminance distribution of the black luminance revealed that the black luminance became large, which the black luminance was not at a value durable for practical use.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illumination device comprising:
    a light guide member having a lower face, an upper face, and side faces;
    a light source provided on one or more side faces of the light guide member; and
    a light modulating element provided on the lower face, the upper face, or inside of the light guide member and attached to the light guide member, the light modulating element including a pair of transparent substrates disposed to oppose each other with a gap therebetween, a first electrode provided on a surface of one of the transparent substrates, a second electrode provided on a surface of the other of the transparent substrates, and a light modulation layer provided in the gap of the transparent substrates and expressing a scattering property or a transparency to light from the light source in accordance with a magnitude of an electric field,
    wherein the first electrode, the second electrode, or both of the first and the second electrodes is patterned, and
    a density of a pattern of the first electrode, the second electrode, or both of the first and the second electrodes to which the patterning is applied is varied depending on a distance from the light source.

2. The illumination device according to claim 1, wherein the first electrode, the second electrode, or both of the first and the second electrodes includes a plurality of openings whose diameter is uniform regardless of the distance from the light source, and whose density is varied depending on the distance from the light source.

3. The illumination device according to claim 1, wherein the first electrode, the second electrode, or both of the first and the second electrodes includes a plurality of openings whose diameter is varied depending on the distance from the light source, and whose density is varied depending on the distance from the light source.

4. The illumination device according to claim 1, wherein the density of pattern of the first electrode, the second electrode, or both of the first and the second electrodes to which the patterning is applied is varied depending on the distance, with respect to the first electrode as a whole, the second electrode as a whole, or both of the first and the second electrodes as a whole to which the patterning is applied, from the light source.

5. The illumination device according to claim 1, wherein the light modulation layer expresses the scattering property to the light from the light source when a voltage is applied across the first electrode and the second electrode, and expresses the transparency to the light from the light source when the voltage is not applied across the first electrode and the second electrode, and
    the density of pattern of the first electrode, the second electrode, or both of the first and the second electrodes to which the patterning is applied is increased depending on the distance from the light source.

6. The illumination device according to claim 1, wherein the light modulation layer expresses the transparency to the light from the light source when a voltage is applied across the first electrode and the second electrode, and expresses the scattering property to the light from the light source when the voltage is not applied across the first electrode and the second electrode, and
    the density of pattern of the first electrode, the second electrode, or both of the first and the second electrodes to which the patterning is applied is decreased depending on the distance from the light source.

7. The illumination device according to claim 1, wherein the first electrode, the second electrode, or both of the first and the second electrodes is configured of a plurality of partial electrodes.

8. The illumination device according to claim 7, wherein the density of pattern of the first electrode, the second electrode, or both of the first and the second electrodes to which the patterning is applied is varied, for each of the partial electrodes thereof to which the patterning is applied, depending on the distance from the light source.

9. The illumination device according to claim 1, wherein the light modulation layer includes a first region and a second region, each having an optical anisotropy and each having a mutually-different rate of response to the electric field,
    an optical axis of the first region and an optical axis of the second region are parallel to each other when a voltage is not applied across the first electrode and the second electrode, and the optical axis of the first region and the optical axis of the second region intersect each other when the voltage is applied across the first electrode and the second electrode.

10. The illumination device according to claim 9, wherein, when the voltage is not applied across the first electrode and the second electrode, the optical axis of the first region is parallel to a light incident face of the side faces of the light guide member on which the light of the light source is incident, and intersects the surfaces of the transparent substrates at a first angle, and when the voltage is applied across the first electrode and the second electrode, the optical axis of the first region is parallel to the light incident face and intersects the surfaces of the transparent substrates at a second angle which is larger than the first angle, and
    the optical axis of the second region is parallel to the light incident face and intersects the surfaces of the transparent substrates at the first angle, regardless of presence of application of the voltage across the first electrode and the second electrode.

11. The illumination device according to claim 9, wherein, when the voltage is not applied across the first electrode and the second electrode, the optical axis of the first region is parallel to a light incident face of the side faces of the light guide member on which the light of the light source is incident, and intersects a normal of the transparent substrates at a third angle, and when the voltage is applied across the first electrode and the second electrode, the optical axis of the first region is parallel to the light incident face, and intersects the normal of the transparent substrates at a fourth angle which is larger than the third angle or is parallel to the surfaces of the transparent substrates, and
    the optical axis of the second region is parallel to the light incident face and intersects the surfaces of the transparent substrates at the third angle, regardless of presence of application of the voltage across the first electrode and the second electrode.

12. The illumination device according to claim 1, further comprising a drive circuit,
    wherein the first electrode, the second electrode, or both of the first and the second electrodes is configured of a plurality of partial electrodes structuring a plurality of cells, and
    the drive circuit modulates a voltage applied to the plurality of partial electrodes based on a distance of the plurality of cells from the light source.

13. The illumination device according to claim 12, wherein the drive circuit modulates the voltage applied to the plurality of partial electrodes based on the distance from the light source and on a picture signal.

14. The illumination device according to claim 13, wherein the drive circuit modulates the voltage applied to the plurality of partial electrodes based on the distance of a cell to be emitted of the plurality of cells from the light source and on the picture signal.

15. The illumination device according to claim 12, wherein the light source includes a plurality of light source blocks provided corresponding to the plurality of cells and driven independently of one another, and the drive circuit modulates a current or a voltage applied to the light source blocks based on a distance of a cell to be emitted of the plurality of cells from the light source.

16. The illumination device according to claim 12, wherein the density of pattern of the first electrode, the second electrode, or both of the first and the second electrodes to which the patterning is applied is varied continuously between two mutually-adjacent cells of the plurality of cells.

17. A display device comprising:

a display panel having a plurality of pixels which are arranged in a matrix configuration and are driven based on an image signal; and an illumination device illuminating the display panel, the illumination device including:

a light guide member having a lower face, an upper face, and side faces;

a light source provided on one or more side faces of the light guide member; and a light modulating element provided on the lower face, the upper face, or inside of the light guide member and attached to the light guide member, the light modulating element including a pair of transparent substrates disposed to oppose each other with a gap therebetween, a first electrode provided on a surface of one of the transparent substrates, a second electrode provided on a surface of the other of the transparent substrates, and a light modulation layer provided in the gap of the transparent substrates and expressing a scattering property or a transparency to light from the light source in accordance with a magnitude of an electric field, wherein the first electrode, the second electrode, or both of the first and the second electrodes is patterned, and a density of pattern of the first electrode, the second electrode, or both of the first and the second electrodes to which the patterning is applied is varied depending on a distance from the light source.

* * * * *